Figure 7:
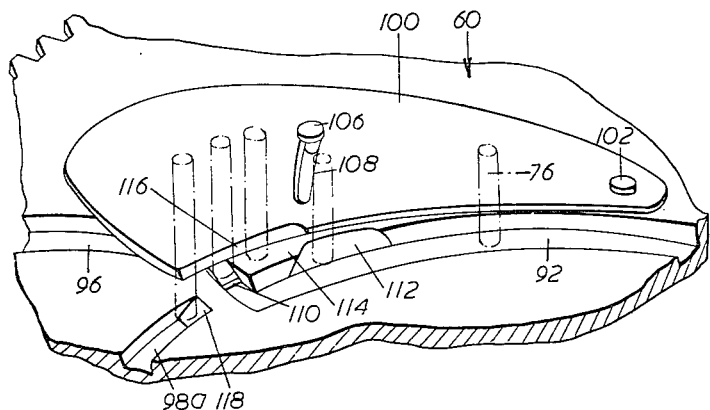

May 21, 1963 H. C. HANSEN 3,090,624
MAGAZINE PHONOGRAPHS
Filed Aug. 7, 1956 68 Sheets-Sheet 1
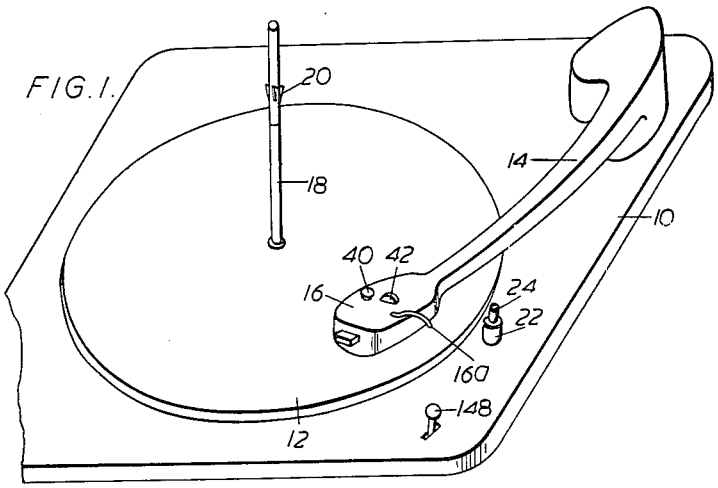
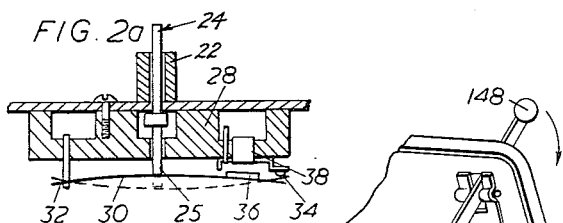
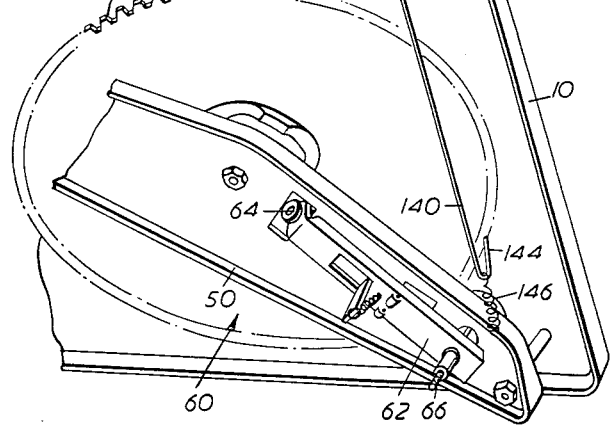
Inventor
HANS CHRISTIAN HANSEN
By Dicke + Craig
Attorneys

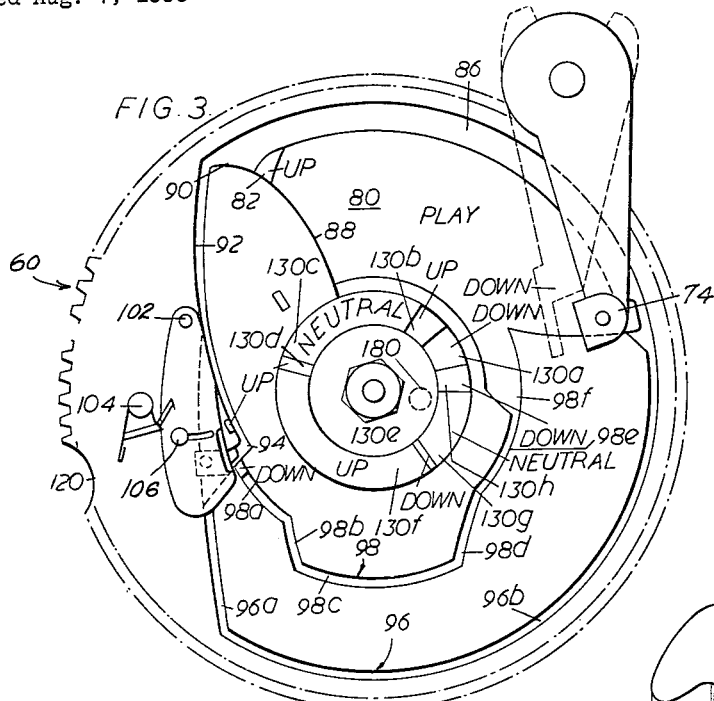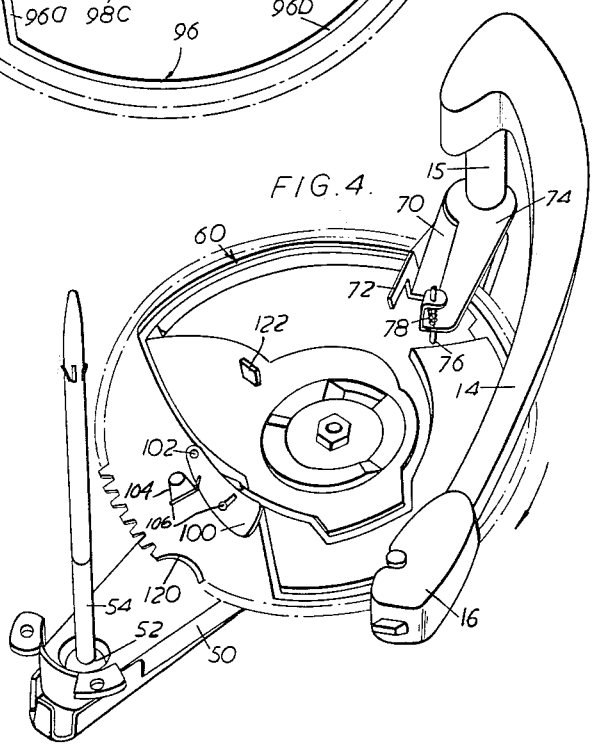

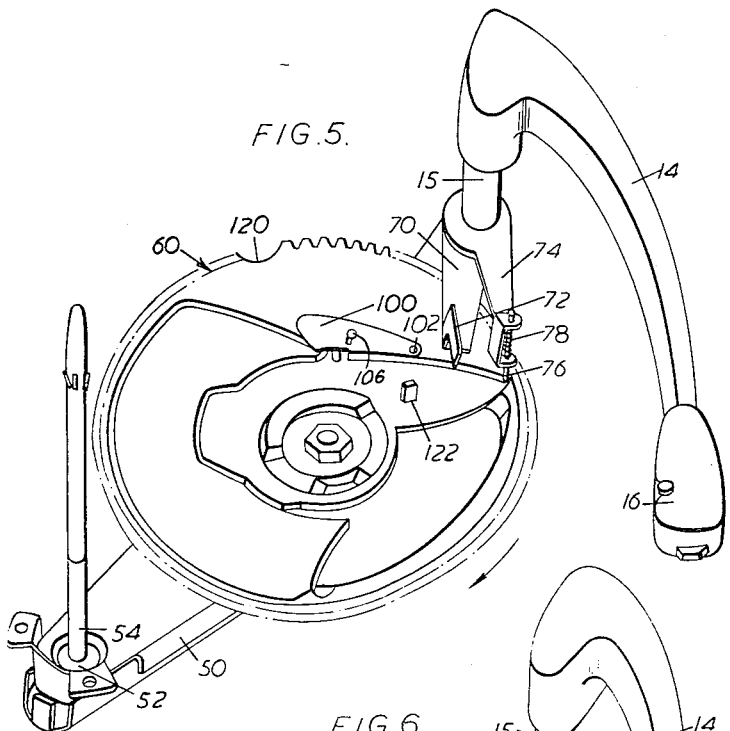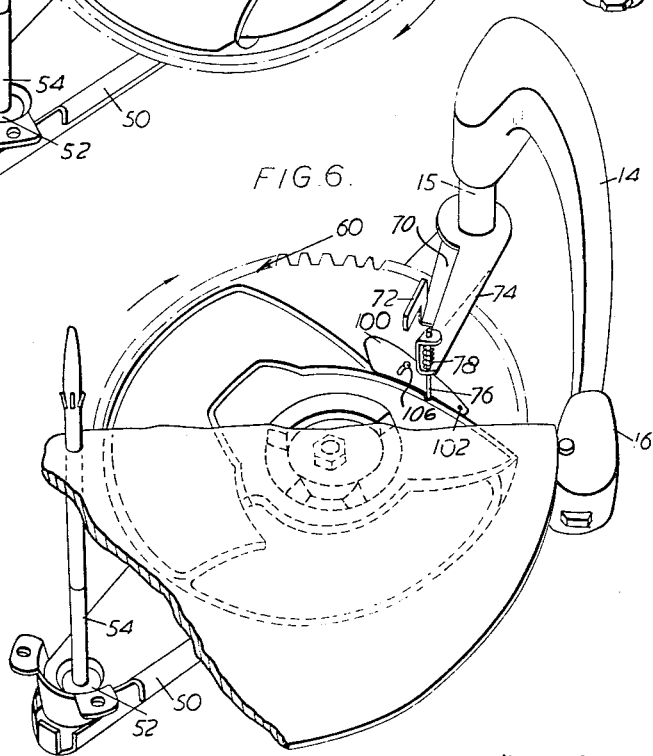

May 21, 1963 H. C. HANSEN 3,090,624
MAGAZINE PHONOGRAPHS
Filed Aug. 7, 1956 68 Sheets-Sheet 4

Inventor
HANS CHRISTIAN HANSEN

By Dicke & Craig
Attorneys

May 21, 1963 H. C. HANSEN 3,090,624
MAGAZINE PHONOGRAPHS
Filed Aug. 7, 1956 68 Sheets-Sheet 5

Inventor
HANS CHRISTIAN HANSEN

By Dicke & Craig
Attorneys

May 21, 1963 H. C. HANSEN 3,090,624
MAGAZINE PHONOGRAPHS
Filed Aug. 7, 1956 68 Sheets-Sheet 6

Inventor
HANS CHRISTIAN HANSEN
By Dicke & Craig
Attorneys

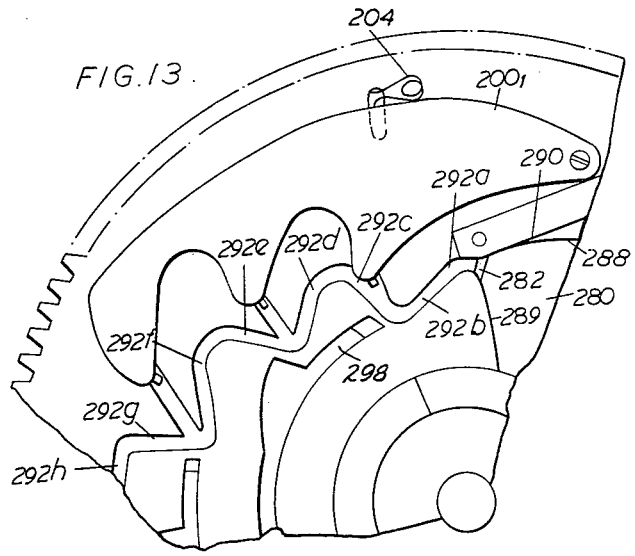
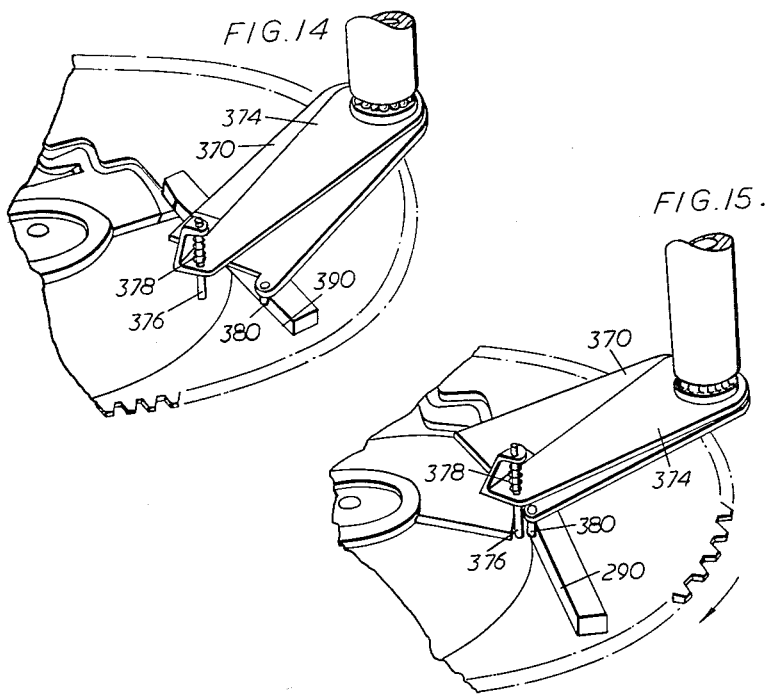

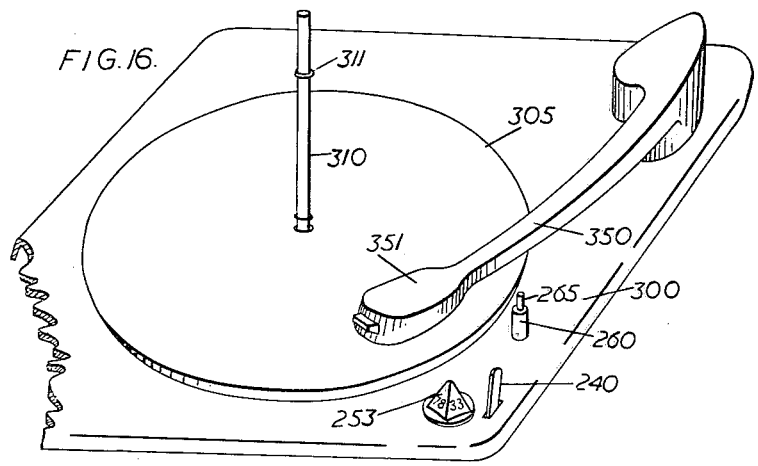
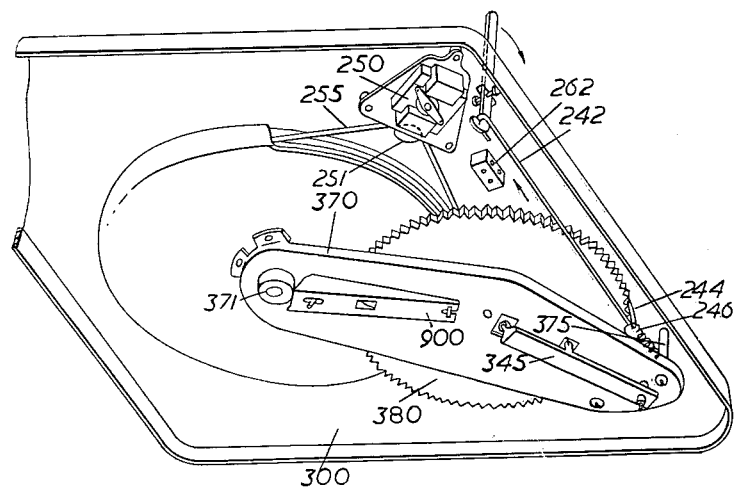

May 21, 1963 H. C. HANSEN 3,090,624
MAGAZINE PHONOGRAPHS
Filed Aug. 7, 1956 68 Sheets-Sheet 9
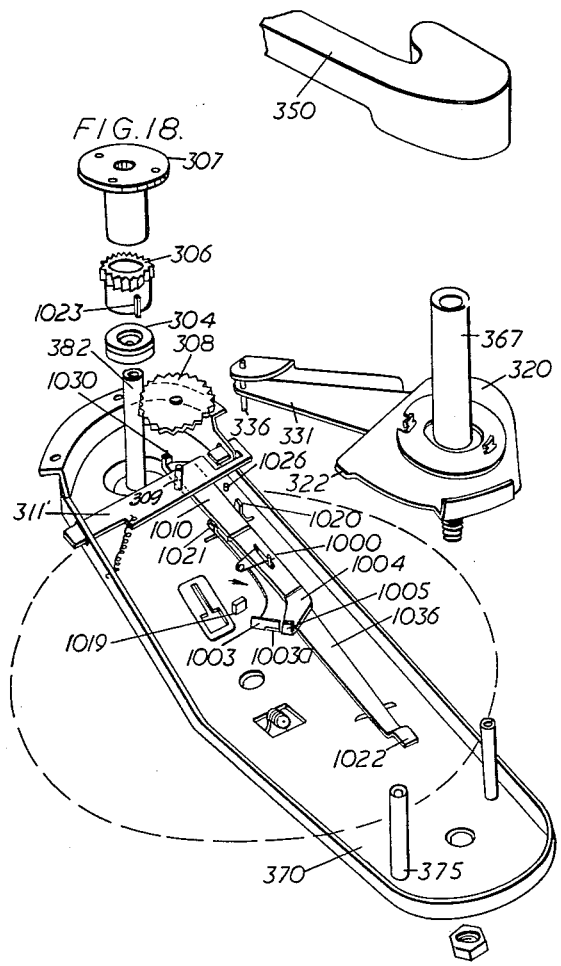
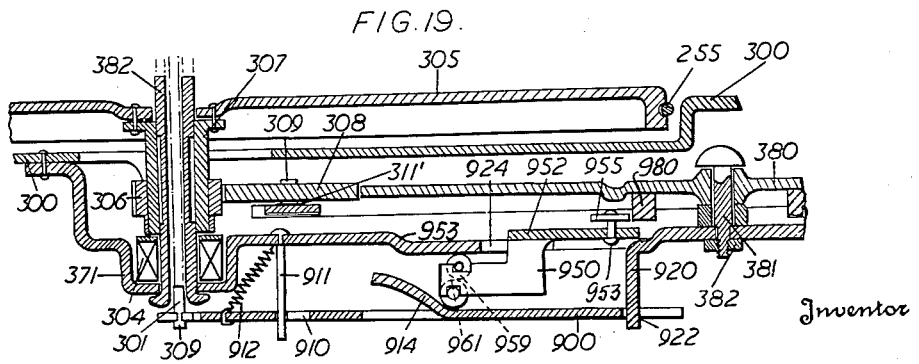
Inventor
HANS CHRISTIAN HANSEN
By Dicke & Craig
Attorneys May 21, 1963 H. C. HANSEN 3,090,624
MAGAZINE PHONOGRAPHS
Filed Aug. 7, 1956 68 Sheets-Sheet 10

Inventor
HANS CHRISTIAN HANSEN
By
Dicke & Craig
Attorneys

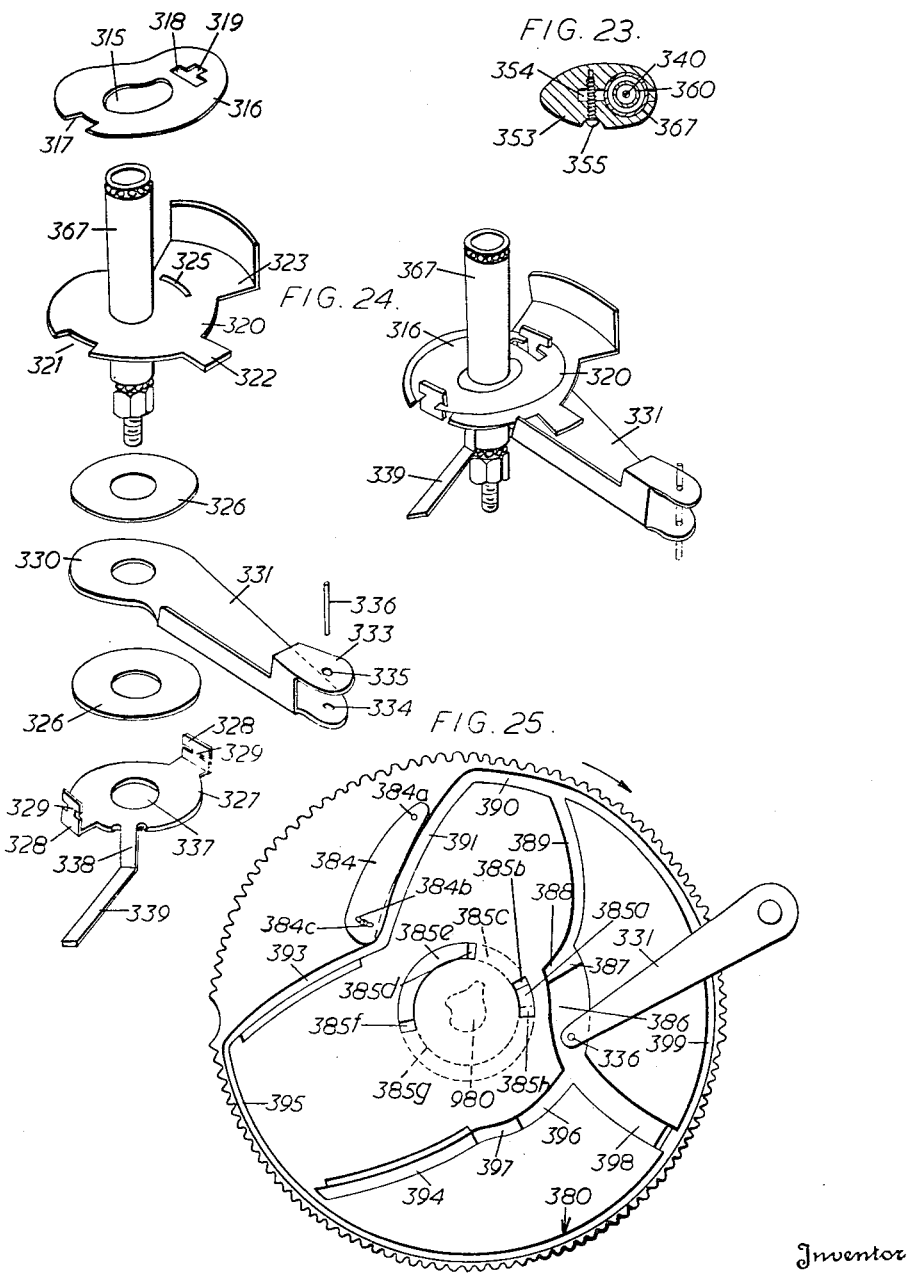

May 21, 1963 H. C. HANSEN 3,090,624
MAGAZINE PHONOGRAPHS
Filed Aug. 7, 1956 68 Sheets-Sheet 12
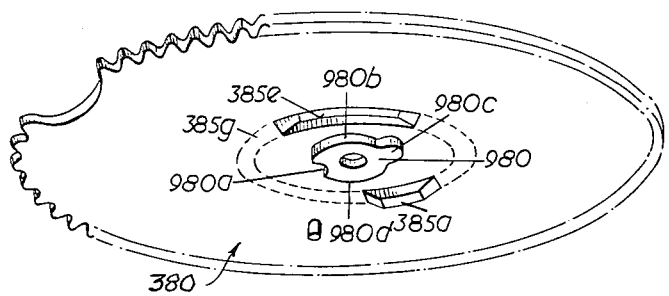
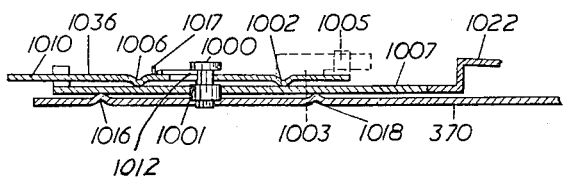
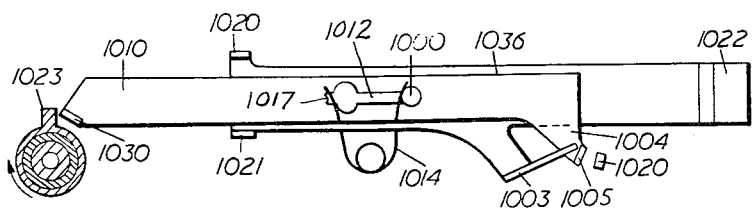
Inventor
HANS CHRISTIAN HANSEN
By Dicke & Craig
Attorneys

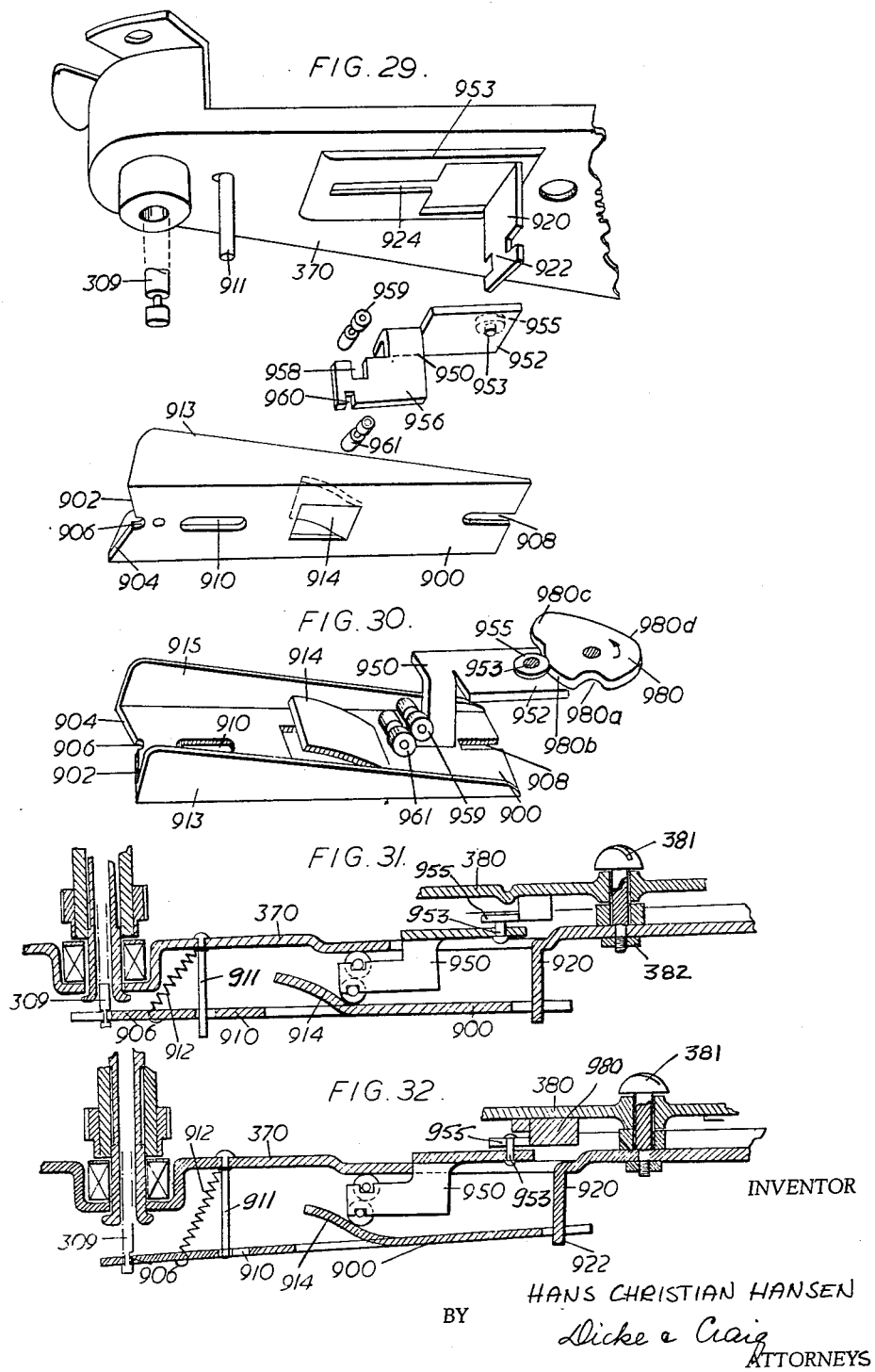

May 21, 1963  H. C. HANSEN  3,090,624
MAGAZINE PHONOGRAPHS

Filed Aug. 7, 1956  68 Sheets-Sheet 14

Inventor
HANS CHRISTIAN HANSEN
By Dicke & Craig
Attorneys

May 21, 1963     H. C. HANSEN     3,090,624
MAGAZINE PHONOGRAPHS

Filed Aug. 7, 1956     68 Sheets-Sheet 15

Inventor
HANS CHRISTIAN HANSEN
By Dicke & Craig
Attorneys

May 21, 1963 H. C. HANSEN 3,090,624
MAGAZINE PHONOGRAPHS

Filed Aug. 7, 1956 68 Sheets-Sheet 17

Inventor
HANS CHRISTIAN HANSEN
By Dicke & Craig
Attorneys

May 21, 1963  H. C. HANSEN  3,090,624
MAGAZINE PHONOGRAPHS

Filed Aug. 7, 1956  68 Sheets-Sheet 19

Inventor
HANS CHRISTIAN HANSEN
By Dicke & Craig
Attorneys

May 21, 1963 H. C. HANSEN 3,090,624
MAGAZINE PHONOGRAPHS
Filed Aug. 7, 1956 68 Sheets-Sheet 21

Inventor
HANS CHRISTIAN HANSEN
By Dicke & Craig
Attorneys

May 21, 1963　　　　　H. C. HANSEN　　　　　3,090,624
MAGAZINE PHONOGRAPHS

Filed Aug. 7, 1956　　　　　　　　　　　68 Sheets-Sheet 22

Inventor
HANS CHRISTIAN HANSEN

By Dicke & Craig
Attorneys

May 21, 1963 H. C. HANSEN 3,090,624
MAGAZINE PHONOGRAPHS
Filed Aug. 7, 1956 68 Sheets-Sheet 24

Inventor
HANS CHRISTIAN HANSEN
By Dicke & Craig
Attorneys

May 21, 1963     H. C. HANSEN     3,090,624
MAGAZINE PHONOGRAPHS

Filed Aug. 7, 1956     68 Sheets-Sheet 26

Inventor

HANS CHRISTIAN HANSEN

By Dicke & Craig

Attorneys

May 21, 1963 H. C. HANSEN 3,090,624
MAGAZINE PHONOGRAPHS
Filed Aug. 7, 1956 68 Sheets-Sheet 28

Inventor
HANS CHRISTIAN HANSEN
By Dicke & Craig
Attorneys

May 21, 1963  H. C. HANSEN  3,090,624
MAGAZINE PHONOGRAPHS
Filed Aug. 7, 1956  68 Sheets-Sheet 30

Inventor
HANS CHRISTIAN HANSEN
By Dicke & Craig
Attorneys

May 21, 1963 H. C. HANSEN 3,090,624
MAGAZINE PHONOGRAPHS

Filed Aug. 7, 1956 68 Sheets-Sheet 31

Inventor
HANS CHRISTIAN HANSEN
By
Dicke & Craig
Attorneys

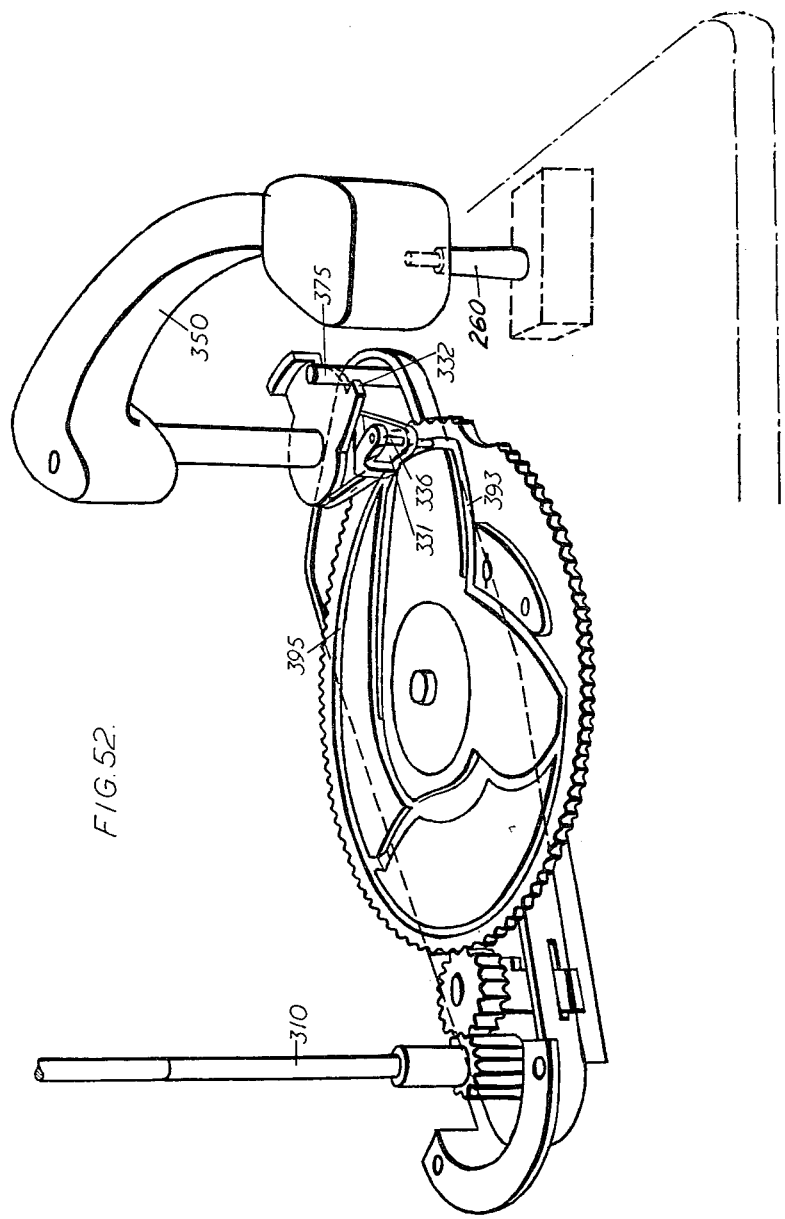

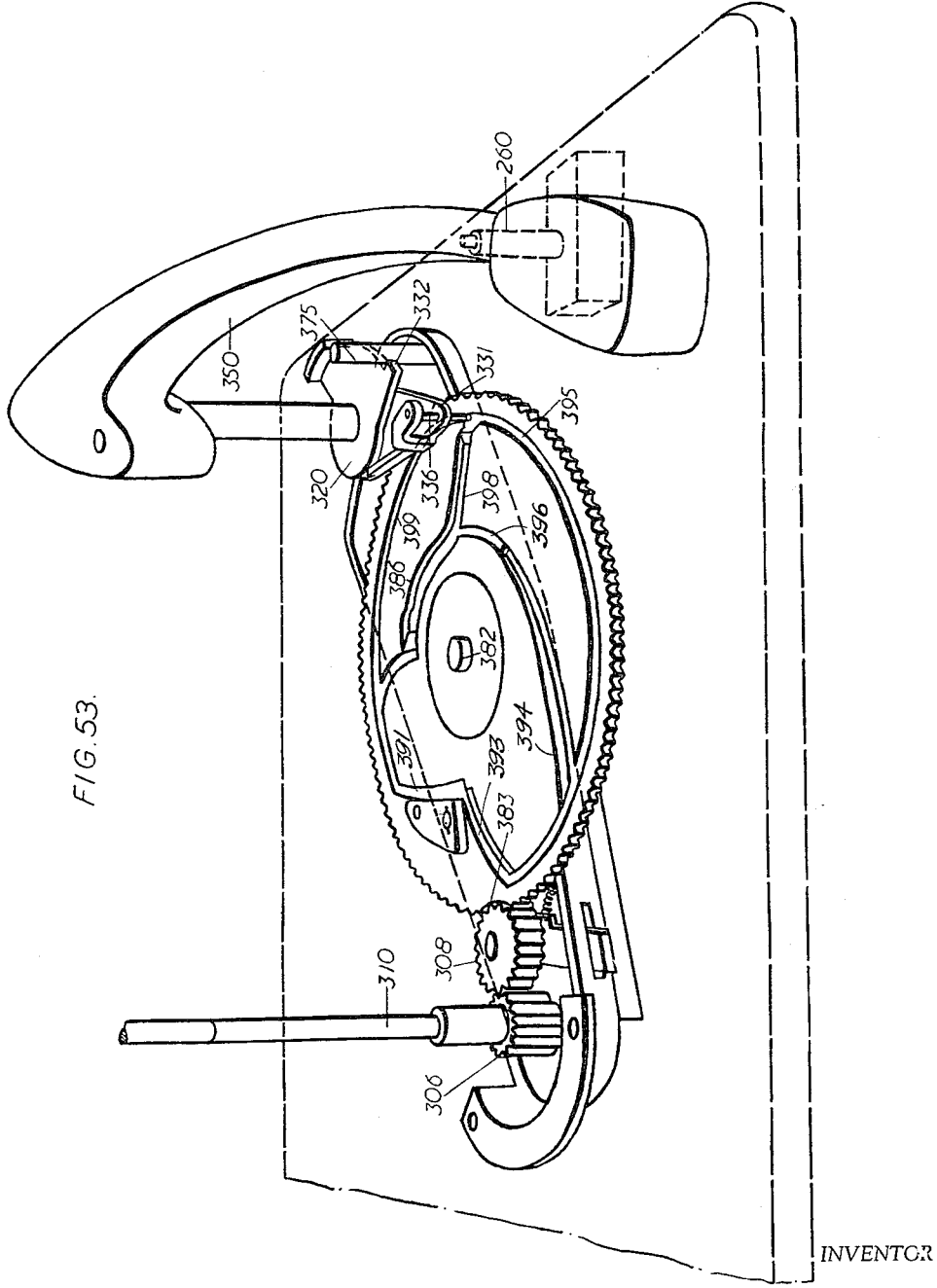

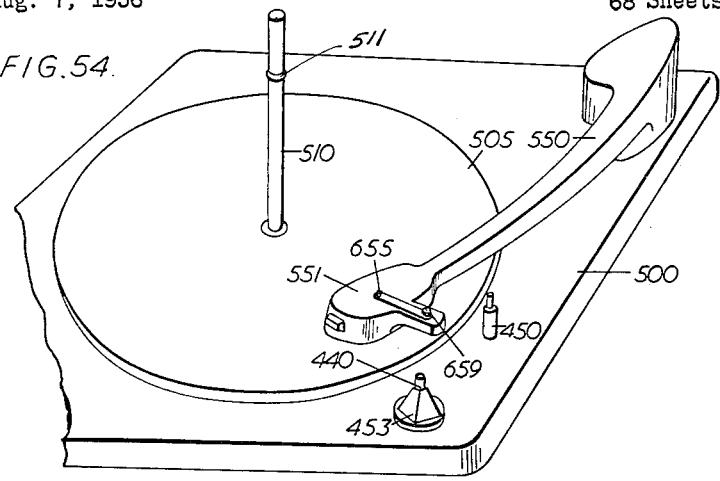
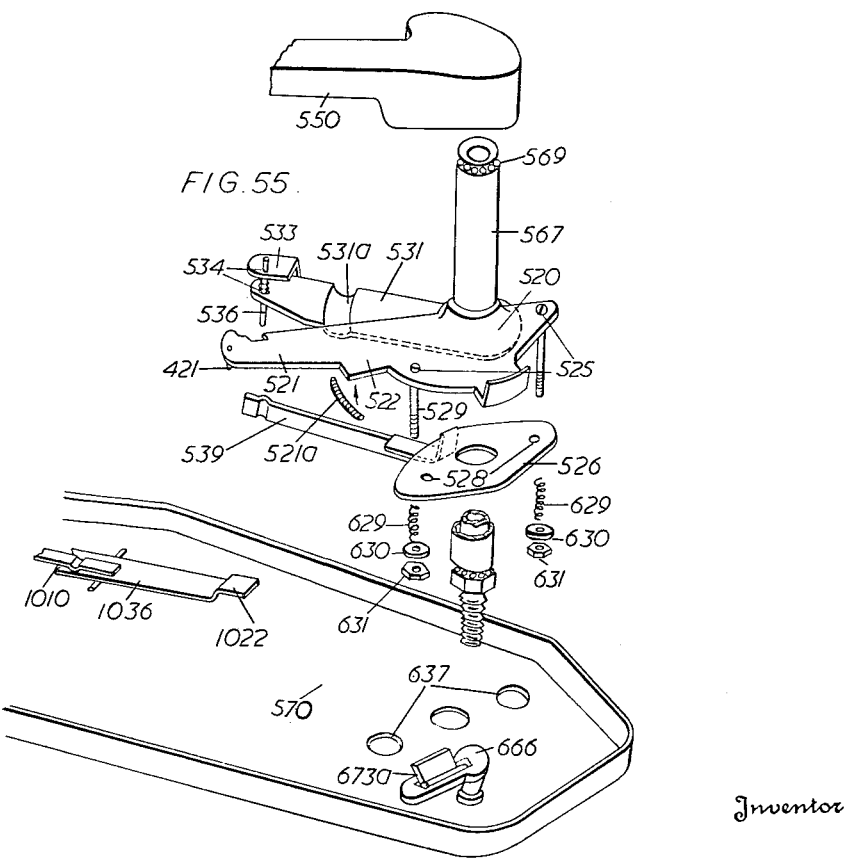

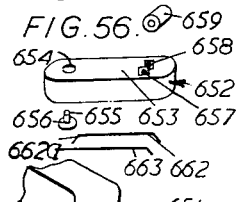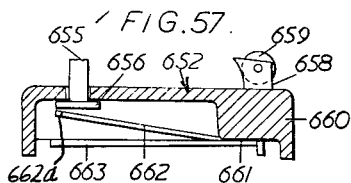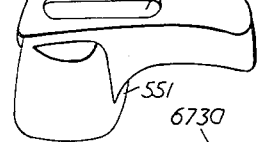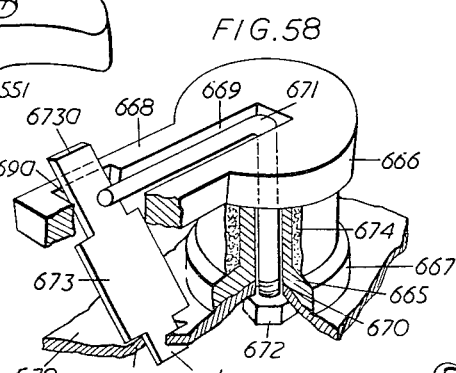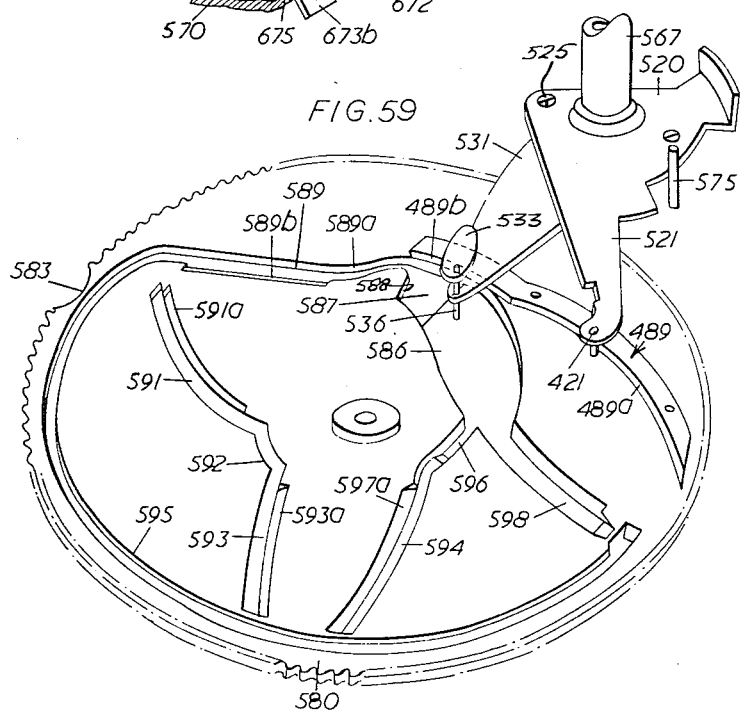

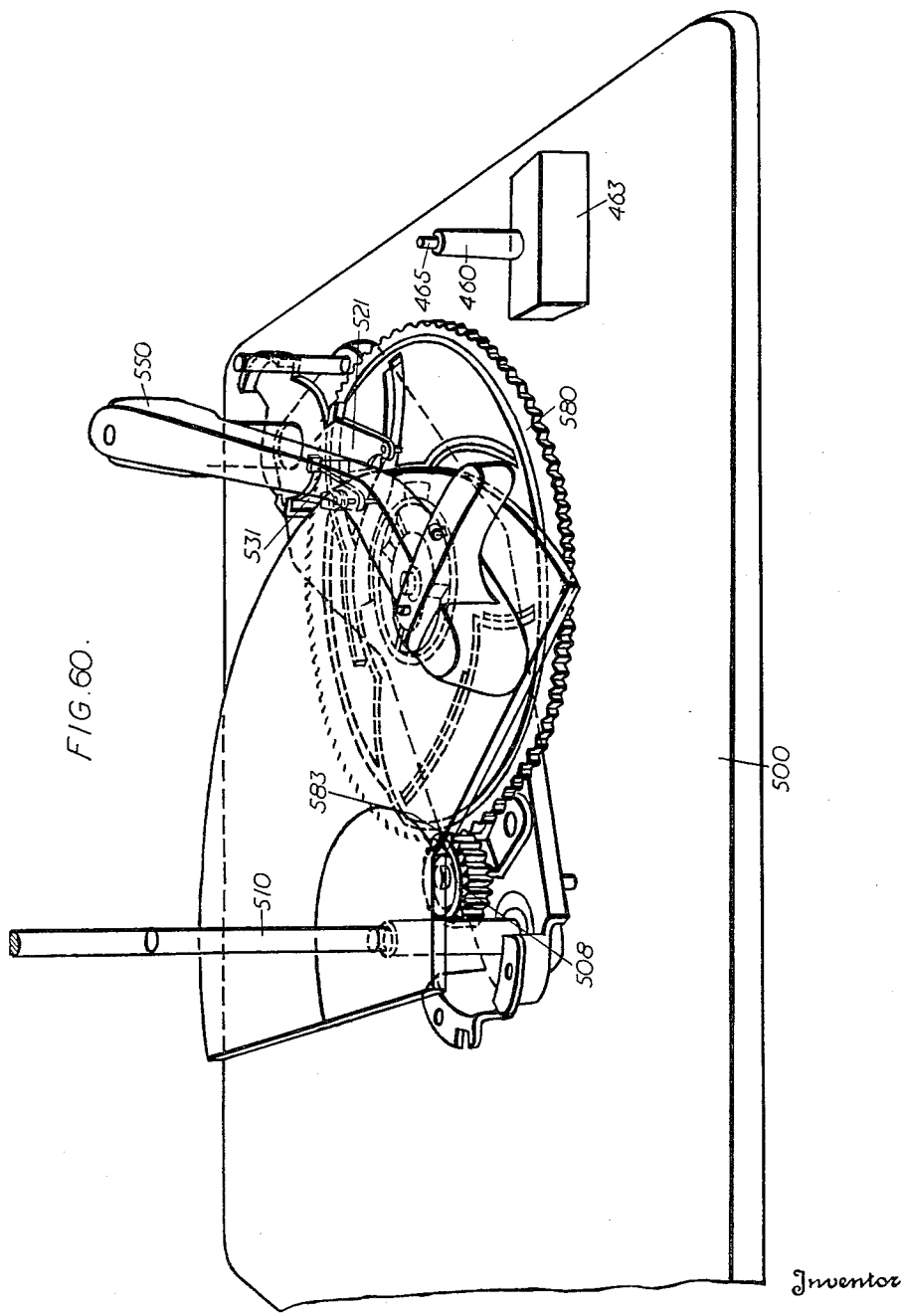

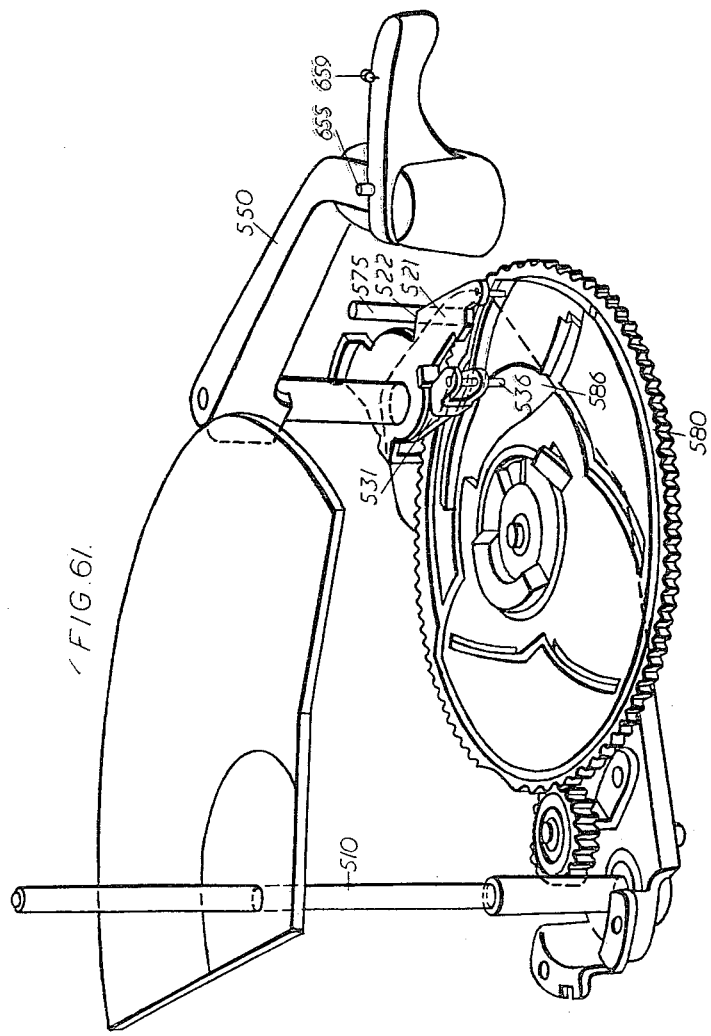

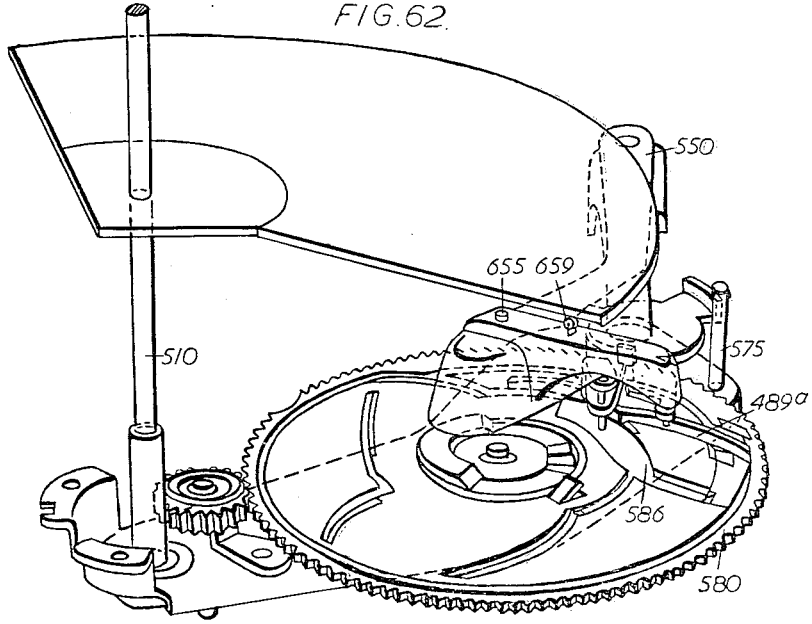
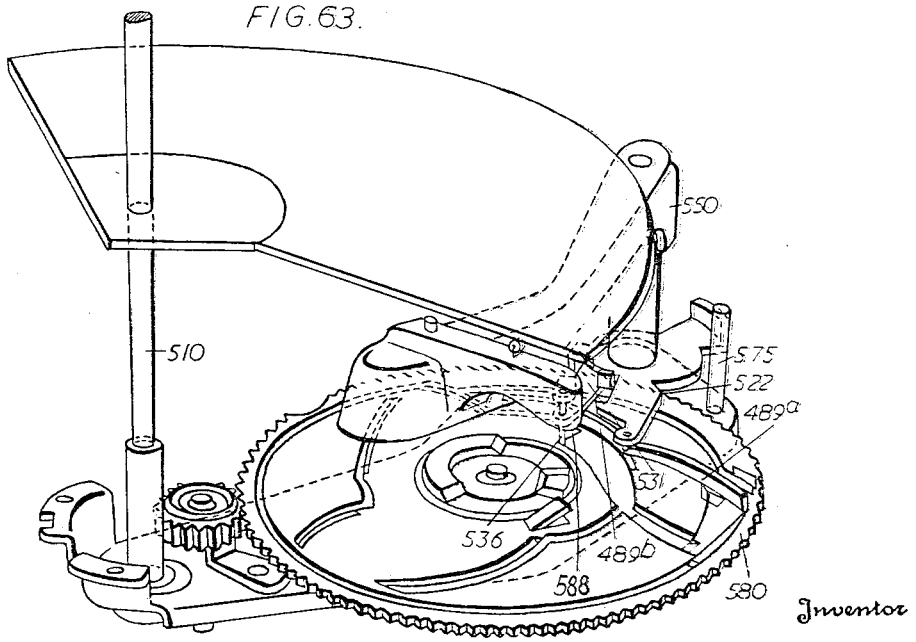

May 21, 1963  H. C. HANSEN  3,090,624
MAGAZINE PHONOGRAPHS
Filed Aug. 7, 1956  68 Sheets-Sheet 40

Inventor
HANS CHRISTIAN HANSEN
By
Dicke & Craig
Attorneys

May 21, 1963 H. C. HANSEN 3,090,624
MAGAZINE PHONOGRAPHS
Filed Aug. 7, 1956 68 Sheets-Sheet 41

Inventor
HANS CHRISTIAN HANSEN
By
Dicke & Craig
Attorneys

May 21, 1963 H. C. HANSEN 3,090,624
MAGAZINE PHONOGRAPHS
Filed Aug. 7, 1956 68 Sheets-Sheet 42
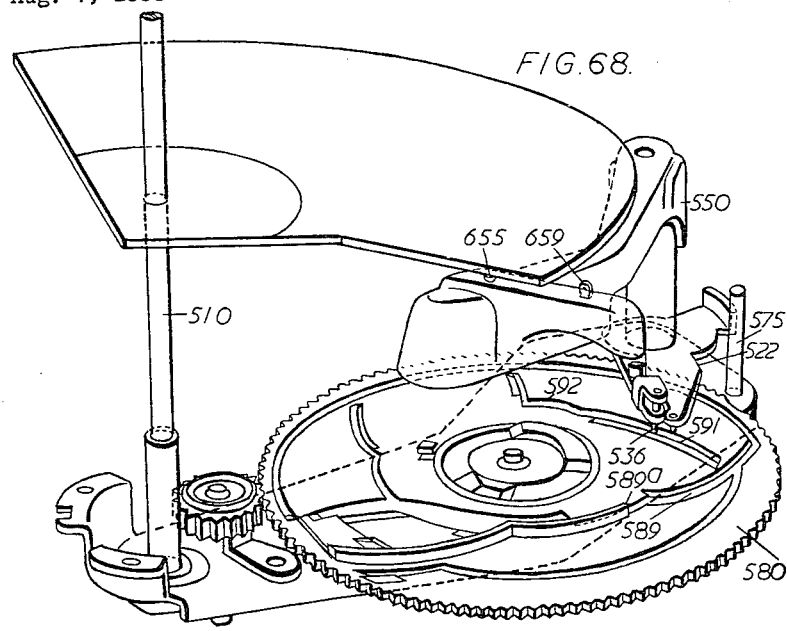
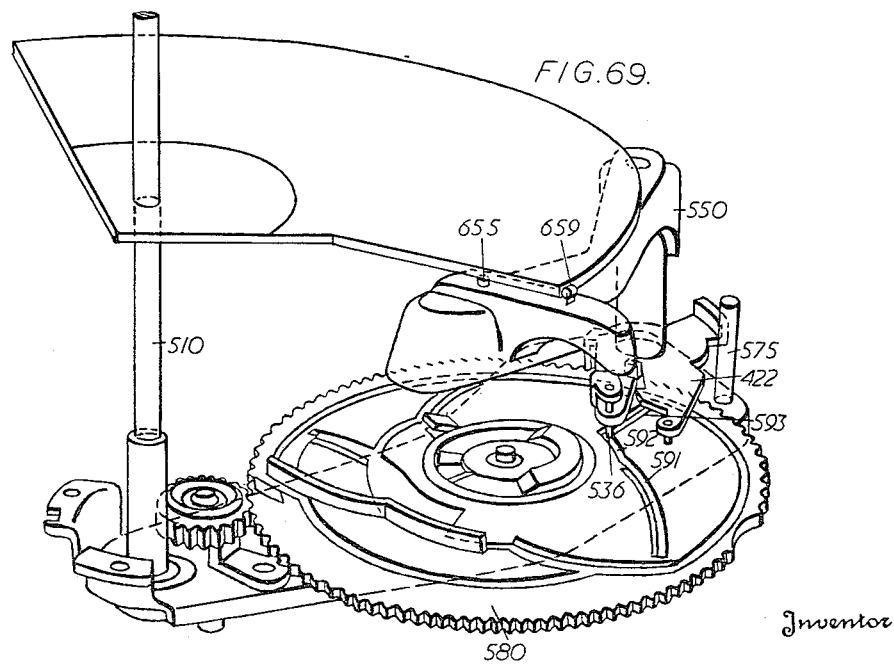
Inventor
HANS CHRISTIAN HANSEN
By Dicke & Craig
Attorneys

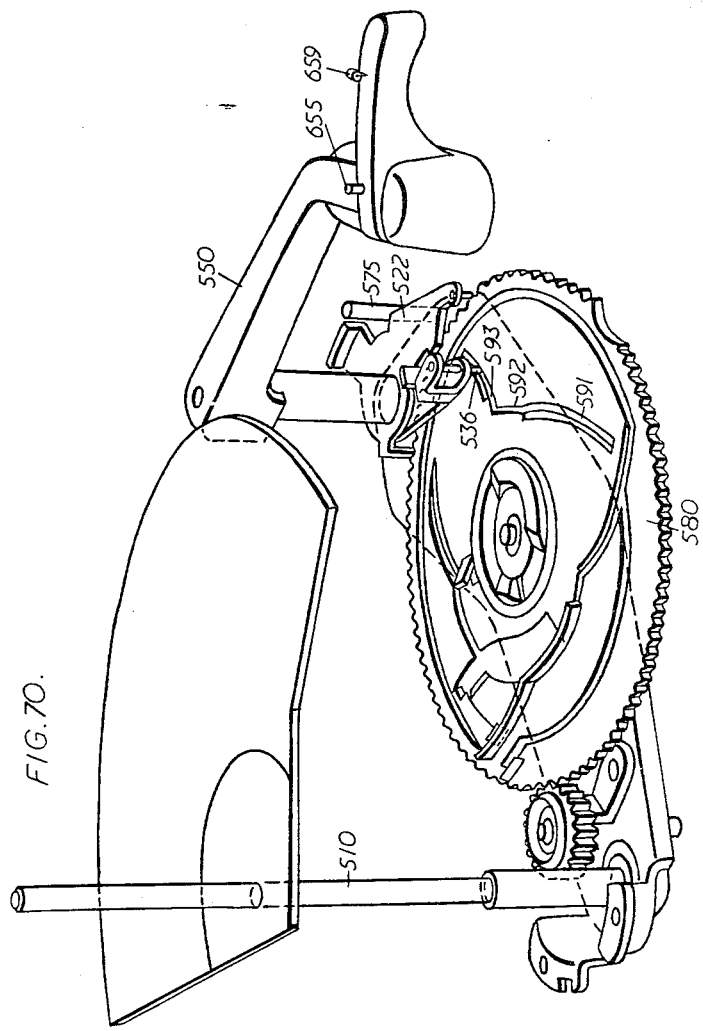

May 21, 1963  H. C. HANSEN  3,090,624
MAGAZINE PHONOGRAPHS
Filed Aug. 7, 1956  68 Sheets-Sheet 44
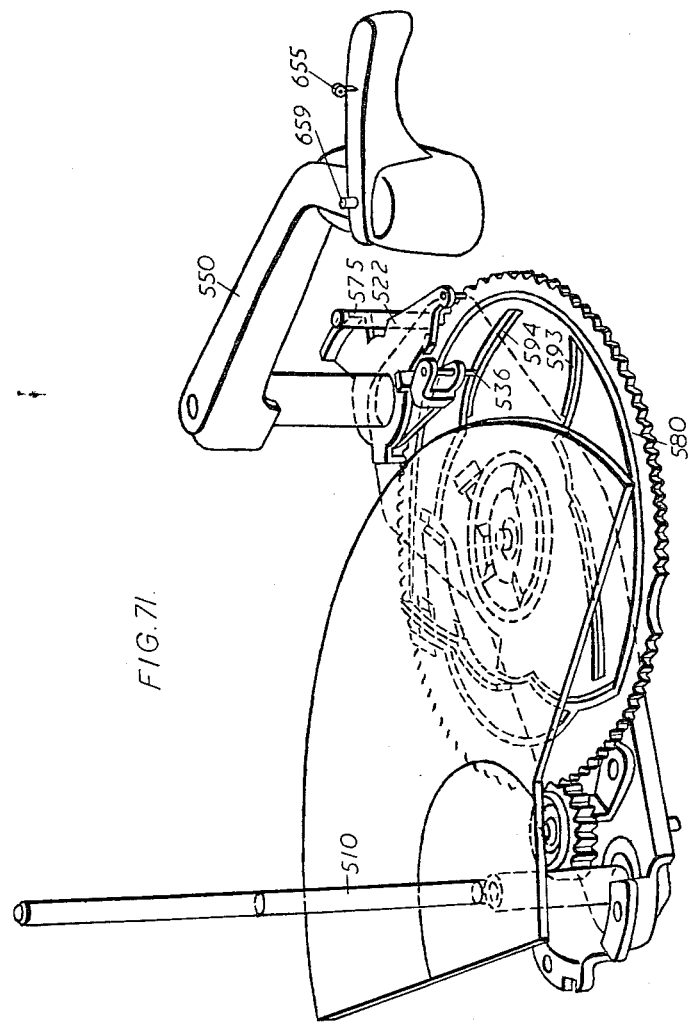
Inventor
HANS CHRISTIAN HANSEN
By
Dicke & Craig
Attorneys May 21, 1963 H. C. HANSEN 3,090,624
MAGAZINE PHONOGRAPHS
Filed Aug. 7, 1956 68 Sheets-Sheet 45

Inventor
HANS CHRISTIAN HANSEN
By
Dicke & Craig
Attorneys

May 21, 1963 H. C. HANSEN 3,090,624
MAGAZINE PHONOGRAPHS
Filed Aug. 7, 1956 68 Sheets-Sheet 47

Inventor
HANS CHRISTIAN HANSEN
By
Dicke & Craig
Attorneys

May 21, 1963 H. C. HANSEN 3,090,624
MAGAZINE PHONOGRAPHS
Filed Aug. 7, 1956 68 Sheets-Sheet 49

Inventor
HANS CHRISTIAN HANSEN
By
Dicke & Craig
Attorneys

May 21, 1963 H. C. HANSEN 3,090,624
MAGAZINE PHONOGRAPHS
Filed Aug. 7, 1956 68 Sheets-Sheet 53

Inventor
HANS CHRISTIAN HANSEN
By Dicke & Craig
Attorneys

May 21, 1963  H. C. HANSEN  3,090,624
MAGAZINE PHONOGRAPHS
Filed Aug. 7, 1956  68 Sheets-Sheet 54
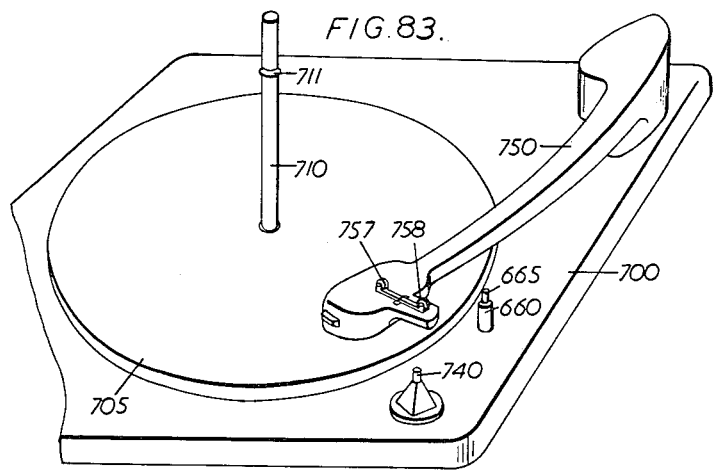
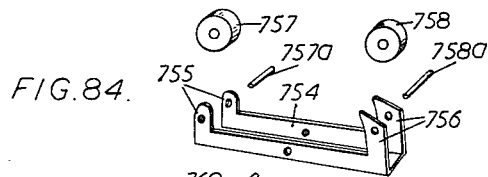
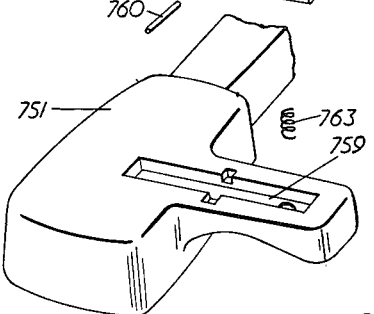
Inventor
HANS CHRISTIAN HANSEN
By Dicke & Craig
Attorneys

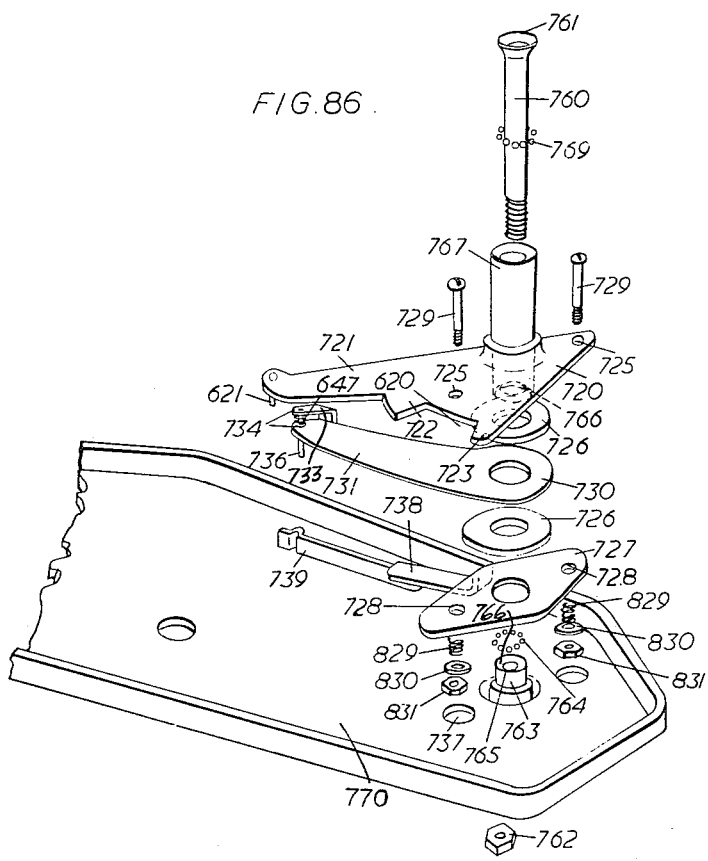

May 21, 1963 H. C. HANSEN 3,090,624
MAGAZINE PHONOGRAPHS
Filed Aug. 7, 1956 68 Sheets-Sheet 56
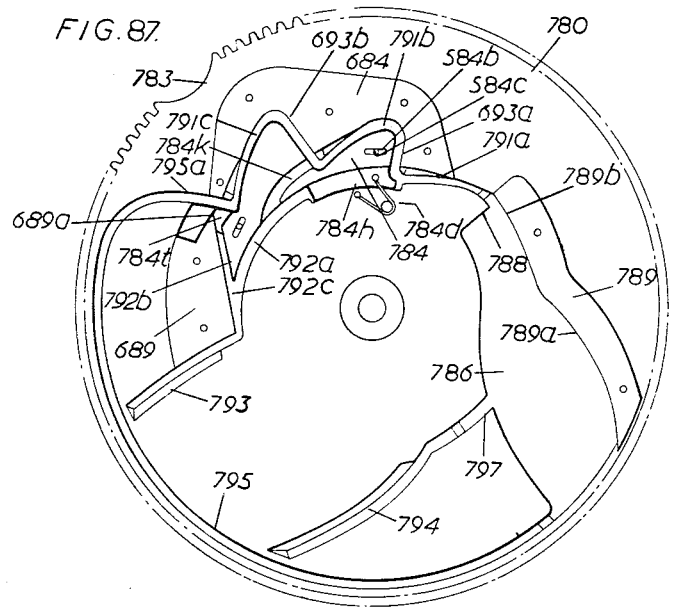
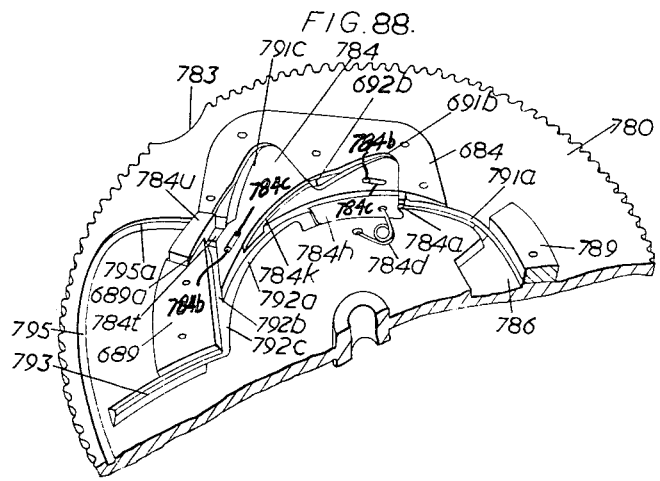
Inventor
HANS CHRISTIAN HANSEN
By Dicke & Craig
Attorneys May 21, 1963 H. C. HANSEN 3,090,624
MAGAZINE PHONOGRAPHS
Filed Aug. 7, 1956 68 Sheets-Sheet 57

Inventor
HANS CHRISTIAN HANSEN
By Dicke & Craig
Attorneys

Inventor
HANS CHRISTIAN HANSEN
By Dicke & Craig
Attorneys

May 21, 1963    H. C. HANSEN    3,090,624
MAGAZINE PHONOGRAPHS
Filed Aug. 7, 1956    68 Sheets-Sheet 59
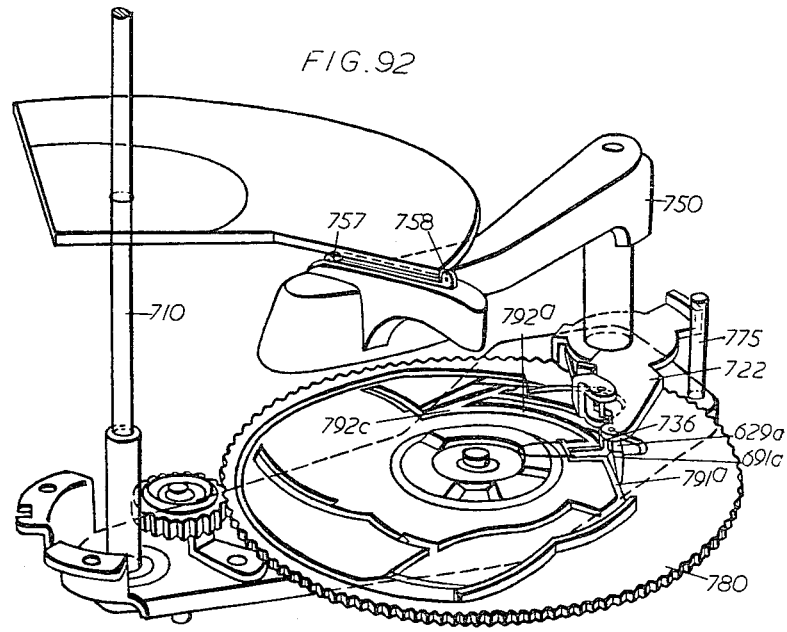
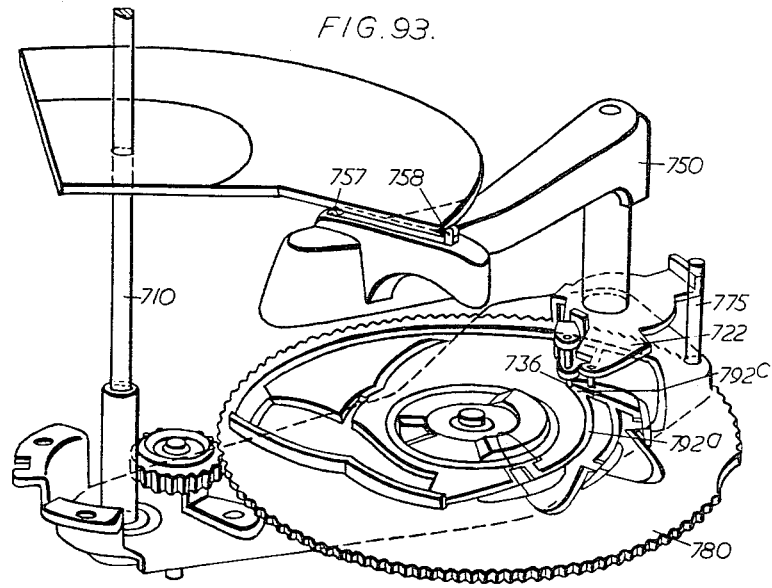
Inventor
HANS CHRISTIAN HANSEN
By Dicke & Craig
Attorneys May 21, 1963 H. C. HANSEN 3,090,624
MAGAZINE PHONOGRAPHS
Filed Aug. 7, 1956 68 Sheets-Sheet 60

Inventor
Hans Christian Hansen
By Dicke & Craig
Attorneys

May 21, 1963   H. C. HANSEN   3,090,624
MAGAZINE PHONOGRAPHS
Filed Aug. 7, 1956   68 Sheets-Sheet 62

Inventor
Hans Christian Hansen
By Dicke & Craig
Attorneys

Inventor
Hans Christian Hansen
By Dicke & Craig
Attorneys

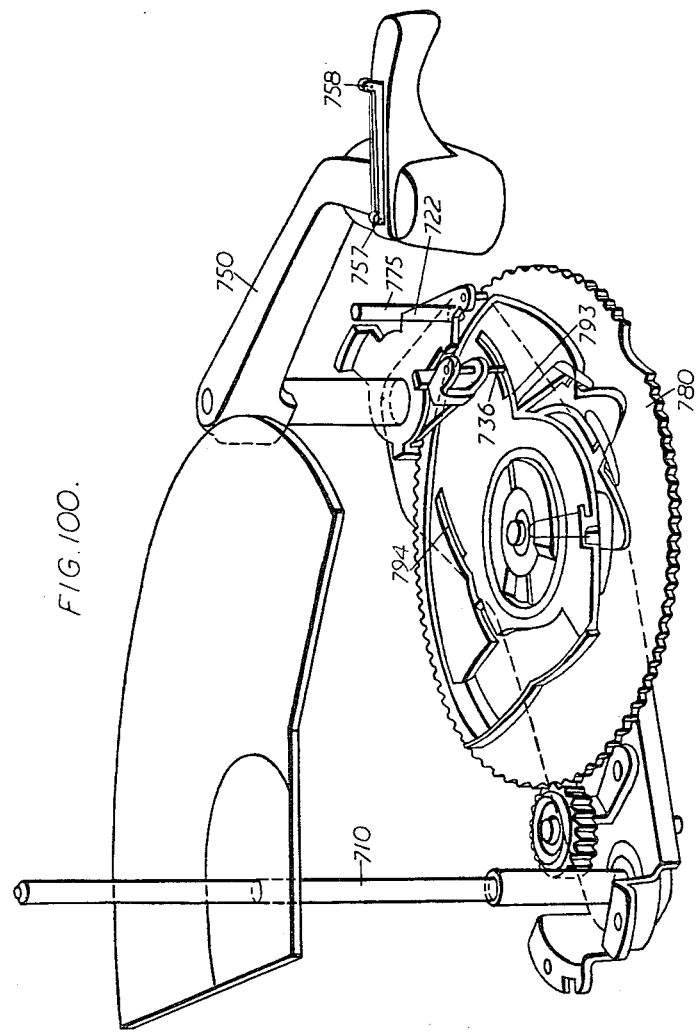

May 21, 1963  H. C. HANSEN  3,090,624
MAGAZINE PHONOGRAPHS

Filed Aug. 7, 1956  68 Sheets-Sheet 65

Inventor
Hans Christian Hansen
By Dicke & Craig
Attorneys

Inventor
Hans Christian Hansen
By Dicke & Craig
Attorneys

May 21, 1963

H. C. HANSEN 3,090,624

MAGAZINE PHONOGRAPHS

Filed Aug. 7, 1956

68 Sheets-Sheet 68

Inventor
Hans Christian Hansen
By Dicke & Craig
Attorneys

United States Patent Office 3,090,624
Patented May 21, 1963

3,090,624
MAGAZINE PHONOGRAPHS
Hans Christian Hansen, 14 Christianholmsvej,
Klampenborg, Copenhagen, Denmark
Filed Aug. 7, 1956, Ser. No. 602,589
Claims priority, application Great Britain Aug. 8, 1955
47 Claims. (Cl. 274—10)

This is a continuation-in-part application of my applications Ser. No. 225,946 filed May 12, 1951, now abandoned, and Ser. No. 530,450 filed August 25, 1955, now Patent No. 3,038,727.

The invention relates to magazine phonographs, and more particularly to phonographs for playing a plurality of records of different sizes.

It is a purpose of the invention to provide a magazine phonograph that will enable the records to be played irrespectively of the fact whether they are in mixed relationship with respect to their size.

Another object of the invention is to provide a magazine phonograph that will enable any size of records to be played, also sizes that are not standard sizes.

Still a further object of the invention is to provide a magazine phonograph that is simple in construction and reliable in operation.

Still a further purpose of the invention is to provide a phonograph which alternatively can be used as a record changing phonograph or as a single player.

Another purpose of the invention is to provide a phonograph which when used as a single player automatically will be stopped after playing of a record.

Another purpose of the invention is to provide a phonograph which when used as a record changing phonograph will be able to stop after playing of the last record.

Still a further purpose is to provide a stop arrangement for a phonograph that is simple in construction and reliable in operation.

A further purpose of the invention is to provide a stop mechanism that involves an automatic movement of the tone arm after playing of a record to a position outside the periphery of the turntable and in which means are provided to stop the phonograph with the tone arm in this position.

Another purpose is to provide a phonograph in which the weight of the tone arm is used to actuate the stop mechanism.

Still a further object of the invention is to provide a stop mechanism that is capable of being operated automatically after playing of a record as well as capable of bringing the phonograph to stop at will by lifting the tone arm from the record during playing thereof and bringing it to its position of rest.

Another purpose of the invention is to provide a phonograph in which the tone arm itself acts as a feeler member for testing the size of the next record to be played.

Another purpose of the invention is to provide a phonograph in which the tone arm acts as a feeler for testing the size of a record to be played and in which further the absence of a record in the test position will cause the tone arm to move to a position in which the phonograph is automatically stopped.

Still another purpose of the invention is to provide a control mechanism for a record changing phonograph that includes a cam disc which is driven from a gear from a continuously rotating spindle, for example the center spindle of the turntable in such a manner that this gear is engaged after playing of a record to start movement of the cam disc and disengaged when the pickup arm has completed its cycle and has landed on the next record to be played with the stylus in engagement with the initial groove thereof.

Still a further purpose of the invention is to provide a phonograph having such cam disc in which the latter through a simplified mechanism is capable of controlling the movements of the tone arm to perform the function of testing the size of the next record to be played and following such test to be landed appropriately on the record after the latter has been supplied to the playing position.

Still a further purpose of the invention is to provide a phonograph having such cam disc mechanism in which the latter is connected with the tone arm of the phonograph through an arm having a cam track follower capable of following various tracks in the cam disc in such a manner that said cam tracks are selected or portions thereof are selected according to the size of records.

Still a further purpose of the invention is to provide a mechanism including such cam disc and cam track follower arm as described hereinabove in which said cam track follower arm is capable of moving relatively to the tone arm if the size of a record is tested.

Still a further purpose of the invention is to provide such mechanism having a track follower arm capable of moving relatively to the tone arm when a record is tested in which the cam mechanism includes further tracks that will move the cam track follower in a different path from those through which the cam track follower is moved when a record is tested and in which further means are provided operable during such further movement of the cam track follower to actuate a switch mechanism to stop the phonograph.

Figure 8:
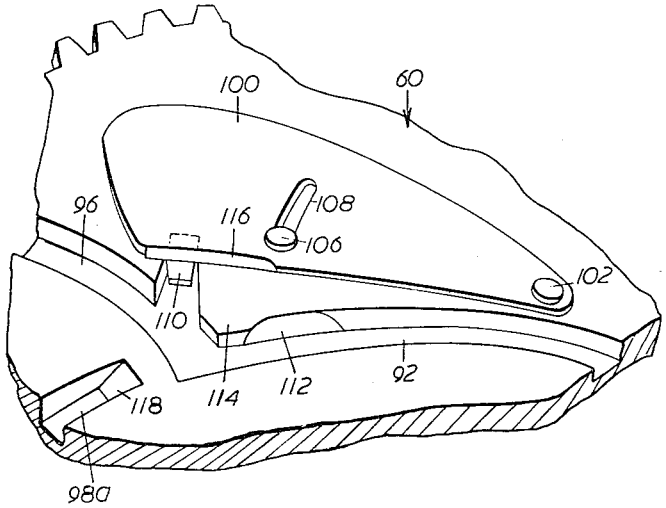
Figure 9:
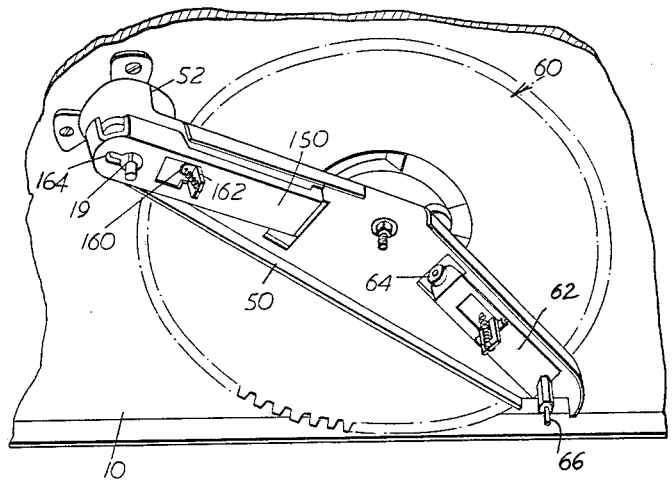
Figure 10:
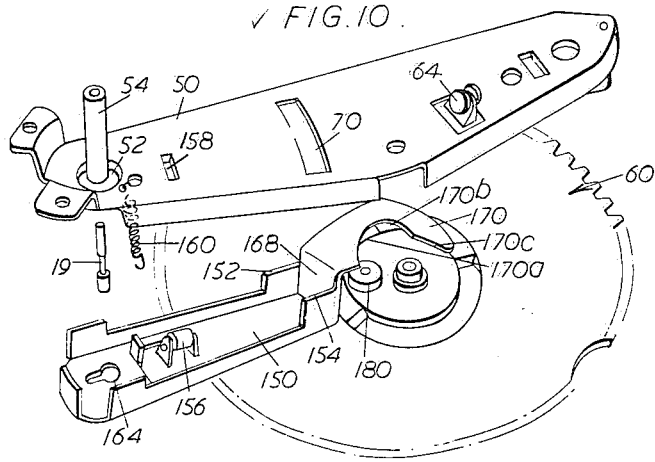
Figure 11:
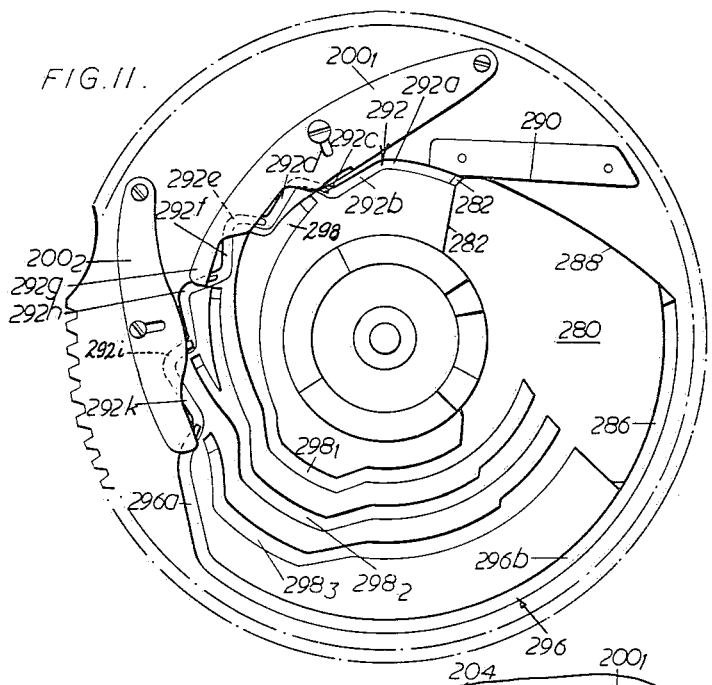
Figure 12:
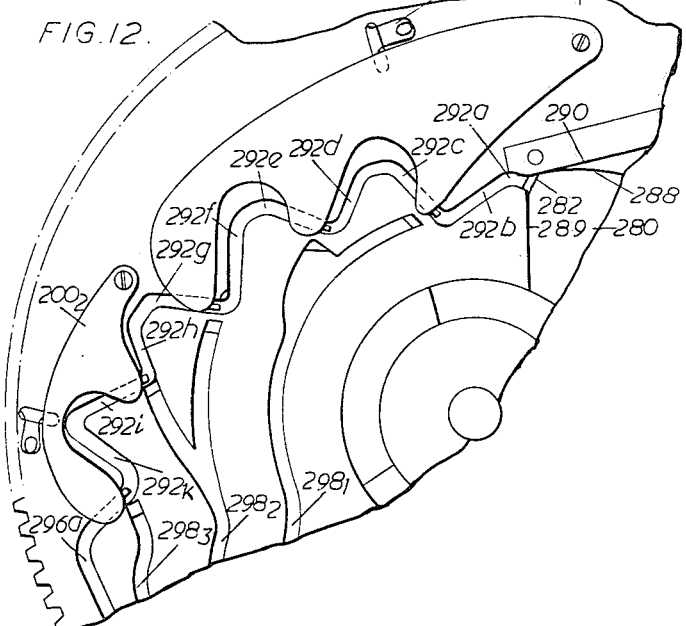

The invention will now be further explained with reference to the drawing, in which FIGURE 1 is a general perspective view of one embodiment of a record changing phonograph according to the invention, seen from the top side, FIGURE 2 is a part of the record changing phonograph in perspective view seen from the bottom, FIGURE 2a is a section through an embodiment of the switch mechanism, FIGURE 3 is a plane view of the cam disc in one embodiment, FIGURE 4 is a perspective view of the cam disc and tone arm in one position of the cam disc, FIGURE 5 is a view corresponding to FIGURE 4 in another position of the cam disc, FIGURE 6 is a view corresponding to FIGURE 4 in a third position of the parts, FIGURE 7 is a detail of the cam disc in enlarged perspective view with the cam track selector means in one position, FIGURE 8 is a detail as shown on FIGURE 7 with the cam track selector means in another position, FIGURE 9 is a perspective view of the cam disc with the means for moving the tone arm in the vertical direction and the means for controlling the drop of the records seen from the bottom of the record changer, FIGURE 10 is an exploded view of the parts shown in FIGURE 9, FIGURE 11 is a plan view of the cam disc in another embodiment, FIGURE 12 is a part of the cam disc shown in FIGURE 11 on an enlarged scale with the cam track selector means in one position.

Figure 20:
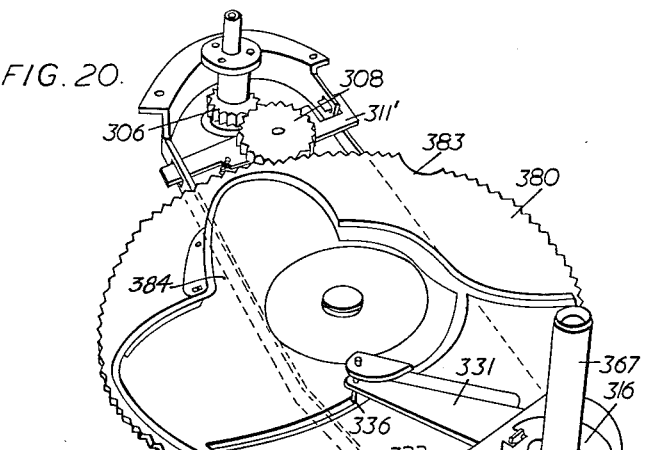
Figure 21:
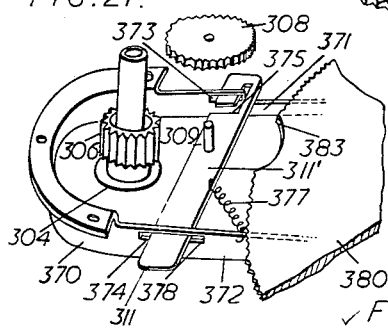
Figure 22:
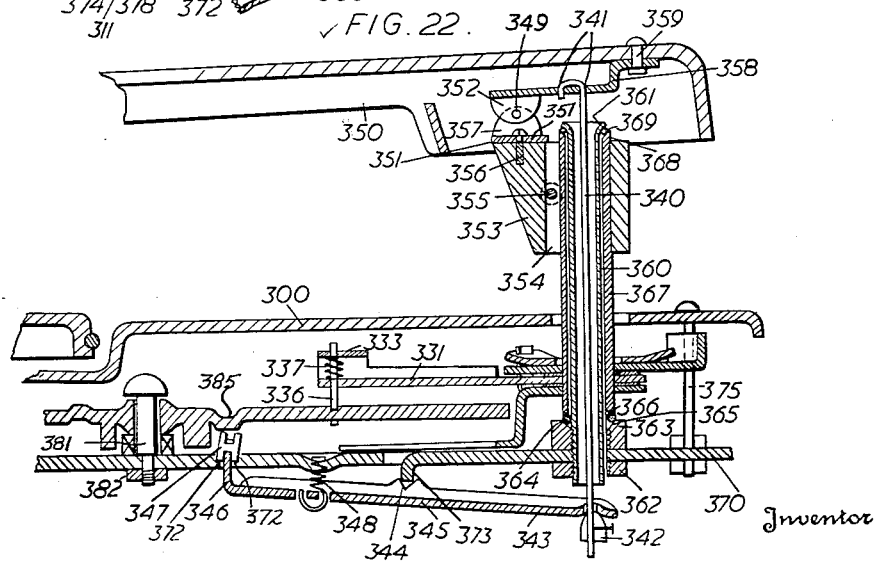
Figure 89:
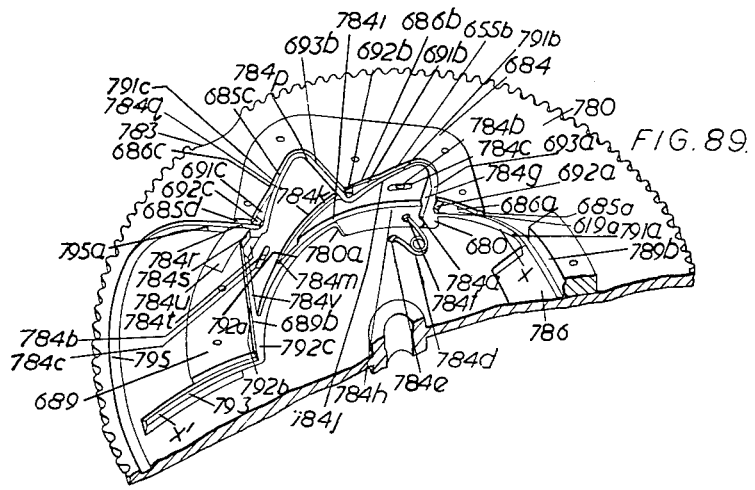
Figure 107:
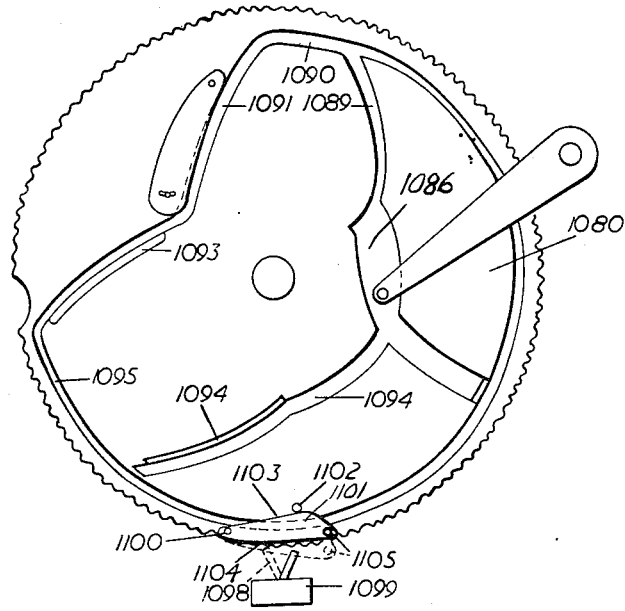

FIGURE 13 is a plan view as shown in FIGURE 12 with the cam track selector means in another position, FIGURE 14 is a perspective view of a part of the cam disc with the cam track follower and the trip starter operating arm in one position, and FIGURE 15 is a perspective view as shown in FIGURE 14 with the parts in another position, FIGURE 16 is a general perspective view of another embodiment of a record changing phonograph according to the invention seen from the top side, FIGURE 17 is a corresponding view seen from below, FIGURE 18 is a partly exploded view of the bridge in FIGURE 17 including the parts secured thereto, seen from above, FIGURE 19 is a vertical section through the hollow turntable spindle, showing the turntable supporting arrangement, FIGURE 20 is a perspective view of the bridge seen from the top, FIGURE 21 is a partly exploded view of the driving arrangement for the cam disc, FIGURE 22 is a vertical section through the hollow tone arm shaft showing the tone arm supporting arrangement, the friction link and the means for moving the tone arm in the vertical direction, FIGURE 23 is a horizontal section through the upper end of the tone arm shaft, FIGURE 24 is an exploded view of the friction link at the lower end of the tone arm shaft, FIGURE 25 is a plan view of the cam disc seen from the top showing the various tracks for controlling the horizontal movements of the tone arm, FIGURE 26 is a perspective view of the cam disc seen from below, FIGURE 27 is a vertical section through the trip starter mechanism shown in FIGURE 18, FIGURE 28 is a plan view of the trip starter mechanism, FIGURE 29 is an exploded view of the means for actuating the record drop controlling mechanism in the centre spindle, as also shown in section in FIGURE 19, FIGURE 30 is a detail of the mechanism shown in FIGURE 29, FIGURE 31 is a vertical section through the mechanism in FIGURE 29, with the parts in another position from that shown in FIGURE 19, FIGURE 32 is a similar section with the parts in a third position, FIGURES 33 to 53 are perspective views of the essential parts of the phonograph in various positions, illustrating the mode of operation by playing, testing and changing records of various sizes, FIGURE 54 is a general perspective view of another embodiment of a record changing phonograph according to the invention, seen from the top, FIGURE 55 is a perspective view of the tone arm and the friction link of the tone arm shaft including an electromagnetic brake arrangement for use in the embodiment shown in FIGURE 54, FIGURE 56 is a partly exploded view of the pickup-head showing the electrical feeler switch member, FIGURE 57 is a vertical section through the feeler switch in FIGURE 56, FIGURE 58 is a perspective view of the electromagnetic brake member, FIGURE 59 is a perspective view of a part of the cam disc and the friction link, seen from above, FIGURES 60 through 82 are perspective views of the essential parts of the phonograph in various positions during playing, testing and changing records of various sizes, FIGURE 83 is a general perspective view of the essential parts of a third embodiment of a record changer according to the invention, FIGURE 84 is a partly exploded view of the pickup-head of FIGURE 83, showing the record size feeling member, FIGURE 85 is a plan front view of the pickup-head including the feeling member, FIGURE 86 is an exploded view of the friction link used in this embodiment, FIGURE 87 is a plan view of the cam disc, FIGURE 88 is a perspective view of a part of the cam disc including a selector plate, FIGURE 89 is a corresponding view with the selector plate in another position, FIGURES 90 through 106 are perspective views of the phonograph for illustrating the mode of operation by testing records of various sizes, FIGURE 107 is a plan view of still another embodiment of a cam disc for use in a phonograph according to the invention.

Referring now to the drawing wherein like reference numerals are used throughout the various views to designate corresponding parts, and more particularly to FIGURE 1, in broad terms the record changing phonograph comprises a base plate 10, a tone arm 14, a turntable 12, an electric motor (not shown) included in a power circuit for driving the turntable with a predetermined speed and a centre spindle 18 having a support 20 for a stack of records to be released sequentially therefrom.

Furthermore the phonograph comprises a cam disc generally designated by reference numeral 60 rotatably supported below the base plate 10 of the phonograph. Said cam disc 60 has a plurality of cam portions 130a–130h for controlling the vertical movements of the tone arm 14 during rotation of the cam disc 60. By means of movement transmission means consisting of a tiltable lever 62 and a vertical rod 66 (FIGURE 2), said cam portions raise the tone arm 14, as will appear move fully hereinafter.

The cam disc 60 further has another plurality of cam portions to be described more fully also hereinafter for controlling the horizontal movement of the tone arm 14 during rotation of the cam disc 60. Between the tone arm 14 and these tracks there is provided movement transmitting means including a cam track follower 76 (FIGURES 4, 5 and 6) capable of being guided in the various tracks, and supporting said cam track follower 76, an arm 74 (FIGURES 4 and 5) pivotally connected to spindle 15 of the tone arm 14 through a friction link to be described more fully hereinafter so that the track follower arm 74 is able to swing about the tone arm spindle 15 against a predetermined friction. The tone arm spindle 15 is provided with an abutment 73 adapted to engage a fixed stop member 71 so as to thereby limit the outward movement of the tone arm 14. The cam disc 60 is provided with means for being retained in a predetermined position during playing of a record, and the phonograph is provided with means for starting the rotation of the cam disc 60.

The cam tracks in the top side of the cam disc 60 comprise a first cam portion 80 (FIGURE 3) of a configuration allowing free movement of the cam track follower 76 during the passage of the stylus means of the pickup head 16 from the exterior to the interior sound groove of the record, a second cam track portion 88 to guide the cam track follower 76 to an exterior or position in which the abutment 73 connected with the tone arm spindle 15 engages the fixed stop 71; the track portion 88 is also able to guide the cam track follower 76 and thereby the arm 74 supporting the same relatively to the tone arm 14 to an exterior well defined position. Further, there is provided a third track portion 92 capable of swinging the tone arm 14 inwardly when the tone arm 14 is in a raised position so as to move a feeler abutment 40 (FIGURE 1) secured to the tone arm 14 against the edge of the lowermost record supported on the centre spindle 20 and after such engagement to guide the cam track follower 76 further inwardly, thereby swinging the cam track follower arm 14 relatively to the tone arm 14 against the action of the friction link to a predetermined position at the end of said third cam track portion 92. A fourth track portion 98b is provided for guiding the track follower in the outward direction so as to bring the feeler abutment 40 provided on the pickup arm out of engagement with the edge of the lowermost record supported on the centre spindle 20, thereby allowing this record to fall freely down to its playing position on the turntable 12 when a record drop controlling mechanism is actuated by a special cam portion 98d on the cam disc 60 to be described more fully hereinafter. Further there is provided a fifth cam track portion 98d capable of guiding the track follower 76 and thereby the tone arm 14 from the position outside the edge of the record, reached in said fourth track portion 98b in the inward direction after the drop of the record onto the turntable 12 to a position in which the stylus member of the pickup head 16 is situated substantially vertically above the initial sound groove of the record tested and now resting on the turntable 12. After having reached this position the tone arm 14 will be lowered to its playing position on the record.

Furthermore the cam disc 60 is provided with a sixth cam track portion 96a (FIGURE 3) capable of guiding the cam track follower 76 to the same exterior position to which it was guided by the second track portion 88 provided the passage of the track follower 76 in the third cam track portion 92 has been allowed to take place without any obstruction due to engagement between the feeler abutment 40 on the tone arm 14 and the edge of a record resting on the supporting member 20, capable of retaining the cam track follower 76 in this exterior position during the remaining part of the revolution of the cam disc 60.

The invention will now be described in detail with reference to FIGURES 1 to 15 which show the basic principles of the design and construction in accordance with present invention.

The phonograph comprises a base plate or chassis 10 (FIGURE 1), a turntable 12 driven by a motor and a gear (not shown), a tone arm 14 having a pickup head 16 and a centre spindle 18 having a retractable platform or other suitable means 20 for supporting a stack of records to be released successively from the magazine to be fed down to the playing position on the turntable 12.

Outside the periphery of the turntable 12 there is arranged a post 22 having an actuating knob or the like 24 for opening the switch 26 of the phonograph motor.

The switch 26 is shown in FIGURE 2 and in section in FIGURE 2a. The switch comprises an insulating body 28 (FIGURE 2a) below which there is arranged a leaf spring 30 rigidly secured at one end at 32 and bearing the other end against a stationary switch contact 34. Adjacent the latter end the spring 30 is provided with a magnetic armature 36 which is attracted by a small permanent magnet 38. The switch actuating knob 24 extends in the form of a rod 25 which bears on the top side of the leaf spring 30.

When the tone arm 14 is lowered to rest on the post 22 it will push the rod 25 downwards. Thereby the spring 30 will be bent as shown by the dotted lines and when the magnetic armature 36 is influenced by a downwardly directed spring force slightly greater than the force of attraction between the magnet 38 and the armature 36, the armature 36 will slip off the magnet 38 and the free end of the spring 30 will suddenly be released from the contact point 34. When the tone arm 14 is lifted from the post 22 the magnetic action as well as the tension of the spring 30 will cause a sudden closing of the contact 34.

It will be understood that the pressure necessary for opening the switch is dependent on the vertical position of the underside of the permanent magnet 38. Therefore, it will always be possible to adapt the switch for actuation in the most effective manner by a tone arm 14 having a given weight by adjusting the position of the magnet 38.

It has been found that a beryllium-copper alloy is especially well suited as material for the switch spring 30 as the fatigue of this material has been found to be almost negligible.

The tone arm 14 has a finger grip 16a (FIGURE 1). On the tone arm 14, there is provided an abutment 40 adapted to engage the edge of the lowermost record in the stack supported on the platform 20. In one embodiment there is further provided a small wheel or roller 42 extending slightly above the top surface of the abutment 40.

Below the chassis there is provided a bridge 50 having at one end a cavity 52, see FIGURES 2 and 4–6, adapted to receive the bearing (not shown) for the turntable 12. From the bottom of the cavity 52, there protrudes a hollow spindle 54 (FIGURES 4–6) which receives the lower end of a centre spindle 18. The top of the hollow spindle 54 extends slightly above the top surface of the turntable so as to centre a single record resting on the turntable when the phonograph is used as a single player.

Between the bridge 50 and the chassis plate 10 there is mounted a spindle for rotatably supporting a cam disc 60.

On the underside of the bridge 50, there is further mounted a pivotable lever 62 (FIGURES 2 and 9) having at one end a roller 64 which cooperates with cam sections near the centre of the cam disc 60 in order to raise and lower the tone arm 14 by a pull rod 66 extending down through holes in the bridge 50 and the lever 62. The tone arm 14 has a vertical spindle 15 (FIGURES 4–6). From the lower end of this spindle there extends a lever 70 having an abutment 72 adapted to cooperate with the trip starter mechanism (not shown).

Above the trip starter actuating lever 70 there extends another lever 74, hereinafter referred to as the cam track lever. This lever 74 (FIGURES 4–6) is movable in a horizontal plane relatively to the lever 70 against friction in a friction link built in between the two arms 70 and 74 at the lower end of the tone arm spindle 15.

At the end of the cam track arm 74 there is arranged a cam track follower pin 76 movable in directions perpendicular to the plane of the cam disc 60 against the action of a spring 78.

The cam disc 60 has a plurality of cam sections. As shown in FIGURE 3 there is a main recess 80 in which the cam track follower 76 is capable of moving freely without touching the bottom during the playing of a record. The recess 80 has an outlet 82 and an inlet 84. Outside the periphery of the recess 80 there is a circular portion 86 elevated above the bottom of the recess 80.

The outlet of the playing recess 80 terminates in a wall 88 of curved configuration capable of swinging the cam track follower 74 and therewith the tone arm 14 to a position outside the periphery of the turntable. The elevated portion 86 and the wall 88 converge at the point 90 where an inwardly leading track 92 starts which, in turn, ends at 94 where two cam tracks 96 and 98 branch off. One of these branched off tracks 96 is the stop track while the other track 98 is the track moving the tone arm 14 in the path where it tests the size of the records.

The track selection system is most clearly shown in FIGURES 7 and 8, it comprises a track selector plate 100 arranged to swing about a pin 102 and normally held in the position shown on FIGURE 7 by means of a spring 104 (FIGURE 3) which brings the pin 106 of a pin-and-slot connection into engagement with one end of the slot 108. The track selector plate 100 is in the form of a thin plate arranged on the top of the cam disc 60. This plate 100 has a lip 110 which extends into the entrance of a cam track 96 (FIGURE 7) with the top surface of said lip substantially in the plane of the top of the cam disc 60. Slightly ahead of the entrance to the cam track 96, the side wall of the cam track 92 has on its exterior side a sloping portion 112 (FIGURE 7). Between this sloping portion 122 and the lip 110 the top surface of the cam disc 60 forms a platform 114. Behind this platform 114, the edge of the plate 100 has an upwardly pressed portion 116. While the cam track 92 in general leads inwardly, the edge of the plate 100 including the upwardly pressed portion 116 is substantially concentric with the cam disc 60 from the sloping portion 112 thereof. The cam track portion generally designated by reference numeral 98 has an inlet portion 98a extending concentrically with the cam disc 60 and following the path of the edge of the plate 110 defined by the upwardly pressed portion 116. The entrance to the cam track 98a is provided with a sloping surface 118 (FIGURES 7 and 8). The cam track 98 further has an outwardly extending section 98b (FIGURE 3) followed by a concentric section 98c. Then there follows an inwardly leading section 98d and a concentric section 98e the last end of which is of extended width at 98f, where it provides another inlet to the playing recess 80. Inside these sections there are furthermore provided track portions for raising and lowering the tone arm as will be explained hereinafter.

The movements take place as illustrated in the views of FIGURES 4–6. FIGURE 4 illustrates the playing position in which a gear wheel driving the cam disc 60 is received in a recess 120 in the periphery of the cam disc 60, so that a driving wheel on the turntable idles. The gear wheel is not shown but is interposed between the driving wheel on the turntable spindle, and the periphery of the cam disc 60.

The trip starter actuating lever 70 is provided with a backwardly extended flap 73 as shown on FIGURE 3. This flap is adapted to abut against a fixed stop 71, when the tone arm 14 and thereby the arm 70 is swung to its most exterior position. Thus this arrangement serves to limit the outward movement of the tone arm 14 and to enable a pre-setting of the action of the friction link with respect to the movement of its arms 70 and 74, as is explained in detail in the following description:

When a record is being played with the parts in the positions shown in FIGURE 4 the cam track follower 76 moves in the playing recess 80 until the stylus of the pickup 16 enters the outlet groove of the record. By this final movement of the tone arm 14 the trip starter mechanism will be actuated by the abutment 72. This causes the trip starter (not shown) to push on an abutment 122 on the cam disc 60 so as to start the cam disc by giving an initial movement sufficient to bring the gear wheel into engagement with the periphery of the cam disc 60. Then the cam disc 60 starts to rotate in the direction of the arrow shown. The cam track follower 76 will, after playing of the record be near the centre of the cam disc 60. Thus the cam track follower 76 will initially engage the inner end of the end wall 88. By further rotation of the cam disc 60, the cam track follower 76 will be guided outwardly, sliding along the end wall 88. Thereby the arms 74 and 70 as well as the tone arm 14 will be swung outwardly until the abutment 73 on the arm 70 abuts against the stop 71, whereby any further outward movement of the tone arm 14 is stopped. However, the cam track follower 76 is bound to follow the end wall 88 until its reaches the entrance to the track 92 at 90 (FIGURE 3). During this forced and outwardly directed movement of the arm 74 the friction in the friction link will be overcome, and the angle between the two arms 70 and 74 will be preset. Therefore, at the moment, when the cam track follower 76 enters the track inlet 90 the angle between the cam track follower arm 74 and the tone arm 14 will always be the same no matter which positions the parts had assumed before this pre-setting.

Immediately the cam disc 60 is started, the tone arm 14 will be raised and will remain raised. In the playing position the raising lever roller 64 (FIGURES 2, 9 and 10) engages the cam section 130a of the cam for the vertical control of the tone arm 14. The raising takes place by passage of the lever roller over the section 130b, whereafter the tone arm 14 remains raised in the section 130c. When the cam track follower 76 arrives at the entrance 90 of the cam track 92 the tone arm 14 starts to move inwards, and at the same time is raised slightly by the roller 64 passing over the track section 130d up to the section 130e, which brings the tone arm to a level in which the abutment 40 is able to engage the edge of the lowermost record in the stack supported on the spindle 18.

When the abutment 40 abuts the edge of the record, the tone arm 14 and then the arm 70 cannot be moved further inwards. Due to the friction link, however, the arm 74 can still be moved inwardly allowing the cam side of the cam track 92. The result is that when the cam track follower 76 moves under these conditions it will be understood that it will bear against the outer side of the cam track 92. The results is that when the cam track follower arrives at the sloping track portion 112, it will move up along this sloping portion 112 to rest on the platform 114, whereafter the cam track follower will follow along the upwardly pressed well 116 of the plate 100 and slide along the top of the lip 110 over the entrance to the cam track 96 down to the sloping entrance 118 of the cam track portion 98a.

During passage in the cam track portion 98a the tone arm 14 remains in the same angular position with the abutment 40 against the edge of the record. Then the cam track follower 76 enters the section 98b, which brings the tone arm outside the periphery of the record the size of which has been tested in the manner already described. The tone arm 14 will remain in this angular position during passage of the cam track follower 76 in the section 98c. During passage in this cam track portion 98c the lowermost record tested will be dropped onto the turntable by actuation of a mechanism hereinafter to be described in greater detail.

By passage of the cam track follower in the section 98d, the tone arm will again be moved inwards although it will retain its angular position corresponding to the setting of the stylus in the initial groove of the record when the track follower 76 passes the section 98e. During the movement of the track follower 76 in the enlarged track portion 98f the tone arm 14 will be set on the record when the vertical control roller 64 passes over the inclined portion 130h down to the portion 130a.

While testing the record, an additional vertical movement of the tone arm 14 may be obtained by letting the vertical control roller 64 pass over a section 130d to a section 130e and then down generally to the level of the section 130c over a section 130f to the section 130g.

If there is no record supported on the platform 20 of the centre spindle 18 the tone arm will not be obstructed in its inward movement and thus there will be no strain on the cam track follower 76 to force it up onto the sloping surface 112. Therefore the cam track follower 76 will follow the bottom of the cam track 92 to the entrance of the cam track 96 and remain in the bottom with the result that the further movement will cause the cam track follower 76 to engage the lip 110 of the plate 100 so as to thereby push the lip 110 back and swing the plate 100 to the position shown in FIGURE 8 against the action of the spring 104. A recess is provided in the cam disc 60 which allows the lip 110 to pass when the plate 100 is swung to this position. The cam track follower 76 thereby enters the cam track portion 96a which will swing the tone arm 14 outwards. The next cam track portion 96b corresponds to an angular position of the tone arm 17 above the switch actuating knob 24. In such a case the tone arm 18 will be lowered in this exterior position and thereby cause the phonograph motor to stop by pressing down the knob 24. This will take place with the track follower 76 substantially at the entrance 84 leading to the playing recess 80.

A manual control is also provided for rejecting a record. Actuation of the manual control starts the cam disc 60 at any time during playing of any record irrespective of whether the phonograph is used as a record changer or single player. The means for this is shown in FIGURE 2. Below the chassis plate is arranged a rod, wire or the like 140, one end of which is bent like a hook 142 gripping a pivotable lever 146 having a control knob 148. The other end of the rod 140 has a bent portion 144 and by means of a spring 146 is secured to the plate 150. The bent portion 144 is so arranged that it is capable of imparting an initial movement to the cam disc 60, which is in the form of a pinion when the rejector knob 148 is pushed in the direction of the arrow shown in FIGURE 2. When the rejector knob 148 is released the spring 146 will pull the rod 140 back to the position where the bent portion 144 is out of engagement with the teeth of the cam disc pinion 60.

The drop control system is shown in FIGURES 9 and 10. Below the bridge 50 there is provided a structure capable of effecting the necessary combined movement. This structure comprises a plate 150 having a pair of abutment ribs 152 and 154 bearing against the underside of the bridge 50. The plate 150 further has a roller 156 forming a third support against the underside of the bridge 50 and adapted to cooperate with a cam 158 formed by a depression in the bridge 50. A spring 160 is interposed between the bridge 50 and a pressed or upturned lip 162 in the plate 150 serves to keep the parts in the normal position. At the rear end of the plate 150 there is provided a keyhole-like aperture 164 through which passes the lower end of the centre spindle 18 which is provided with a portion 19 of reduced diameter. The plate 150 has an upwardly extending end wall 168 which passes up through an arcuate aperture 70 in the bridge 50. Above the bridge 50 the plate 150 has an arcuate arm 170 having one surface 170a substantially concentric with the cam disc 60. This portion passes over into a surface 170b eccentrically disposed relatively to the cam disc 60 and then follows an inclined surface 170c. On the top of the cam disc 60 there is provided an abutment such as a roller 180 for moving the member 150 as will be described hereinafter.

The position of the roller 180 relatively to the various cam portions of the cam disc 60 is shown in FIGURE 3.

When the cam disc 60 rotates and the cam track follower 76 has entered the cam track section 98c as when using the phonograph as a record changer, the roller 180 will be in position to start engagement with the eccentric surface 170b. This surface 170b is of such configuration that the engagement between the roller 180 and said surface 170b will cause a movement of the member 150 which is a counterclockwise rotation about the centre spindle 54 which extends down through the keyhole 164 as well as a movement in the longitudinal direction in such a manner as to bring the narrow portion of the keyhole 164 in engagement with the portion 19 of the spindle having a reduced diameter. This will cause the roller 156 to run up on the cam 158 with the result that the end of the portion 19 will be pulled downwards so that the mechanism in the centre spindle 54 will cause the lowermost record to be released. After this release the structure is gradually fixed by the passage of the engagement roller along the inclined surface 170c. The spring 160 which now pulls in an inclined direction will pull the entire structure back to its original position, when the portion 19 of the spindle is again released from the narrow portion of the key hole 164.

While in the embodiment described hereinabove, the testing of the records takes place by moving the tone arm 14 inwards to engage the periphery of the lowermost record with the abutment 40 on the tone arm, another modification is also possible as is shown in FIGURES 11–15. It has been found that it is rather critical to adjust the horizontal level in which the tone arm should travel to test different sizes of records played in mixed relationship so that according to the embodiment described it is most convenient to load the magazine with the largest size records at the bottom and then decrease the sizes towards the top of the stack of the records.

However, the embodiment illustrated in FIGS. 11–15 will insure a safer playing of the records irrespectively of their relationship and moreover this specific embodiment enables playing of any size of record, including records of non-standard size.

The cam disc shown in FIGURE 11 in plan view has a playing recess 280 and an exterior elevated section 286. The playing recess 280 terminates at an inclined wall 288. As in the previously described embodiment the lower end of the tone arm spindle is provided with a trip starter actuating arm 370 and a cam track follower arm 374 (FIGURES 14 and 15) which can both be swung relative with respect to each other by overcoming the friction of a friction link. The cam track follower is designated by 376 and its actuating spring by 378. The trip starter actuating arm 370 is provided with an abutment 380 (FIGURES 14 and 15) adapted to engage a guiding surface 390. The abutment 380 does not extend into the playing recess 280 but is allowed to move freely across the surface of the cam disc until it engages the surface 290 which follows an inclined path and merges with the end wall 288 of the playing recess 280 near the entrance to the outlet 282 from the playing recess 280. The end wall 288 as well as the guiding surface 290 serve to lead the tone arm in an inward direction.

A cam track generally designated by reference numeral 292 extends from the outlet 282. This cam track leads outwardly but is winding and composed of the following sections a first track section 292a which is substantially concentric with the cam disc; then an inwardly leading section 292b, from which there is branched off a track 298, corresponding to the track 98 in the cam disc of FIGURE 3. The cam track 292b continues in an outwardly leading track portion 292c, the entrance of which is closed by a cam selector member $200_1$ corresponding to the plate 100 in the previously described embodiment. Then there is a further inwardly leading track portion 292d, from which is branched off the same track $298_1$ as from the track 292b. Thereafter there is a further outwardly leading track portion 292e followed by an inwardly leading portion 292f, then an outwardly leading portion 292g, an inwardly leading portion 292h, and an outwardly leading portion 292i, and an inwardly leading portion 292k. At the end of each of the inwardly leading portions there is a track selection member corresponding to the track selection member 100 in the previous embodiment and a branched off track, in the present embodiment two branch tracks, referred to as $298_2$ and $298_3$. For the sake of convenience selection is effected by two track-selector plates the other of which is referred to by $200_2$. The track selector plates $200_1$ and $200_2$ are movable against spring action in precisely the same manner as described in connection with the plate 100 of the previous embodiment. At each of the inwardly extending track portions the plates $200_1$ and $200_2$ are provided with concentric portions having a rib corresponding to the rib 116. In addition these inwardly extending portions have an inclined surface corresponding to the surface 112 defining therebehind a platform corresponding to the platform 114. In each of the inlets of the outwardly leading track portions the plates $200_1$ and $200_2$ are provided with extensions or lips corresponding to the lip 110 in FIGURE 7 so as to allow passage of the track follower 376 from the platforms corresponding to the platform 114 over the top of the lip corresponding to the lip 110 down in the branched off track.

The oscillations of the tone arm 14 effected by the movement of the cam track follower 376 in the track generally referred to as 292 having the various windings are so adapted that they will cover the entire range of record sizes from the smallest to the largest.

The operation is substantially as follows:

When the cam disc is started, the tone arm 14 will initially be raised from the surface of the record. Then, if by chance the cam track follower 376 is near the abutment 380 it will be the cam track follower 376 that engages the end wall 288 of the playing recess 280 with the result that the tone arm 14 is swung outwardly. The movement of the tone arm will take place at a level slightly beneath the underside of the lowermost record in the magazine if the latter is loaded. If the parts are not in such a position, but for example in the position as shown in FIGURE 14, the cam track follower 376 cannot hit the end wall 288. In such a case, however, the abutment 380 will hit the guiding surface 390 with the result that it will be that guiding surface 390 which serves to move the tone arm inwardly. In this case the cam track follower 376 will hit the other end of the wall 288 of the playing recess 280 and insofar as the wall 288 and the guiding surface 290 merge towards the outlet 282 of the playing recess, it will result in a relative adjustment of the cam track follower 376 and the abutment 389 which is the same as the relative adjustment of the trip starter operating arm 370 and the cam track follower arm 374 to the position shown in FIGURE 15.

When the cam track follower 376 is in the cam track section 292a the tone arm 14 is slightly outside the periphery of a record of the smallest size to be played. During passage through this track the tone arm 14 is raised to its top position. When the track follower is moved inwardly in the section 292b the feeler action caused by engagement between the feeler abutment 40 on the tone arm 14 and the edge of a record will cover any size between certain limits, for example between 20 and 17½ cm. When the feeler abutment 40 engages the edge of a record of any size between these limits, the cam track follower 376, as previously described, will be pressed against the outer side of the track portion 292b and will be forced up on the platform corresponding to the platform 114, thereby passing over the lip of the plate 200₁ down into the initial part of the track portion 298₁. If there is no record of this size, the tone arm will move a step further out when the track follower 376 passes through the section 292c. During the cam track follower's passage through the cam track portion 292d, the tone arm 14 will move inwardly. This movement will cause the plate 200₁ to be pushed back against the action of the spring 204 corresponding to the spring 104 in the previous embodiment. The next cam track portion 292d may for example cover the range between 22.5 and 20 cm. If there is any record in this range, the track follower 376 will move in the same track 298₁ as guided by the first portion 292b. If no record is engaged in the course of this movement, then the track follower 376 will push the plate 200₁ back again and move out in the cam track portion 292e, and then inwardly again in the cam track portion 292f, which may cover the interval between 25 and 22.5 cm. A similar testing will take place in the cam track portion 292h, which may cover the interval between 27.5 and 25 cm., and in the cam track portion 292k, which may cover the interval between 30 and 25 cm.

If there is no record at all in the magazine, the track follower 376 will continue out in the most exterior cam track generally designated by reference numeral 296, which is the stop control track corresponding to the track 96 in the previous embodiment.

It will be understood that by this arrangement the entire range of records between for example 17½ and 30 cm. can be covered, so that the record changer is capable of playing any size of record therein between.

The follower is a detailed description of some embodiments of the invention:

*Example I.—FIGURES 16 to 53*

An embodiment of a record changing phonograph according to the invention is shown generally in FIGURE 16. It comprises a base plate or chassis 300, a tone arm 350 having a pickup head 351 and a centre spindle 311 for supporting a stack of records to be released successively from the magazine to a playing position on the turntable.

The turntable 305 is driven by a motor 250, schematically shown in FIGURE 17. The motor 250 has a gear including a driving pulley 251 from which the turntable 305 is driven by a belt means 255 passing over the driving pulley 251 and a recess in a rim of the turntable that extends downwardly from the periphery of the turntable. The motor gear has at the top side of the chassis plate 300 a manually operable control knob 253 for setting the speed of the turntable to any one of a plurality of pre-determined speeds, for example speeds of 16⅔, 33⅓, 45 or 78 revolutions per minute.

The manner in which the turntable is driven by the motor does not constitute part of the invention and will not, therefore, be described in further details. Any other convenient manner of driving the turntable may be used.

Outside the periphery of the turntable 305 there is arranged a post 260 having an actuating knob 265, for opening the switch of the phonograph motor 250.

This switch is designated by reference numeral 262 and shown in FIGURE 17. The switch 262 is of precisely the same construction as that described with reference to FIGURE 2a.

Below the chassis plate 300 there is provided a bridge 370 (FIGURE 17) having at one end a cavity 371 for receiving a bearing for the turntable. At this end the bridge 370 is provided with a horizontal flange, which is secured to the base plate 300 by suitable means such as screws. The other end of the bridge 370 is situated adjacent the spindle 367 (FIGURES 20 and 22) for the tone arm 350 and is secured to the base plate 300 by means of screws through distance pieces, of which one distance piece 375 is adapted to cooperate with an abutment secured to the tone arm spindle 367 as will be described hereinafter in detail.

Rigidly secured to the bottom of the cavity 371 there is provided a vertical hollow spindle 382 (FIGURES 18 and 19) adapted to receive the lower end of the centre spindle 310. The top of the hollow spindle 382 extends slightly above the top surface of the turntable 305 so as to centre a single record supported on the turntable when the phonograph is used as a single player with the centre spindle 310 removed.

A vertical bushing 307 is mounted in the center of the turntable 305 and at the bottom side thereof which fits over the hollow spindle 382. Between the lower end of the bushing 307 and the bottom of the cavity 371 there is provided a suitable low friction bearing 304, for example ball bearings, to enable the turntable to rotate about the spindle 382 with low friction.

Another substantially cylindrical part consisting of a driving gear wheel 306 and of a cam member with a nose 1023 is rigidly mounted at the lower end of the turntable bushing 307 whereby the driving gear wheel 306 drives the other movable parts of the phonograph in a manner which will be described more fully hereinafter and the nose portion transmits a force to the trip starter actuating mechanism as also described more fully hereinafter.

The hollow spindle 382 is adapted to receive the lower end of the centre spindle 310 which is of reduced diameter (not shown). The centre spindle 310 has a central control rod 309 (FIGURE 19) operable, for example, by pulling to actuate the record drop control means 311 in such a manner that one record is released from a supporting platform on the spindle each time the central rod 309 is pulled down. A more detailed description of the record drop control mechanism of the centre spindle will be given hereinafter.

Between the base plate 300 and the bridge 370 there is arranged a cam disc 380 in the shape of a pinion rotatably mounted on a pin 381 (FIGURE 22) which is secured to the bridge 370 by means of a nut 382. As will be apparent from the following description the cam disc 380 serves to actuate and control the vertical as well as the horizontal movements of the tone arm 360 and also the movement of the control rod 309 for bringing the lowermost record in the magazine on the centre spindle 310 to its playing position on the turntable 305.

Between the periphery of the cam disc 380 (FIGURE 20) and the gear wheel 306 on the turntable bushing 307 there is arranged an intermediate gear wheel 308 for transferring the rotation of the turntable 305 to the cam disc 380. As is most clearly shown in FIGURE 21 the gear wheel 308 is arranged to be freely rotatable on a pin 309 which is rigidly secured to a horizontal plate 311′, this plate 311′ is mounted between two upwardly extending flanges 371 and 372 of the bridge 370 and is received in a pair of apertures 373 and 374 in each of the flanges 371 and 372 of which the aperture 374 is broader than the plate 311′, while the other aperture 373 has a width slightly larger than a tongue of the plate 311 left at one side of an L shaped recess 375. The parts are so disposed relatively to each other that the gear wheel 308 when engaging the gear wheel 306 and the cam disc 380 will be biased slightly in direction of the periphery of the cam disc 380 due to the spring 377.

In the edge of the cam disc 380 there is provided a recess 383 capable of receiving a segment of the gear wheel 308. When this recess 383 during the rotation of the cam disc 380 coincides with the point of engagement between the gear wheel 308 and the periphery of the cam disc 380, then the gear wheel 308 will enter the recess 383 due to the action of the spring 377, whereby the gear wheel 308 will be disengaged from the driving gear wheel 306. Thus in this position of the parts, which corresponds to the position during the playing of a record, the cam disc 380 remains stationary.

As will be understood from the following description, one cycle of testing and changing a new record corresponds to one complete revolution of the cam disc 380, the start position and the stop position of the cam disc being the one in which the gear wheel 308 has disengaged the driving wheel 306, and is received in the recess 383 in the periphery of the cam disc. From this position the cam disc 380 is started by being given a push in the direction in which it normally rotates which is sufficient to bring the gear wheel 308 out of the recess 383 to engage teeth on the periphery of the cam disc 380 as well as the teeth on the gear wheel 306. Thereafter the rotation of the turntable controls the rotation of the cam disc 380 until after a complete revolution, the recess 383 again receives the gear wheel 308 which again disengages the driving wheel 306 and thereby stops the cam disc 380.

The cam disc 380 and thereby the record testing and changing mechanism may be started either manually i.e. when starting the phonograph for playing a plurality of records from the magazine or for playing a single record supported on the turntable of the phonograph, or automatically i.e. for changing the next record to be played when the pickup has finished the playing of one record. The various methods of starting the cam disc are however unimportant for an understanding of the present invention and will, therefore, only be described briefly.

In the embodiment shown, the manual control for starting the cam disc 380 and thereby starting the operation of the phonograph includes a push button 240, see FIGURE 16, which is connected to a rod, wire or the like 242 (FIGURE 17) in such a manner that depression of the push button 240 will cause a movement of the rod 242 in the direction of the arrow shown in FIGURE 17. The other end of the rod 242 has a bent portion 244, the end of which normally lies just outside and level with the edge of the cam disc 380. The rod 242 and the bent portion 244 are held in the normal, inoperative position by means of a spring 246 secured to the bridge 370 as shown in FIGURE 17.

When pushing the button 240 the end of the bent portion 244 will be moved so as to engage a tooth on the edge of the cam disc 380 and thereby impart an initial movement of rotation to the cam disc 380 to bring the gear wheel 308 into engagement with the driving wheel 306 as explained above.

From the following description of the other parts of the record changing phonograph it will be understood that the push button 240 can also be used for rejecting a record at any time during play, thereby causing the next record to be supplied or—if there are no more records left in the magazine when the record being played is rejected—to cause the phonograph to stop entirely.

As already mentioned, the cam disc 380 is used for controlling the vertical and horizontal movements of the tone arm 350 as well as the movements of the record drop controlling mechanism. The tone arm arrangement will be described first.

As shown in FIGURE 22, sub-assembly of the tone arm spindle means is mounted on a hollow vertical spindle 360 secured at its lower end to the bridge 370 by means of two nuts 362 and 363, and having at its upper end a collar 361. Another hollow spindle 367 having an internal diameter slightly larger than the external diameter of the spindle 360 surrounds the spindle 360 and extends between the collar 361 and the nut 363. The upper end of the spindle 367 is provided with a conical surface 368 so as to enable a plurality of balls 369 to be received in the space between the conical surface 368 and the outer surface of the collar 361. Also the lower end of the spindle 367 is provided with a conical edge surface 366 facing a similar conical upper surface 365 of the nut 363 between which there is a space for receiving a plurality of balls 364. The nut 363 is tightened sufficiently for the spindle 367 to be able to rotate freely on the spindle 360 without any play in the vertical direction.

This sub-assembly further includes a disc 320 (FIGURE 24) rigidly secured to the hollow spindle 367, for example, as a press-fit and in such a position that in the assembled phonograph it is located below the base plate 300 and above the cam disc 380. This disc 320 is substantially circular and has an aperture 321 of rectangular shape and two outwardly extending flaps 322 and 323. Diametrically opposite the aperture 321, there is provided in the disc 320 a similar aperture 325. The flap 323 is provided with an upwardly extending cylindrical flange adapted for use in connection with an auxiliary automatic single record player mechanism which, however, will not be described in this specification; for further details reference is made to the specifications of my copending British Patent applications Nos. 698/56 and 5151/56.

Below the disc 320, there is arranged another disc 330 having a centre hole of such a diameter that it is able to rotate about the spindle 367 without any play. The disc 330 has a sidewardly extending arm 331 having at its outer end a hole 334 and a bent over portion 333, with a hole 335 in alignment with the hole 334. Through the holes 335 and 334 there extends a pin 336 moveable in a vertical direction and connected with a spring 337 (FIGURES 15 and 22) the lower end of which is tightly wound to clamp on the pin 336 above the arm 331, and the upper end of which abuts against the under side of the horizontal over-bend portion 333. It will be understood that the spring 337 tends to press the pin 336 downwardly until the lower end of the spring abuts against the arm 331 and further that the pin 336 is capable of being pushed upwards against the action of spring 337. The pin 336 is adapted for cooperation with various tracks in the cam disc 380 as it will be explained hereinafter.

On both sides of the disc 330 there is provided a friction washer 326. As suitable material for the washers 326, Leatheroid has been found satisfactory but cork washers can also be used, depending on the nature of the surface treatment of the metal parts. The upper of these washers 326 is interposed between the disc 320 and the disc 330 and the lower of the washers is inserted between the disc 330 and another disc 327, arranged on the spindle 367 and provided with a central hole 337 having a diameter slightly larger than the external diameter of the spindle 367. Outside the periphery of the disc 327 there extend two upwardly bent flaps 328 each provided with two side cuts which divides each flap into an upper and lower part connected by a small strip of material 329. At a point along the periphery of the disc 327 there extends a downwardly bent portion 338 which continues in a horizontal arm 339. The distance between the level of the disc 327 and the level of the arm 339 is such that when the parts are assembled, the arm 339 is situated just below the cam disc 380 near the top surface of the bridge 370. In the following description the arm 339 will be referred to as the trip starter actuating lever.

Above the disc 320 there is arranged a curved broad leaf spring 316 having an oval centre hole 315 and at one point of its periphery a rectangular recess 317 of a width slightly broader than the connecting strip 329 of the flaps 328 of the disc 327, and, diametrically opposite to this recess 317, an aperture 318 having a portion slightly broader than the flap 328 and a portion of substantially the same dimensions as the recess 317. The spring 316 is bent in such a manner that the recesses 317 and 319 are raised above its central portion.

When assembling the parts described hereinabove, the disc 330 and the two friction washers 326 are placed in position below the disc 320 and the disc 327 is mounted below the lower of the friction washers with the upwardly extending flaps 328 projecting through the apertures 321 and 325 in the disc 320. Thereafter the bent spring 316, the centre hole 315 of which is oval in the direction of the apertures 317 and 319 is placed on the top side of the disc 320 and tilted to bring the exterior end of the recess 317 to engage in the side cuts of the one flap 328. Then the other end of the spring 316 is pressed down with the other flap 328 extending through the broad portion of the aperture 318 until the side cuts of this flap are in alignment with the spring 316, whereafter the spring 316 is pressed sideways the strips 329 of the flaps 328 are introduced into the recess 317 and the narrow portion of the aperture 319.

It will be understood that when the parts are assembled in this manner the spring 316 will tend to press the parts together with a certain force so that the arm 331 can be swung relatively to the spindle 367 against the action of the friction link consisting of the above-described parts. It will further be understood that the friction can be set at any desired value by using differently biased leaf springs 316. It will also be seen that the trip starter actuating lever 339 is rigidly connected to the spindle 367, to which is also clamped the tone arm 350 to rotate in unison therewith. Therefore the lever 339 will always follow the horizontal movements of the tone arm 350.

The sub-assembly comprising the tone arm spindle means and friction link with cam track follower means is rigidly mounted on the bridge by a nut 362 (FIGURE 22).

Another sub-assembly comprising the tone arm 350 includes a bushing 353, made for example of a thermoplastic material such as nylon. The bushing 353 is provided with a longitudinal bore as a sliding fit over the spindle 367. The bushing 353 is slotted at 354 as is most clearly shown in FIGURE 23 and a screw 355 is arranged through the slotted part so as to enable the wall of the bore to be clamped firmly on the spindle 367 when mounted thereon. It will be understood that the angular position of the bushing 353 and thereby of the tone arm 350 relatively to the parts of the friction link on the spindle 367 can be set at any time by merely loosening the screw 355 and tightening it again.

A bracket 351 (FIGURE 22) for the tone arm 350, having two upwardly extending flaps 357 is secured to the top end of the bushing 353 by means of a screw 366.

The pickup arm 350 itself carries inside a cavity, a plate 358 of which one end is bent upwardly and secured to the tone arm by means of a screw 359, and of which the other end is provided with two downwardly extending flaps 352, corresponding to the upwardly extending flaps 357. The two pairs of flaps 352 and 357 are pivotally connected to each other by means of a pin 349 which extends through aligning holes in the four flaps.

It will be understood that the tone arm 350 is in this way able to swing in a vertical plane about the pin 349 and at the same time to swing in a horizontal plane about the spindle 360. To adjust the needle pressure it may be convenient to have an adjustable counter weight behind the pin 349 or to provide an adjustable balance spring member. Such arrangements are, however, commonly known and will, therefore, not be further described.

Down through the hollow spindle 360 there extends a rod 340, the upper end of which is connected to the tone arm behind the pin 349 by being bent into a U shape and inserted through two holes 341 in the plate 358 as shown in FIGURE 22.

When the tone arm sub-assembly is mounted on the tone arm spindle means (which is not done until the entire sub-assembly comprising the bridge with trip starter and cam disc has been secured under the base plate), the lower end of the rod 340 passes through a hole in one end 343 of a two armed lever 345 which is arranged below the bridge 370. This lever 345 has a pair of side flanges, and is at 344 pivotally supported on a downwardly bent portion 373 of the bridge 370. The other end 346 of the lever 345 is provided with an upwardly bent portion 346, extending through an aperture 372 in the bridge 370 and carrying a roller 347 adapted to cooperate with parts of various elevations of the cam disc 380 as explained hereinafter. Near the bent portion 346 of the lever 345 there is mounted a spring 348 connecting the lever 345 and the bridge 370. This spring 348 insures that the roller 347 is always pressed against the underside of the cam disc 380. The lower end of the rod 340 is screw-threaded and below the lever 345 there is provided a nut 342 to be engaged by the lever 345 when swung clockwise so that the rod 340 will be pulled down and thereby the tone arm raised.

Just above the roller 347 the cam disc 380 is provided on the bottom side with a circular cam portion 385 (FIGURES 22, 25 and 26), against which the roller 347 is pressed due to the action of the spring 348. The cam portion 385 which is provided in the cam disc by stamping or by other suitable method is divided into a plurality of sections at different horizontal levels. During one revolution of the cam disc the roller 347 will, therefore, be moved up and down in a pre-determined cycle and the tone arm 350 will follow these vertical movements due to cooperation between the nut 342 and the end 343 of the lever 345. A further description of these vertical movements of the tone arm will be given in connection with the description of the mode of operation of the phonograph.

The cam disc 380 is shown in plan view in FIGURE 25 which also shows the arm 331 with the cam track follower pin 336, when the parts are in a position corresponding to the playing of a record.

The cam disc 380 is provided with a broad and deep track 386 in which the pin 336, hereinafter referred to as the cam track follower pin, is able to move freely during the playing movement of the tone arm 350 and the corresponding movement of the arm 331.

Near the end wall 388 of the playing recess the bottom of this recess has an upwardly sloping portion 387 which leads up to the following tracks in the cam disc. When the cam track follower pin 336 during the rotation of the cam disc passes over this sloping portion 387 the lower end of the pin 336, which is not able to engage the bottom of the playing recess 386, will engage the track bottom and is thereby slightly pressed upwards against the action of the spring 337. Thereafter the cam track follower pin 336 will slide in the tracks in safe engagement with the bottoms of the tracks. The end portion of the playing recess 386 is continued in an outwardly leading track 389 which causes the track follower pin 336 and thereby the arm 331 and the tone arm to swing about the shaft 367 in the outward direction. The track 389 continues in a short, concentric track 390 at the periphery of the cam disc and thereafter in an inwardly leading track 391. The track 391 ends at a pre-determined distance from the centre of the cam disc 380 and continues in an outwardly leading track 393, having an inner side wall which slopes so as to permit the pin 336 to slide from the bottom of the track up onto the surface of the cam disc 380. Near the periphery of the cam disc the track 393 continues into a concentric track 395, hereinafter referred to as the stop track.

At some distance from the junction of the tracks 393 and 395 an inwardly leading track 394 is branched off from the stop track 395; this track 394 has a sloping inner side wall similar to the inner wall of the track 393. The track 394 continues in a concentric track portion 396 which is slightly broader than the foregoing tracks and the bottom of which is brought down to the level of the bottom of the track 386 by a downwardly sloping bottom portion 397. At the end, the track 396 joins the playing track 386.

The playing track 386 is also connected with the exterior concentric stop track 395 by means of a broad arcuate track 398 allowing the pin 336 to be swung from its exterior position in the stop track 395 into the playing track 386 when the cam disc 380 stops in the playing position. The stop track 395 is continued from this point in another concentric track 399 which at its other end communicates with the small concentric track portion 390.

The various parts of the circular vertical control track 385 for controlling the vertical movements of the tone arm 350 will now be briefly described, reference also being made to the corresponding tracks for moving the tone arm in the horizontal directions.

When the tone arm 350 is in the playing position, i.e. when the cam track follower pin 336 moves freely in the playing recess 386 the roller 347 of the pivotable control lever 345 is in engagement with the lowest cam portion 385a of the track 385, thereby enabling the tone arm to rest freely on the record being played or on the post 260 in contact with the switch control for the phonograph motor; in this position the lever 345 is tilted so much that the nut 342 is entirely disengaged. As soon as the cam disc 380 starts to rotate, i.e. when the trip starter mechanism is actuated by the actuating lever 339 referred to more specifically hereinafter or when the push button 240 is pressed down for starting the phonograph or for rejecting a record being played, the roller 347 is brought into connection with a sloping back portion 385b which lifts the roller 347 up to the level of the next portion 385c, which corresponds to a raised position of the tone arm 350. When the cam track follower pin 336 reaches the concentric cam track portion 390 the roller 347 is in engagement with a sloping track portion 385d in which the tone arm is raised to its most elevated position. This movement corresponds to the passage of the cam track follower pin 336 in the inwardly leading track portion 391 and in the outwardly leading track portion 393.

As will be explained hereinafter the cam track follower pin 336 will pass from the track 393 into the stop track 395 if there is no record in the magazine of the phonograph, and it will pass into the inwardly leading track 394 if there is at least one record in the magazine on the centre spindle 310. Before starting the inward movement of the tone arm 350 corresponding to the passage of the track follower pin 336 in the inwardly leading track 394, the tone arm will be lowered due to a sloping portion 385f of the vertical control track 385 and thereafter maintain this low position in the track 385g, which has substantially the same level as the track 385c, corresponding to a movement of the cam track follower pin 336 in the inwardly leading track 394. In the next track portion 385h the tone arm will be lowered to the position described in connection with the track portion 385a. This takes place when the cam track follower pin 336 enters the concentric track part 396.

The mechanism for actuating the record drop control means in the centre spindle is arranged below the bridge 370 as shown in FIGS. 19, 29 and 31. This mechanism comprises a reciprocatable arm 900, which is movable in a longitudinal direction as well as tiltable in a vertical plane. The left-hand end of the arm 900 has inclined edges 902 and 904 (FIGURES 29 and 30) sloping towards a semi-circular recess 906 which is adapted to engage the annular groove at the lower end of the spindle rod 309.

The arm 900 is adjacent its right hand end, supported on a flap 920 which is a downwardly bent part of the bottom of the bridge 370. This flap 920 has, adjacent its lower end, a narrowed portion 922 capable of engaging a longitudinal slot 908 provided in the right hand end of the arm 900.

The arm 900 is guided by a pin 911 projecting from the bridge 370 and engaging an elongated slot 910 in said arm. A spring 912 is interposed between the arm 900 and the upper end of the pin 911 in such an inclined position that it will normally hold the arm 900 in a retracted and raised position with the semicircular notch 906 out of engagement with the annular recess on the lower end of the spindle 309. This arrangement allows the spindle 309 to be removed or replaced depending whether the unit is going to be used as a record changing phonograph or as a single player.

As is apparent from the drawings the arm 900 consists of a substantially flat plate having upwardly extending side walls 913 and 915.

As is clearly seen in FIGURE 30 a cam surface 914 is provided on the top side of the arm 900.

In order to move the arm 900 to the left so as to engage the semi-circular recess 906 with the annular groove in the lower end of the spindle rod 309 and to tilt the arm 900 after such engagement so as to draw the spindle rod 309 thereby actuating the mechanism in the interior of the centre spindle 310 there is provided a reciprocable member 950 which is actuated by a cam 980 located on the underside of the cam disc 380 as shown in detail in FIGURE 30.

The member 950 has a main body 952 which is adapted to slide on the top side of the bridge 370, in an elongated depression 953 provided therein, so that the top side of the main body 952 is substantially flush with the top surface of the bridge 370. At right angles to the main body 952 of the member 950 there is provided a downwardly bent portion 956 which extends down through an elongated slot 924 in the bridge 370 (see FIGURE 29).

When placed in the depression 953 in the bottom of the bridge 370 the member 950 will be slidable therein, longitudinally guided by the downwardly bent portion 956 which slides in the slot 924.

To minimize the friction caused by the reciprocating movement of the member 950 the portion 956 has two oppositely arranged slots 958 and 960 each capable of receiving one of a pair of duplex rollers 959 and 961 respectively. As is clearly seen in FIGURE 29 the top slot 958 is somewhat broader and is off-set from the bottom slot 960 whereby (as illustrated in FIGURES 19, 30 and 31) the duplex rollers 959 and 961 when mounted in either of the two slots 958 and 960 are able to assume a mutually inclined position, in which the peripheries of the rollers roll along one another while the lower roller pair 961 rolls along the top surface of the arm 900, and the roller pair 959 rolls along the bottom surface of the bridge 370.

On the top surface of the body 952 of the reciprocating member 950 there is arranged another roller 955 fulcrumed on a small pin 953 mounted on the portion 952 at right angles thereto. The roller 955 is adapted to engage a cam generally designated by reference numeral 980 on the underside of the cam disc 380. The cam 980 substantially surrounds the centre of the cam disc 380 and has a steep exterior wall surface adapted to engage the roller 955. During the rotation of the cam disc 380 the roller 955 engages the various portions of the cam 980 and thereby causes the following movements of the parts to take place.

In the position of rest of the cam disc 380 which it assumes during playing of a record the cam portion 980a is in a position to receive the roller 955.

The action of the spring will in this position pull the arm 900 upwards and towards the centre of the cam disc 380 whereby the arm 900 will assume the position shown in FIGURE 19, in which the inner end of the slot 908 in the arm 900 is close to the narrow portion 922 of the bridge flap 920 of the bridge 370 and in which the left hand end of the slot 910 abuts against the pin 911. The lower roller 961 is situated at the beginning of the upwardly bent flap 914 of the arm 900, which by pressing against the roller pair 959 and 961 brings the arm 900 into a position in which the semicircular recess 906 is level with the annular groove in the lower end of the spindle 309.

The direction of rotation of the cam 980 is indicated by the arrow in FIGURE 30. From the position of rest in which the roller is embedded at the lowest point of the cam portion 980a, the roller 955 and thereby the reciprocating member 950 is pushed to the left when contacting points of the cam portion 980a having an increased diameter. Initially this will result, by the engagement of the lower roller pair 961 in a movement of the arm 900 in the same direction whereby the semicircular slot 906 will engage in the annular recess in the lower end of the spindle 309.

As soon as this engagement is obtained the roller 955 will meet the concentric cam portion 980b, which will keep the arm 900 in the position reached. Due to the engagement between the arm 900 and the spindle 309 the latter will be clamped in its normal position so that there will be no possibility of removing the spindle after the start of the cam disc 980, i.e. during the record testing and changing movements of the phonograph.

On further rotation of the cam disc the roller 955 will engage the next cam portion 980c which is shaped as a nose on the cam 980. The member 950 is pushed thereby further to the left (see FIGURE 30). As further movement of the arm 900 in this direction is impossible due to engagement with the spindle 309, the lower roller pair 961 will start to roll up along the cam surface 914 thereby causing the left-hand end of the arm 900 to tilt whereby the spindle 309 is pressed down and the record drop controlling mechanism actuated to release a record from the magazine. When the roller 955 reaches the further concentric cam portion 980d which has the same diameter as the cam portion 982, the spring 912 acting on the member 950 causes the arm 900 to reassume its spindle locking position.

When the cam disc 380 reaches the angular position, in which the gear roller 308 is disengaged from the driving wheel 306, i.e. the stop position of the cam disc, the roller 955 is again pressed into the bet-in cam portion 980a, whereby locking is released and the centre spindle is free to be removed.

The mechanism for starting the cam disc 380 after playing of a record, the so-called trip starter is shown in FIGURES 18, 27 and 28.

This trip starter comprises two levers which are connected by means of friction link and the front end of which is capable of being engaged by a nose 1023 on the rotating turntable spindle 306. The arms are operable as a unit by the trip starter lever 330 connected to the tone arm spindle so as to be swung inwardly to engage said nose. As long as the stylus of the pickup moves in the playing groove of a record the inward movement of the trip starter lever is not sufficient to cause any engagement to start the cam disc. During playing of the last part of a record, the rotating nose 1023 on the turntable spindle will for each revolution engage the strip starter 1010 and swing back. When the stylus enters the outlet groove of the record which has an increased pitch, the inward movement of the tip of the trip starter is sufficient to insure that the tip thereof is engaged by the nose whereby the trip starter lever 1010 is caused to move longitudinally to impart a kick to an abutment on the underside of the cam disc.

More specifically the trip starter mechanism comprises a pair of levers 1010 and 1036 both arranged on the bridge below the cam disc 380. The lower of the levers 1036 is supported on two projections 1016 and 1018 (FIGURE 27) on the bridge 370 and pivotally mounted on a pin 1000 carried by the bridge 370. Above the lever 1036 the pin 1000 has an annular groove 1001 which fits in a keyhole-like aperture 1012 in the lever 1010 whereby the pin 1000 together with the pair of projections 1002 and 1006 bears against the top side of the lever 1036.

At the broad end the keyhole-like aperture 1012 is provided with an upwardly bent flap 1017. Between this flap and the pin, a hair-pin like spring 1014 is interposed to keep the lever 1010 in its furthest projecting position with the bottom of the narrow end of the keyhole engaging the groove 1001 in the pin 1000.

At the front end the lever 1036 has a pair of outwardly bent flaps 1020 and 1021 to limit the mutual angular movement between the two arms 1010 and 1036, and at the rear end the lever 1036 has another upwardly projecting flap 1022 which is engaged by the trip starter lever arm 330 or the tone arm spindle 367, when the stylus member enters the outlet groove of the record.

Furthermore, between the pin 1000 and the flap 1022 the lever 1036 has an upwardly bent flap 1003 forming an inclined surface having an acute angle relatively to the longitudinal direction of said lever. The rear end of the lever 1010 has a sidewardly directed projection 1004 carrying an upwardly extending flap 1005. At the bottom of the flap 1003 there is provided a slot 1003a so as to allow the projection 1004 of the arm 1010 to swing in under a part of the flap 1003. The front end of the lever 1010 is bent upwardly at 1030 so as to provide a vertically extending front edge engageable by the nose 1023 which rotates with the turntable 305.

To avoid noise when the trip starter mechanism is actuated it is important that either the flap 1030 or the nose is made out of or at least covered by a suitable material. Nylon has been found to give satisfactory results.

On the bridge 370 at the exterior side of the trip starter lever mechanism adjacent the front end thereof there is arranged a small pin 1026 preferably covered by resilient material such as a rubber bushing or the like.

It is desirable to preset the trip starter lever mechanism in such an exterior position that it will not be brought into engagement with the rotating nose 1023 until near or at the end of playing of a record. The two inclined surfaces 1003 and 1005 serve this purpose by co-operation with a downwardly extending abutment 1019 (FIGURE 18) on the cam disc 380 located so that this abutment passes the two inclined surfaces just before the cam disc is brought to its stop position in which the intermediate gear wheel falls into the recess 383 in the periphery of the cam disc.

From FIGURE 18 it will be understood that this abutment 1019 which moves in the direction of the arrow shown adjacent the abutment, first hits the inclined surface 1003 which causes the arm 1036 to swing clockwise and thereafter hit the abutment 1005 and causes the arm 1010 to swing clockwise until the latter engages the resilient abutment 1026. The resiliency of this abutment 1026 should be sufficient to move the arm 1010 back slightly in a counterclockwise direction when the abutment 1119 has passed behind the rear edge of the abutment surface 1005 so that the rear end of the flap 1022 on the arm 1010 will be in position to engage the abutment 1019 on the cam disc 380 when the trip starter mechanism is actuated and thereby impart a kick to the cam disc 380.

The operation of the trip starter mechanism is as follows:

When after playing of a record the stylus member enters the outlet groove of the record the trip starter mechanism is swung into the position shown in FIGURE 28 in which the nose 1023 on the turntable spindle 382 abuts the front end of the trip starter lever 1010. The front end of the trip starter lever 1010 is thereby pushed back with the narrow portion of the keyhole sliding in the groove of the pin 1000 against the action of the spring 1014. This brings the rear end of the surface 1005 to abut against the abutment 1019 on the cam disc 380 and thereby given the same an initial rotation.

If, during playing of a record the trip starter mechanism should be swung to engage the rotating nose 1023 before the stylus enters the outlet groove of the record the nose 1023 will not be capable of engaging the tip of the arm 1010, but will push it slightly clockwise. Due to the fact that the ribs 1016 and 1018 are nearer to the pin 1000 than the ribs 1002 and 1006 it will be understood that the friction between the arm 1010 and the arm 1036 is less than the friction between the latter arm 1036 and the bridge plate 370 so that any rotation of the arm 1010 caused by its being pushed back under the influence of the nose 1023 will not be transmitted to the arm 1036 and thereby prevent it from being transmitted through the tone arm 350 to the stylus.

When the cam disc 380 after having been started in the manner described hereinabove is rotated one revolution, the abutment 1019 hits again first the inclined surface 1003 and then the surface 1005 and presets the trip starter mechanism to the desired initial position as already described.

As for the centre spindle 310, it will be appreciated that this is shown very schematically, partly because it does not form part of this invention and partly because those skilled in the art will easily be able to select an adequate central spindle for use in connection with the simplified control mechanism having the essential features of this invention.

In broad terms the centre spindle 310 has a supporting main lever for the stack of records and means operable by the interior control rod 301 which extends down through the centre spindle 310 and the centre spindle bushing 382 and is shown in engagement with the drop control mechanism of the phonograph to release the lowest record from the supporting member 311 to drop it to its playing position on the turntable 305.

The movement of the interior control rod 301 of the centre spindle 310 may either be, as shown in the various embodiments, a downwardly directed pull, or as will be appreciated, the movement of the control mechanism can easily be inverted within the scope of the invention so as to impart an upwardly directed push on the centre spindle control rod. It is also possible to use a centre spindle of the type in which the interior control rod is rotatable and provided below the chassis with a crank-like projection operable to swing the interior control rod by reciprocal movement of the control mechanism according to the invention.

The centre spindle 310 may be of the type having a lower portion terminating in a platform above which the centre spindle has a sidewardly offset portion so that a drop control rod in the centre spindle 310 pushes the edge of the hole in the lowest record in the stack of records supported on said platform to bring it into alignment with the lower portion of the centre spindle in order to descend therealong. In this case it is necessary to use a stabilizing ballast or over-arm which, when the stack of records is arranged on the centre spindle, engages the top surface thereof to keep the records in a horizontal position above the turntable 305. A stabilizer arm is not shown in the drawings, as they are well known.

Anybody skilled in the art will be able to select an adequate centre spindle of the type referred to hereinabove which are widely used in commerce, for example, in phonographs known, for instance, under the trademarks Webster, Collaro or Garrard.

It is preferred, however, to avoid the over-arm which constitutes an unnecessary supplemental part of the phonograph and, therefore, I prefer to use a centre spindle of the type having a primary support which can be retracted to release the lowest record in the stack, and a secondary support which supports the remaining part of the stack while the primary support is retracted. Such centre spindles are also available and can easily be chosen by those skilled in the art. A suitable type of centre spindle is disclosed in my U.S. Patent 2,604,425, and spindles operating on a similar principle are known in phonographs sold under the trademarks Miracord or Dixon.

For the reasons hereinbefore stated no further reference will be made to the centre spindle constructions which can be used with my phonograph.

MODE OF OPERATION

The normal stop position of the phonograph is shown in FIGURE 53. The tone arm is lowered on the post 260, whereby the switch for the phonograph motor is held open. The cam track follower pin 336 is situated at the merging point of the three tracks 395, 398 and 399 in the cam disc 380. The flap 322 of the horizontal tone arm plate 320 abuts against the bridge supporting stop pin 375. The intermediate gear wheel 308 is received in the edge recess 383 of the cam disc 380 and thereby disengaged from the driving wheel 306 on the turntable shaft. The reason why the parts have assumed these positions in the normal stop position of the phonograph will appear from the following description.

Considering first the case where the phonograph is to be used for playing a single record placed on the turntable after having removed the centre spindle 310, the upper end of the spindle 382 is used to centre the single record placed on the turntable. For starting the playing of this record the phonograph is in this case operated like a normal single record playing phonograph, i.e. the operator simply lifts the tone arm from the post 260, whereby the motor switch is closed and the phonograph motor starts to rotate the turntable with a suitable velocity set by the manually operated gear knob 253 (FIGURE 16). As the gear wheel 308 is out of engagement with the gear wheel 306, the cam disc 380 will not start to rotate when the motor switch is closed. From the construction of the mechanism controlling the vertical movement of the tone arm 350, it will be seen that the tone arm can be lifted manually without any obstruction. Thereafter the operator places the tone arm on the record so as to bring the stylus of the pickup head 351 to engage the inlet groove of the record to be played. By this inwardly directed movement of the tone arm 350, the cam track follower pin 336 is swung inwards in through the track 398 of the cam disc 380, so that the length of the movement corresponds to the diameter of the record to be played. The movement of the tone arm 350 during the playing of a record will continue the movement of the cam track follower pin 336 so that it at last enters the playing recess 386.

When the stylus of the pickup head 351, after playing the record, reaches the outlet groove of the record the trip starter actuating lever 339 (FIGURE 24) will engage the trip starter lever 1036 (FIGURE 18), thereby, as described causing the trip starter mechanism to impart an initial rotational movement to the cam disc, sufficient to press the gear wheel 308 out of the edge recess 383 so as to engage the periphery of the cam disc 380 as well as the gear wheel 306. Thereafter the cam disc 380 rotates until after one complete revolution the gear 308 falls again into the recess 383.

Figure 33:
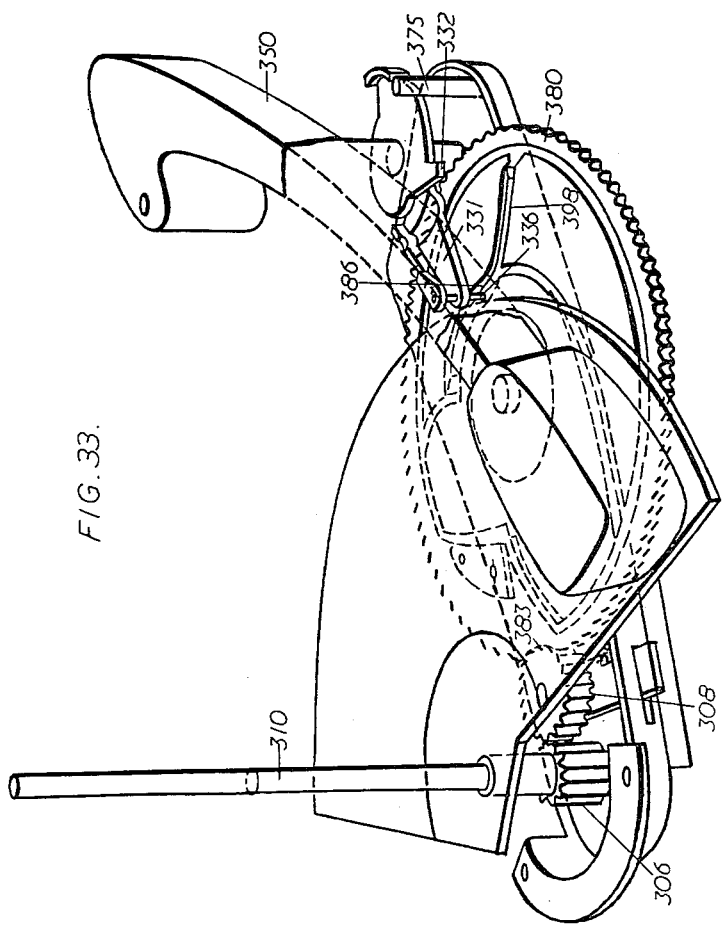

Immediately after the start of the cam disc when the cam track follower pin is in the position shown in FIGURE 33 the roller 347 (FIGURE 22) of the vertical control lever 345 engages the cam portion 385b of the vertical control track 385, whereby the tone arm is raised so as to disengage the stylus from the record. This raising of the tone arm takes place just before the slope 387 in the bottom of the playing recess 386 reaches the cam track follower pin 336 (see FIGURE 34). Thereafter, while the tone arm is maintained in its elevated position by the cam track portion 385c the end wall 388 of the playing recess 386 hits the cam track follower pin 336 thereby causing the track follower arm 331 and therewith the tone arm to be swung outwardly. This outwardly directed movement of the tone arm 350 continues throughout the passage of the cam track follower pin 336 in the track 389 (see FIGURE 35); when the cam track follower pin 336 reaches the concentric track portion 390 (actually it is the track portion 390 which reaches the pin 336) the tone arm 350 will again be in its outermost position, the flap 322 of the plate 320 again touching the stop pin 375 (see FIGURE 36). During passage of the cam track follower pin 336 in the concentric track 390 the tone arm is further raised due to the sloping cam portion 385d, thereby reaching its uppermost position which is maintained by the track part 385e during passage of the pin 336 in the next two tracks 391 and 393. In the track 391 the pin 336 and thereby the tone arm is moved in an inward direction and is thereafter moved outwards again in the track 393. The tension of the spring 337, which tends to press the cam track follower pin 336 down to the bottom of the tracks, is sufficiently strong for the aforementioned sloping inner wall of the outwardly leading track 393 to guide the pin 336 in an outward direction when the tone arm 350 is able to swing without obstruction. The inwardly and outwardly directed movement of the tone arm in the tracks 391 and 393 as well as the extra raising of the tone arm by means of the track portion 385e is only necessary when the phonograph is used as a record changer; a detailed explanation of these movements will, therefore, be given hereinafter in connection with the description of the operation of the record changing phonograph.

After having passed through the outward leading track 393, the cam track follower pin 336 is guided into the stop track 395 in which the tone arm again reaches its outermost position, i.e. vertically above the switch post 260 (see FIGURE 52). In this position during passage of the cam track follower pin 336 in the stop track 395 the tone arm 350 is slightly lowered at first when the track portion 385f reaches the roller 347 of the vertical control lever 345, and later further lowered due to the cam portion 385f which brings the tone arm down to the rest position on the switch post 260, thereby causing the phonograph motor to stop. This lowering takes places in the same angular position of the cam disc as when the tone arm is set on a record, i.e. approximately one revolution of the turntable before the gear wheel 308 falls in the recess 383. When the switch 250 is opened the interia of the turntable allows it to rotate sufficiently to drive the cam disc to its stop position.

In the normal case where the phonograph is used as a record changing phonograph the spindle 310 is mounted on the hollow centre spindle 382 and a number of records are placed on the record supporting and drop control member 311 of the spindle.

As previously described the phonograph is started by pushing the manual control knob 240, whereby the bent portion 244 (FIGURE 17) of the pull rod 242 engages the periphery of the cam disc 380 and imparts an initial movement to the cam disc sufficient to bring the gear wheel 308 into engagement with the gear wheel 306, and sufficient to bring the roller 347 of the vertical control lever 345 into engagement with the sloping track portion 385b of the vertical control track 385. By this initial raising of the tone arm the motor switch is closed and as the initial movement of the cam disc is transmitted by the intermediate gear 308 to the driving gear 306, the motor will immediately start to act and through the driving gear 306 control the continuation of the thus initiated rotation.

During the first part of the rotation of the cam disc 380 the cam track follower pin 336 starting in the position shown in FIGURE 53 passes through the track 399 which directly conforms to a circular continuation of the stop track 395. During this passage only a vertical movement is transmitted from the cam portion 385b to the tone arm. When the cam track follower pin 336 reaches the concentric cam portion 390 the tone arm 350 is further raised to its uppermost position due to the sloping cam portion 385d whereafter the tone arm is maintained in this elevated position during passage of the roller 347 over the cam portion 385e. By means of the nut 342 (FIGURE 22) at the lower end of the rod 340 this uppermost position of the tone arm is preset into such a height that the pickup head 351 when moved inwardly by the inwardly leading track 391 abuts the edge of the lowest record in the magazine on the centre spindle 310. For this abutting purpose the side wall of the pickup head may be provided with a special abutment such as a vertical rib or the like.

Figure 37:
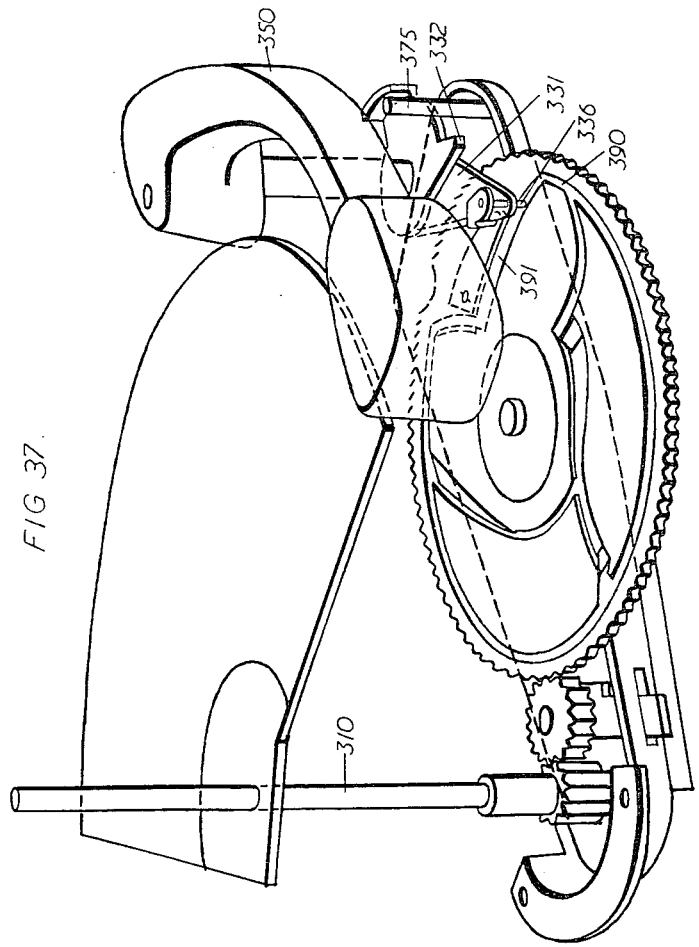

When the tone arm 350 in its elevated position has reached the horizontal position in which the pickup head 351 abuts against the edge of the record to be played, as shown in FIGURE 37, the further inwardly directed movement of the tone arm 350 is obstructed. The cam track follower pin 336, however, is bound to follow the inwardly leading track 391 this movement being possible due to the friction link the means of which the cam track follower arm 331 is connected to the tone arm shaft 367. By overcoming the friction in this friction link the cam track follower arm 331 will continue to swing inwardly to the position shown in FIGURE 38 where the cam track follower pin 336 has reached the end of the inwardly leading track 391. It will be understood that in this position of the parts there is obtained an angular displacement between the cam track follower arm 331 and the tone arm 350 which is well defined by the abutting position of the pick head 351, i.e. by the diameter of the record to be played.

Figure 39:
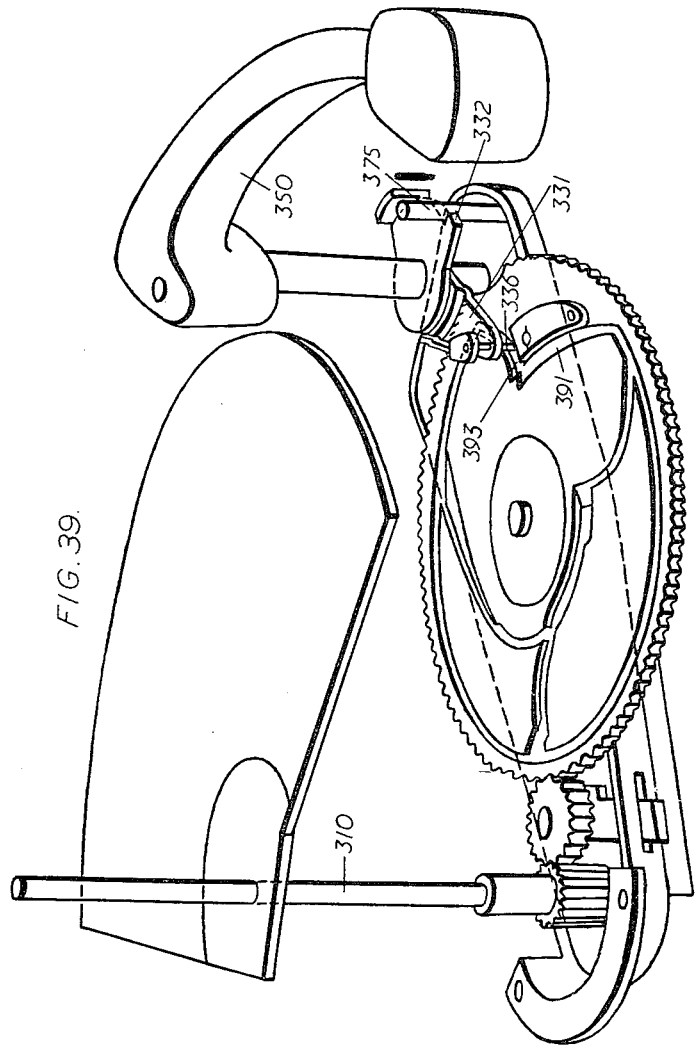

Thereafter the pin 336 is moved outwardly in the outward leading track 393 and as the tone arm is able to move freely in an outward direction it follows this outward movement until the flap 322 of the plate 320 abuts against the stop pin 375, as shown in FIGURE 39. The outwardly directed movement of the tone arm is thereby stopped and due to the constant rotation of the cam disc 380 the upwardly sloping inner side wall of the track 393 is pressed against the cam track follower pin 336, pressing it back against the action of the spring 337.

The friction in the friction link established by the spring 326, the tension of the track follower pin spring 337, and the inclination of the sloping side wall of the track 393 are so adapted that the horizontal force produced by the engagement between the track follower pin 336 and the sloping side wall of the track 393 is insufficient to overcome the friction in the friction link and thereby cause the cam track follower arm 331 to be swung in an outward direction. In other wards, the friction in the friction link is large enough to cause the cam track follower pin 336 to be lifted against the action of the spring 337 by the passing, sloping side wall of the track 393.

Figure 40:
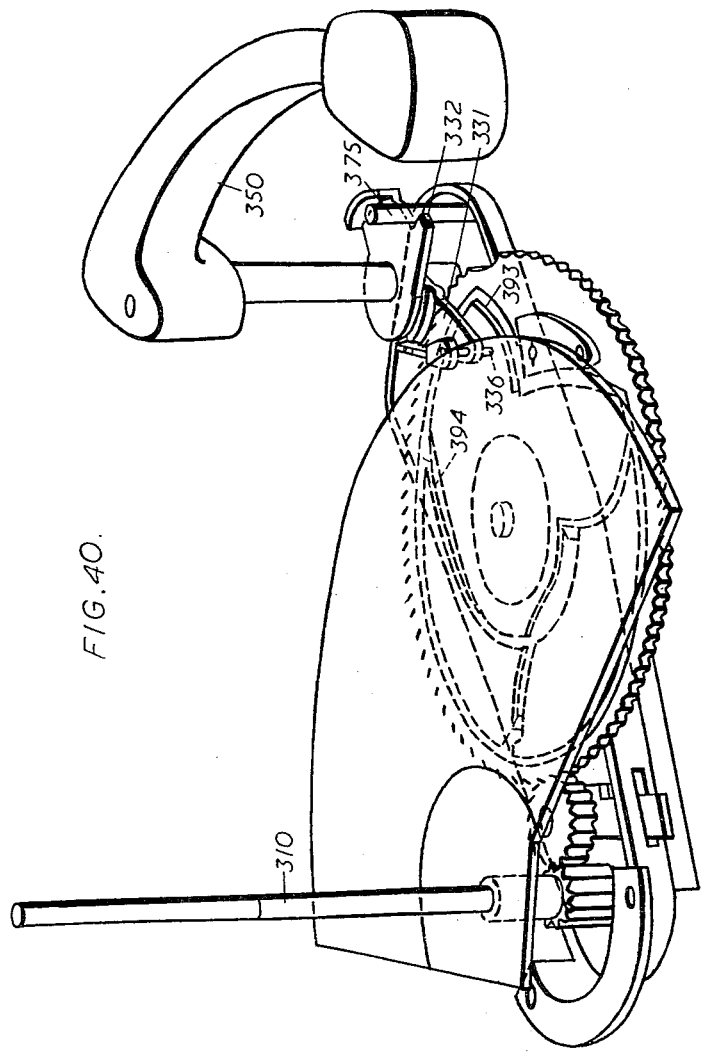

Therefore, it will be understood that at the moment when the flap 322 abuts against the stop pin 375 the cam track follower pin 336 leaves the track 393, passes over the sloping side wall of this track and up on the surface of the cam disc as shown in FIGURE 40. During further rotation of the cam disc 380, the cam track follower pin 336 passes over the surface of the cam disc, without imparting any horizontal movement to the tone arm 350. During this passage the tone arm is, however, lowered by the cam portion 385f to a position which is maintained by the next track portion 385g, and in which the top of the pickup head 351 is situated below the level of the underside of the lowermost record in the magazine.

While the tone arm is maintained in this most exterior position during passage of the cam track follower 336 over the surface of the cam disc, the record drop controlling mechanism is actuated by the nose 980c on the cam disc 380 as previously described. The record, the size of which has just been tested will thereby be dropped to the playing position on the turntable 305.

By the further rotation of the cam disc 380, the cam track follower pin 336 is guided down over the sloping part of the inner wall of the cam track 394 and abuts against the steep side wall of this track.

The track 394 guides the cam track follower pin 336 and thereby the tone arm in inward direction until the cam track follower pin 336 reaches the concentric track 396.

Considering again the merging point between the two tracks 391 and 393, i.e. the point where the cam track follower pin 336 stops its inwardly directed movement in the track 391 while the pickup head still abuts the edge of the record to be played, it will be understood that the angular displacement obtained between the tone arm and the cam track follower arm 331 is determined by the distance from the merging point to the centre of the cam disc. This distance is slightly bigger than the radius of the concentric track portion 396. It will be understood that the pickup head, when the cam track follower pin 336 reaches the concentric track portion 396, is brought to a position which is slightly nearer to the centre of the turntable 365 than the position in which the pickup head 351 abuts the edge of the record to be played. Thus by properly dimensioning the parts such a relative displacement between the two positions of the tone arm will be obtained that the stylus member of the pickup head, when lowered on the record, will engage the inlet groove of the record.

To enable adjustment of the difference between the two distances there is provided a plate 384 (FIGURE 25) on the upper surface of the cam disc 380. This plate is fulcrummed on a pin 384a and has its inner side edge situated substantially along the outer side wall of the inwardly leading track 391. At the end opposite the pin 384a, the plate 384 further has slot 384b, cooperating with a screw 384c to fasten the plate 384 rigidly to the cam disc 380. Adjustment of the angular position of the plate 384 is done by pivoting it about the pin 384a and thereafter fastening it in the desired position by means of the screw 384c.

It will be understood that such setting normally will be necessary only once in production during the test of each phonograph.

In order, however, to enable an easy re-setting for example when a new tone arm is mounted, the screw 384c is so arranged that it is accessible through the space between the turntable and the chassis plate in one position of the cam disc.

The concentric track portion 396 is somewhat broader than the preceding tracks to enable the cam track follower pin 336 to move sidewardly for the purpose of allowing the stylus to find the initial inlet groove of the record to be played. The length of this broadened track portion 396 corresponds substantially to one revolution of the turntable 305.

The cam disc 380 continues to turn until the gear wheel 308 falls into the recess 383 of the cam disc whereby as previously described further rotation of the cam disc is interrupted. At this point the cam track follower pin 336 is situated at the beginning of the playing recess 386.

Thereafter the record is played in the normal way while the cam track follower pin 336 moves in the playing recess 386. When the playing is finished and the stylus of the pickup head reaches the outlet groove of the record the trip starter actuating lever 339 actuates the trip starter mechanism, whereby as described above the cam disc is given an initial movement sufficient to bring the gear wheel 308 into connection with the driving wheel 306. By this initial movement the tone arm is immediately raised to the neutral position shown in FIGURE 34. When the cam disc has rotated a certain angle the end wall 388 hits the cam track follower pin 336 and starts to swing the cam track follower arm 331 and thereby the tone arm in an outward direction; this outwardly directed movement continues during the passage of the cam track follower pin 336 in the outwardly leading track 389 until the abutment flap 322 of the horizontal tone arm plate 320 abuts against the stop pin 375 as indicated in FIGURE 35. Due to the previous displacement between the tone arm and the cam track follower arm 331 this position is reached before the cam track follower pin 336 has reached its outermost position in the track portion 390. Due to the steep side wall of the outwardly leading track 389, the cam track follower pin 336 is, however, forced to move in an outward direction, this movement being possible due to the friction link. Thereby the abutment flap 322 continues to abut against the stop pin 375 while the cam track follower pin 336 is moved in the track 389. When the cam track follower pin 336 reaches the track portion 390 the track follower arm 331 has been preset to the desired starting position relatively to the tone arm to allow testing of a new record of any size or in the absence of a record to be tested, to cause movement to the stop position. The further movement of the parts is identical with the movements already described in connection with the previous testing of the size of the record which has now been played, or if no record displaces the cam track follower pin 336 by being engaged, the tone arm is moved to the stop position, as described in connection with the stopping after playing a single record.

Figure 36:
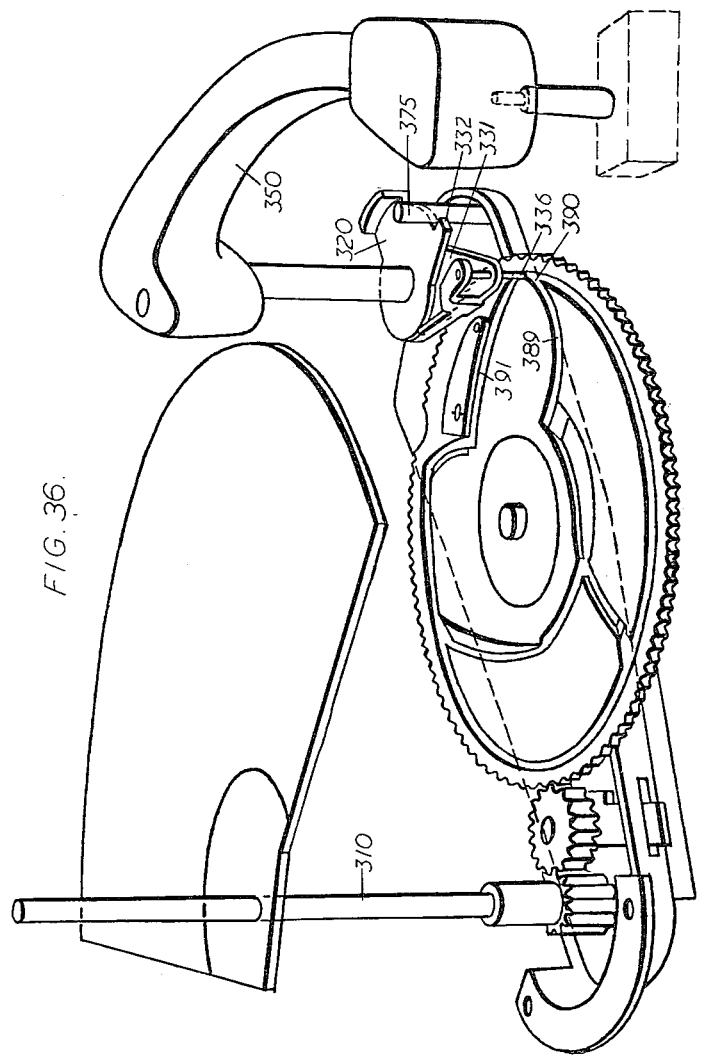

It will be understood that the testing of the size of the record will always be started from the position shown in FIGURE 36, so that all tests proceed from identical initial conditions irrespective of the size of the records.

In order to reject a record in any position of the tone arm during the playing of this record, for example as shown in FIGURE 33, the operator presses the push button 240 whereby, as described, the cam disc is given an initial movement sufficient to switch on the automatic driving arrangements for the cam disc. Thereby the tone arm is immediately raised to the neutral position as already described, and during the first part of rotation of the cam 380 the cam track follower pin 336 is guided in the playing recess 386 without imparting any movement to the pickup arm. When the end wall 388 reaches the cam track follower pin 336 the tone arm is swung in an outward direction and pre-setting of the friction link takes place as previously described. Thereafter the further movements of the parts are as already explained.

It will be understood that with this embodiment in which feeling of the record size takes place during a movement from an outermost position of the tone arm in an inward direction, more than one record may be engaged unless the lowest record is dropped to an intermediate position on the centre spindle with its edge at the level of the path of the tone arm abutment. Therefore, it may be convenient to load the centre spindle 310 in such a way that the records having the largest diameter are placed at the bottom of the stack with records of decreasing diameters towards the top.

In FIGURES 33 to 55 some positions of the parts of the phonograph during playing, testing and changing of records of various sizes are shown. These positions will now be briefly explained.

FIGURES 33 to 42 show operation with a medium size record, for example, with a 10 inch record.

In FIGURE 33 is shown the position of the parts when the tone arm is playing a record. The cam track follower pin 336 moves in the playing recess 386 and the gear wheel 308 rests in the recess 383 of the cam disc thereby being out of engagement with the driving wheel 306.

Figure 34:
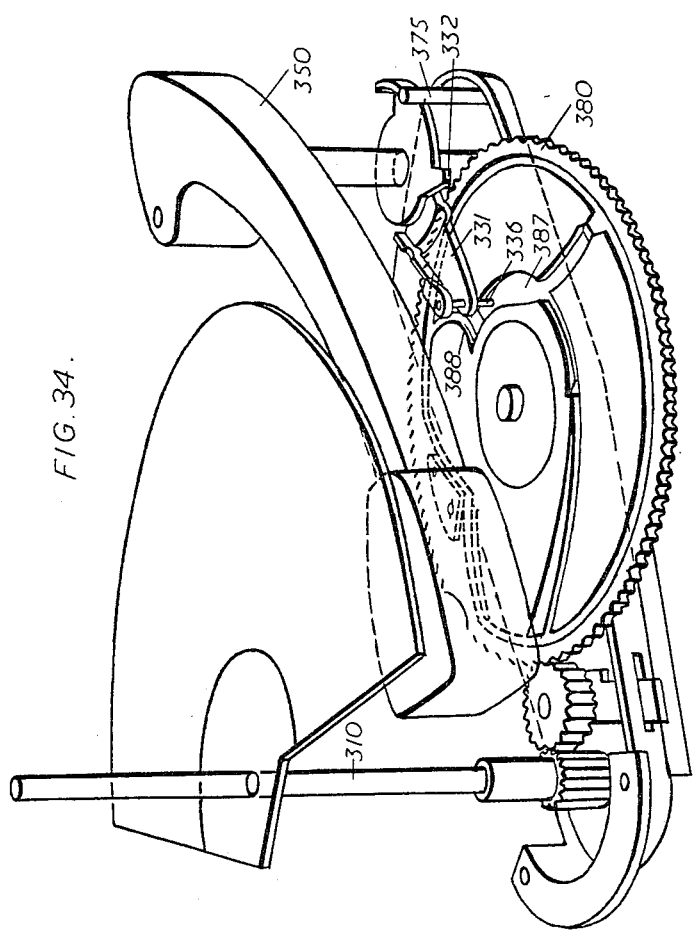
Figure 35:
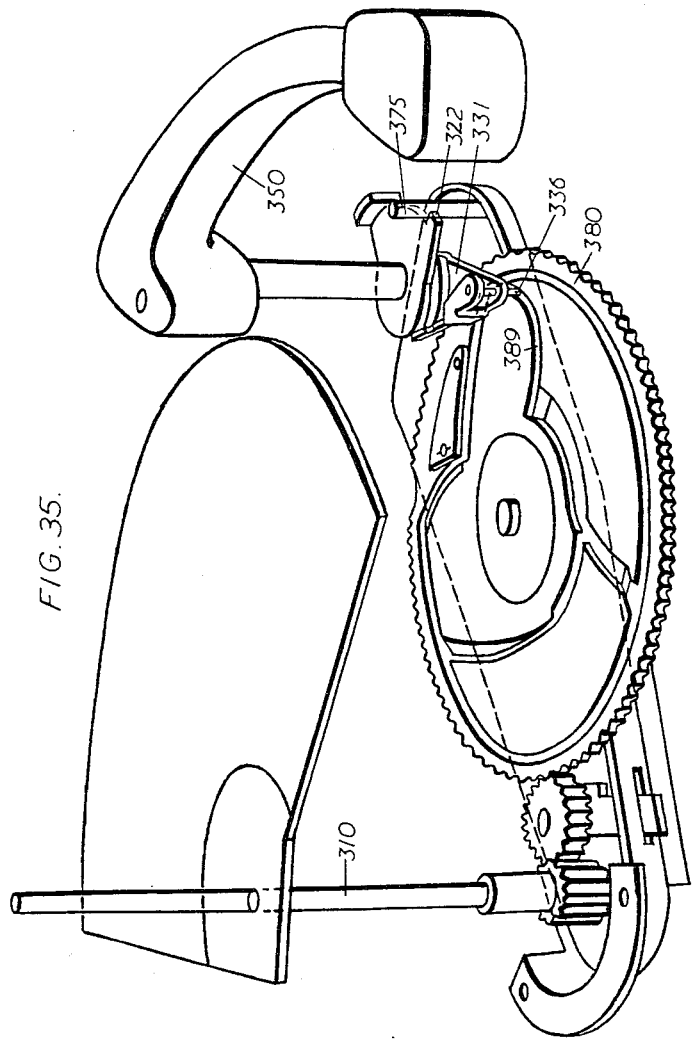

In the position shown in FIGURE 34 the tone arm has just been raised after having finished the playing of the record in FIGURE 33, whereby the trip starter mechanism has been actuated and has started the rotation of the cam disc. Thus, the gear wheel 308 is now in connection with the periphery of the driving wheel 306 and with the cam disc 380.

By this rotation the cam disc has moved sufficiently so as to lift the tone arm to its neutral position and to bring the end wall 388 of the playing recess 386 adjacent the cam track follower pin 336.

In FIGURE 35 the tone arm has been moved outwardly due to the passage of the cam track follower pin 336 in the outwardly leading track 389 until the flap 322 abuts against the stop pin 375, i.e. to the most exterior position of the tone arm. When the last record was tested, the cam track follower arm 331 was given a certain displacement in the manner described above. Due to this displacement the cam track follower pin 336 has not reached the track portion 390 at the moment when the flap 322 abuts against the stop pin 375, as shown in FIGURE 35, but assumes a position at a certain point of the track 389.

In FIGURE 36 the tone arm 350 is still in its most exterior position with the flap 322 abutting against the stop pin 375. The cam disc has now rotated sufficiently to bring the cam track follower pin 336 out to the track 390. The movement of the cam track follower pin 336 in the last part of the track 389 has been carried out by overcoming the friction in the friction link so as to pre-set the angular relationship between the cam track follower arm 331 and the tone arm.

In FIGURE 37 the tone arm has been moved inwardly to the point where it abuts against the edge of the lowermost record in the magazine supported on the centre spindle 310. The record shown is a large size record, for example a 12 inch record. The track follower 336 at that time has finished the passage in the concentric track portion 390 and started the inwardly directed movement in the track 391.

Figure 38:
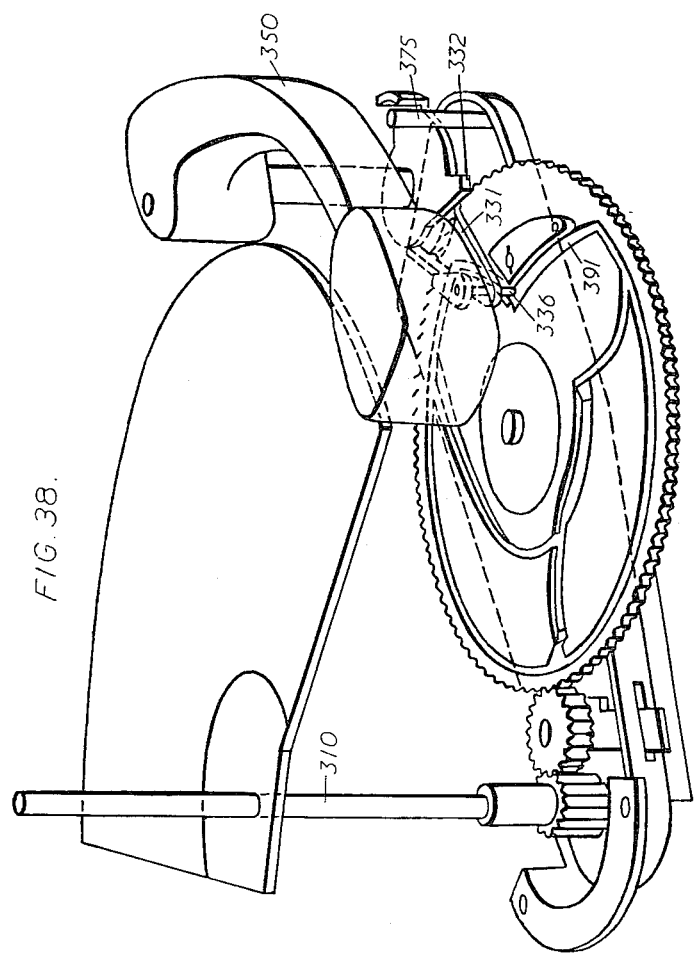

In FIGURE 38 the tone arm 350 is still in the position in which the pickup head abuts against the edge of the record to be tested, while the cam track follower pin 336 has continued its movement in the inwardly leading track 391. By this movement of the cam track follower pin 336 the friction in the friction link has been overcome, and in this position the angular displacement between the cam track follower arm 331 and the tone arm 350 is finished so as to respond to the size of the record being tested. Because the record is of a large size the edge of the record is engaged at a relatively early stage in the passage of the cam track follower pin 336 in the track 391 and the displacement between the cam track follower arm 331 and the tone arm is relatively large. This angular relationship between the two arms is maintained until the friction link is re-set before testing another record to be played.

In FIGURE 39 the cam track follower pin 336 has been moved so far outwardly in the track 393 that the tone arm which is capable of following this outwardly directed movement without any obstruction has reached its most exterior position in which the flap 322 abuts against the stop pin 375, thereby obstructing any further outwardly directed movement of the tone arm, and thereby causing some obstruction to a further outwardly directed movement of the cam track follower arm 331, such further movement only being possible by overcoming the friction in the friction link.

In FIGURE 40 the tone arm is still in its most exterior position and the cam track follower pin 336 has left the outwardly directed track 393 having passed over the sloping inner side wall of this track without any alteration of the angular relationship between the cam track follower arm 331 and the tone arm 350. Due to the angular position between the two arms when testing a large record the cam tracks follower pin 336 leaves the track 393 near the inner end thereof. This escape of the cam track follower pin is enabled because the sloping inner wall portion of the track 393 is not able to produce a horizontal force on the cam track follower pin 336 sufficient to overcome the friction of the friction link. The sloping portion therefore, causes the cam track follower pin 336 to be lifted against the action of the spring 337 until it rests on the surface of the cam disc. In this position of the parts the record drop controlling mechanism is actuated by the nose 980c (FIGURE 30) of the drop control cam 980 on the underside of the cam disc 380 so as to drop the record tested to the playing position on the turntable 305, as shown in FIGURE 40.

Figure 41:
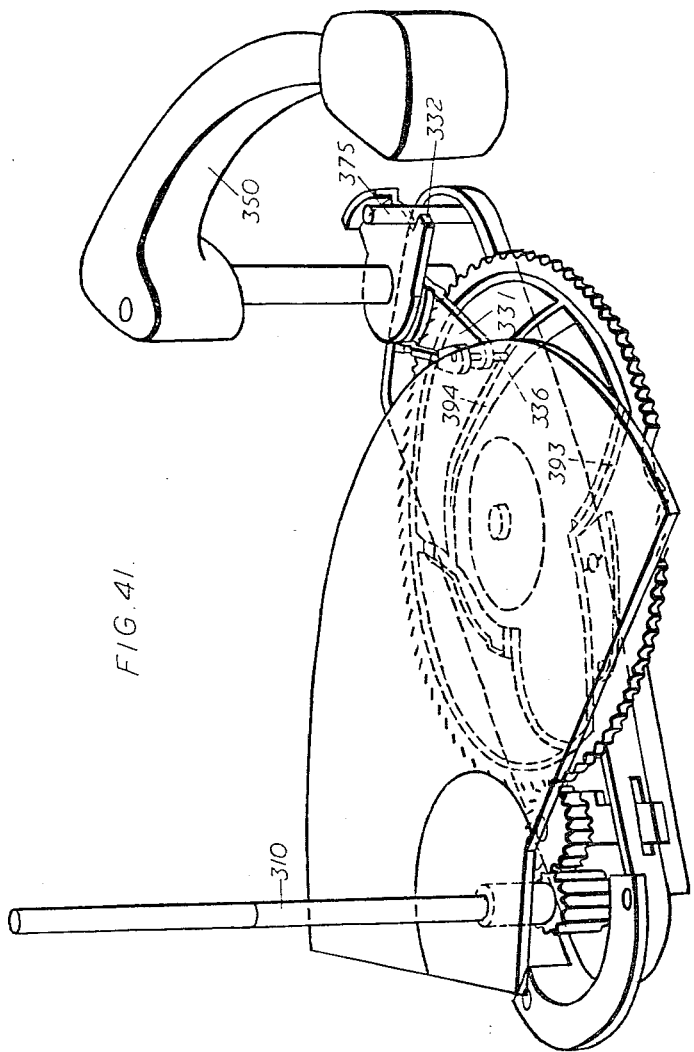

In FIGURE 41 the cam track follower pin 336 has just been brought down over the downwardly sloping inner side wall of the inwardly leading track portion 394. The tone arm 350 is still in its most exterior position, but is now, during the passage of the cam track follower pin 336 over the surface of the cam disc between the tracks 393 and 394, lowered to its neutral position by the control track portion 385f.

Figure 42:
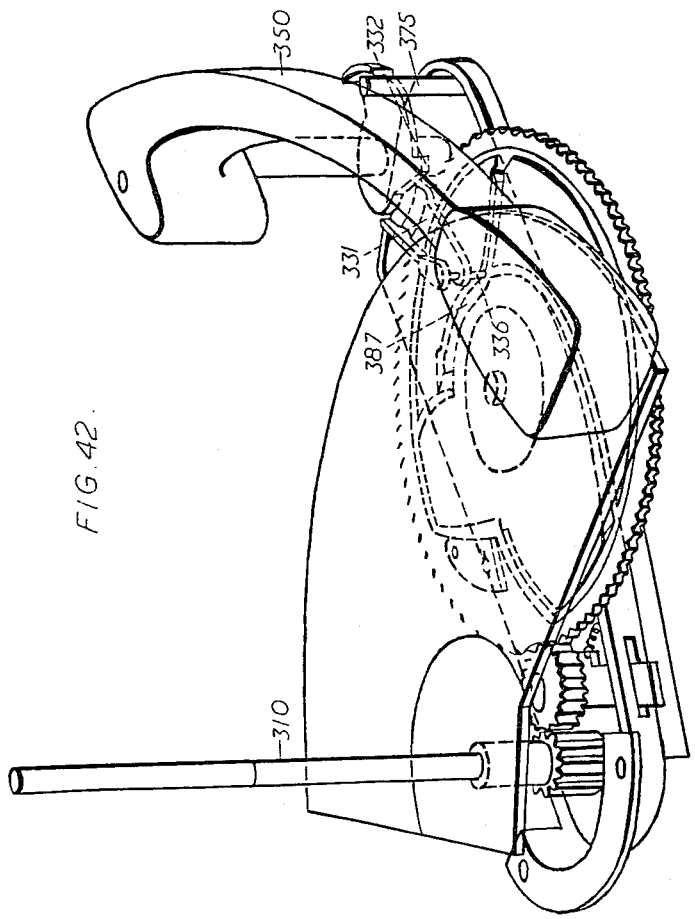

As shown in FIGURE 42 the cam track follower pin 336 thereafter is moved inwardly in the track 394, until the entrance to the concentric track portion 396 is reached. In this position of the cam track follower arm 331 the tone arm has reached a position in which the stylus of the pickup head is situated vertically over the initial groove of the record to be played as previously explained.

In FIGURE 42 the tone arm is lowered by the control cam portion 385h so as to bring the stylus of the pickup head 351 into engagement with the inlet groove of the record dropped on the turntable. The lowering of the tone arm takes place during passage of the cam track follower pin in the concentric track portion 396. At the moment when the cam track follower pin leaves this concentric track portion and is thereby moved out into the playing recess 386, the recess 383 in the edge of the cam disc has reached the position where it receives the gear wheel 308 so as to stop further rotation of the cam disc. Thereafter the cam track follower pin 336 moves freely in the playing recess 386 while the stylus arm is playing the record. When the pickup member reaches the outlet groove of the record, the trip starter mechanism is actuated by the trip starter actuating lever 339 as previously described. Thereby the cam disc again starts to rotate and thereby causes the tone arm and the cam track follower arm 331 to be moved as already described with reference to FIGURES 34 to 36.

In FIGURES 43 to 46 are shown some positions of the parts of the phonograph during the testing of a record having a smaller diameter than the record that has just been played for example a 10 inch record.

Figure 43:
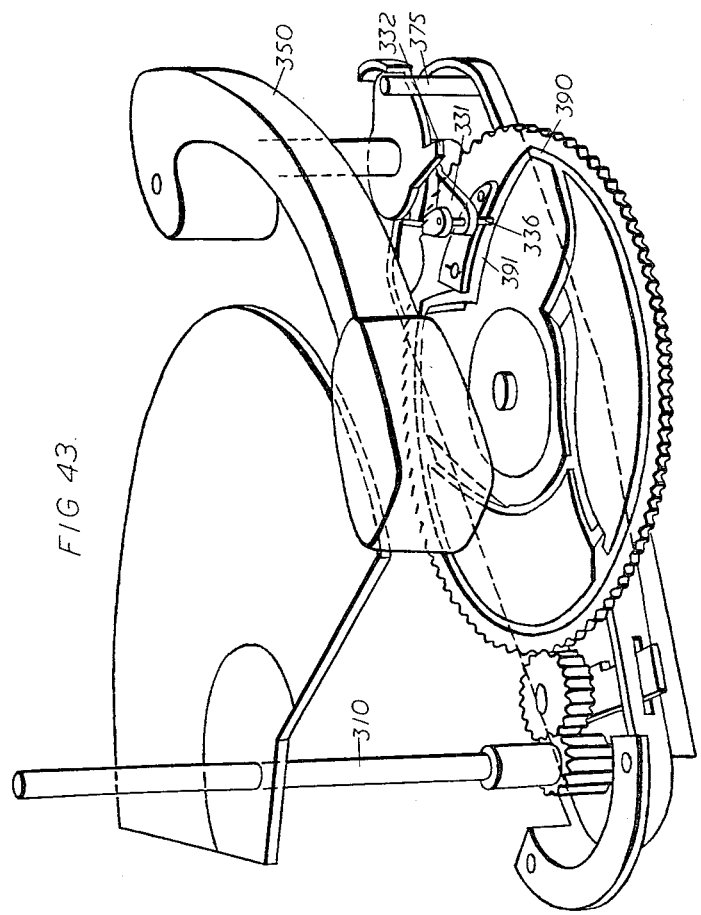

The position in FIGURE 43 corresponds in this respect to the previous position shown in FIGURE 37, wherein the cam track follower arm 331 has traveled so far in the inwardly leading testing track 391 that the side wall of the pickup head is brought into engagement with the edge of the record to be played. When comparing FIGURES 37 and 43 it will be understood that these positions of the part are reached later in FIGURE 43 than in FIGURE 37 due to the smaller diameter of the tested record. It will thus be seen that the cam track follower pin 336 in FIGURE 43 has been able to move further in the inwardly leading track 391 before the record edge abutting position of the pickup head is reached.

Figure 44:
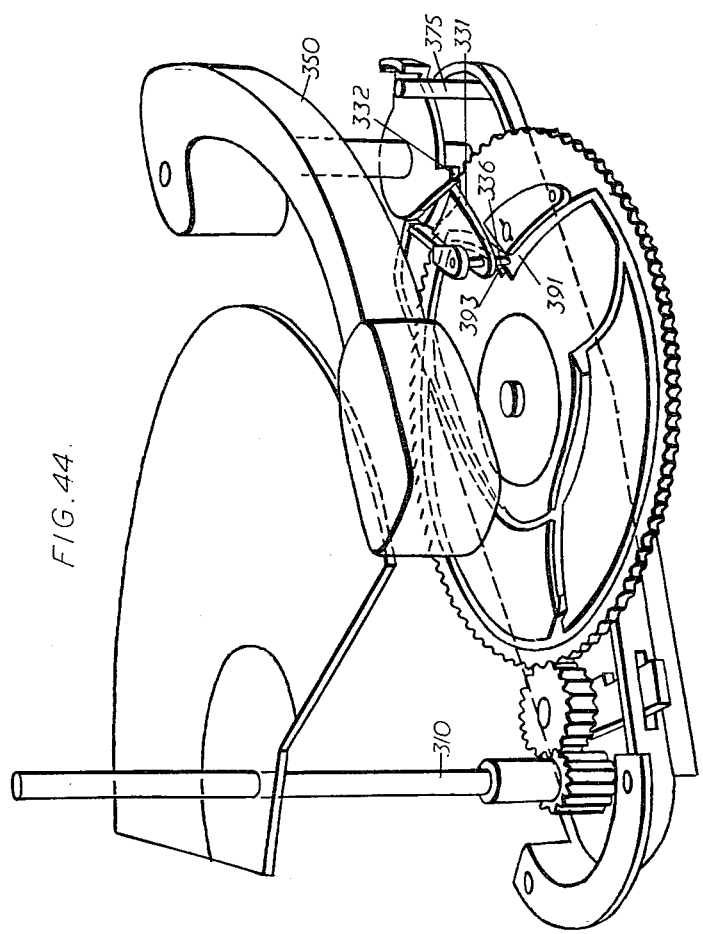

In FIGURE 44 which corresponds to FIGURE 38 the cam track follower pin has reached the merging point between the two tracks 391 and 393 whereby the setting of the friction link due to the forced passage of the track follower in the rest of the track 391 is completed. It will be understood that the angular displacement of the cam track follower arm 331 during this movement is less than in the case of a record having a larger diameter.

Figure 45:
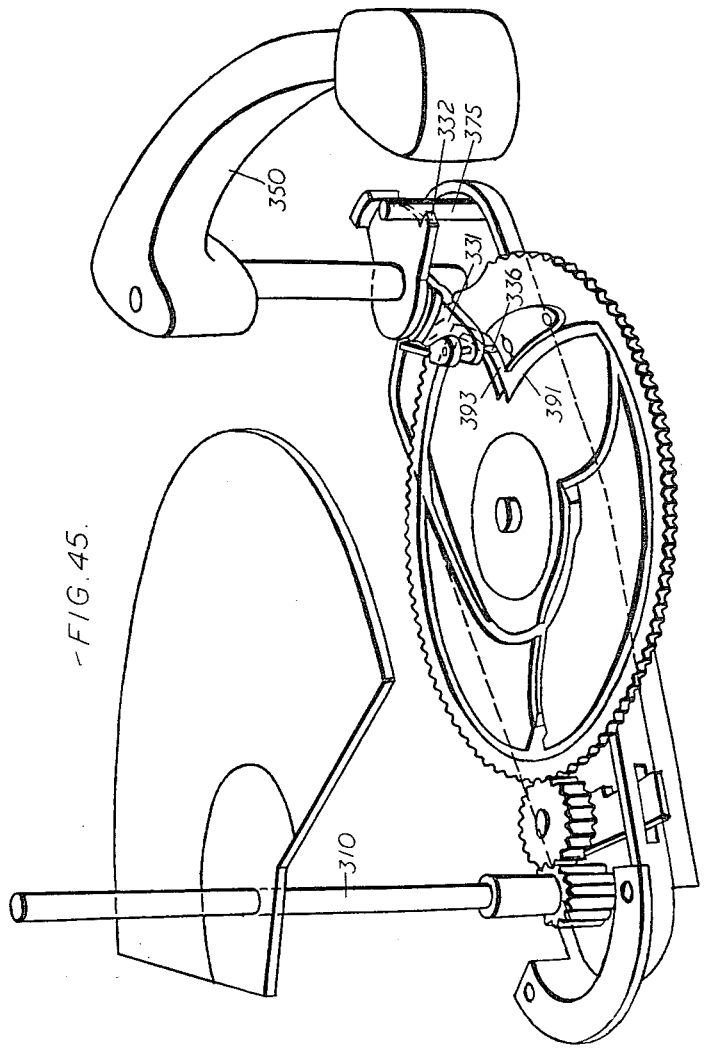

In FIGURE 45 which corresponds to FIGURE 39 the tone arm has been swung outwardly during passage of the cam track follower pin in the outwardly leading track 391 so that the flap 322 abuts the stop pin 375. Due to the smaller displacement of the cam track follower arm 331 in this case it will be understood that the cam track follower pin 336 will move further out in the outwardly leading track 393 before the flap 322 abuts against the stop pin 375 as compared with the position shown in FIGURE 39.

Figure 46:
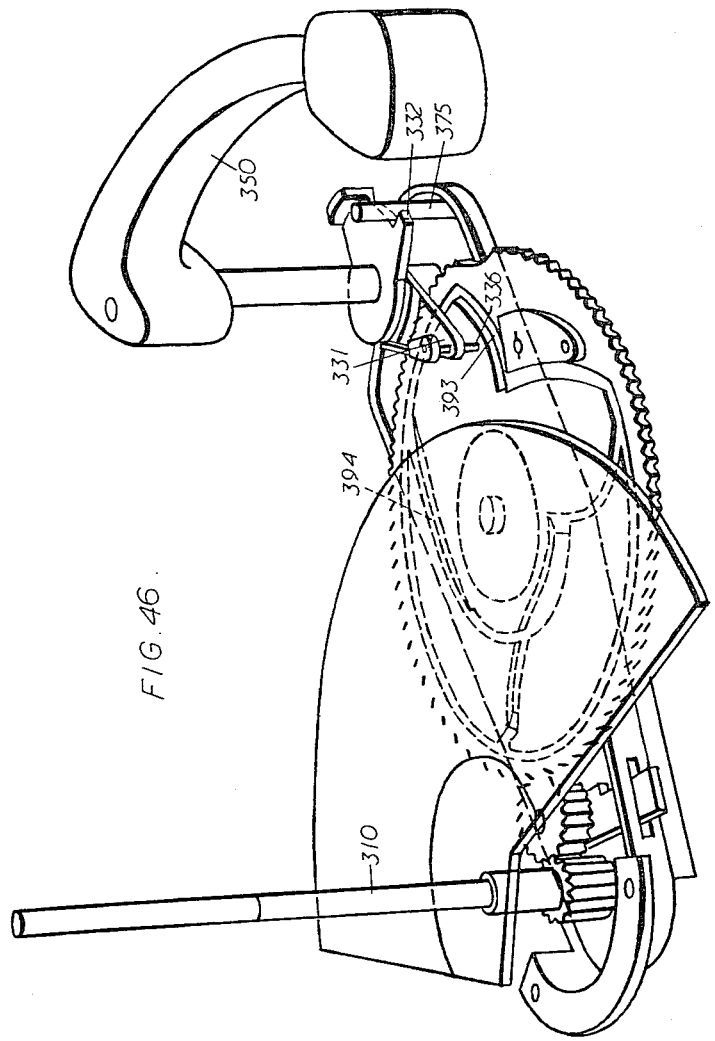

In FIGURE 46 the cam track follower pin 336 has passed the sloping side wall 393 and slides across the surface of the cam disc 380. In this position of the parts the record which has just been tested is dropped to the playing position on the turn-table as is also shown in the corresponding FIGURE 40.

Thereafter the further movement of the parts takes place as described with reference to FIGURES 41 and 42.

Figure 47:
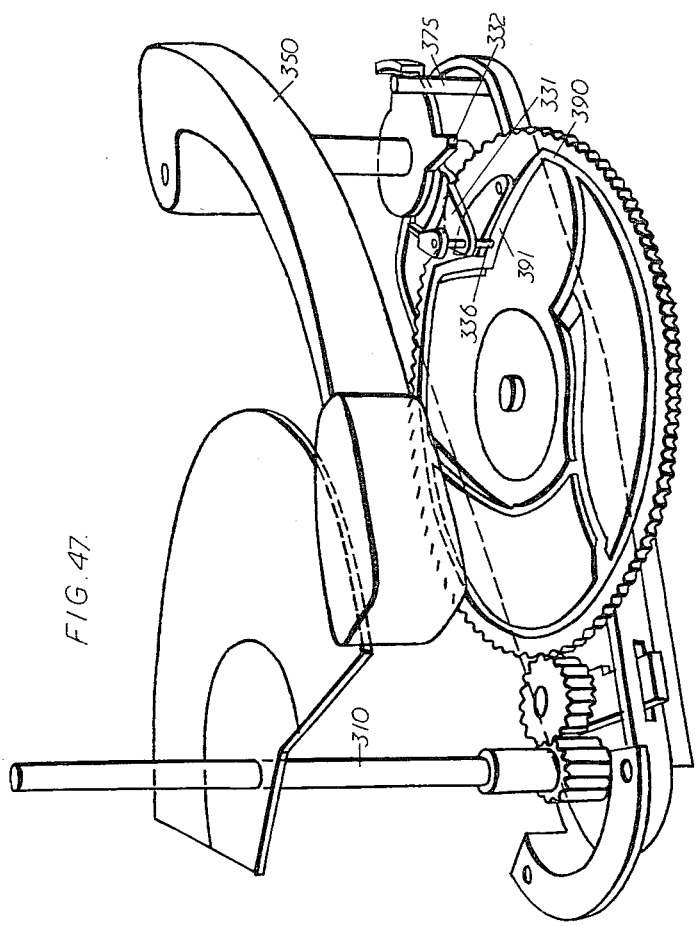

In FIGURE 47 the parts of the phonograph are shown in positions corresponding to those of FIGURES 37 and 43, in which the tone arm due to the passage of the cam track follower pin 336 in the inwardly leading track 391 has just been brought into engagement with the edge of the record to be played, but the record in the case of FIGURE 47 has a very small diameter, for example a 6 to 7 inch record. It will be understood that the cam track follower pin 336 in this case is very near the bottom of the inwardly leading track 391 before the pickup head 351 reaches its abutting position against the edge of the record.

Figure 48:
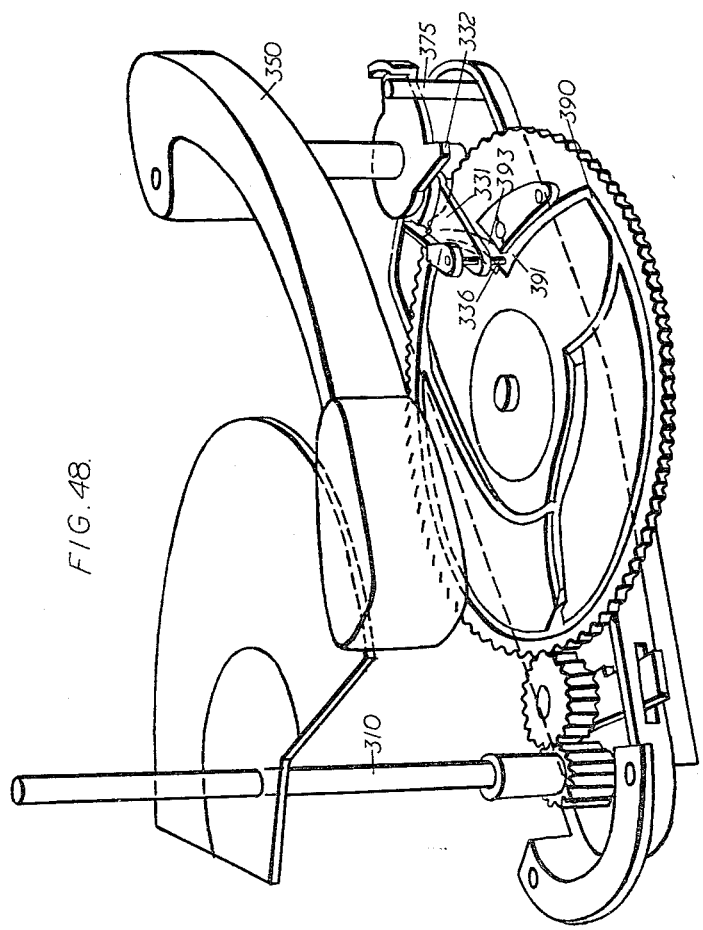

The cam track follower pin 336 is brought to the position shown in FIGURE 48, i.e. to the beginning of the outwardly leading track 393, by only a small displacement of the track follower arm 331.

Figure 49:
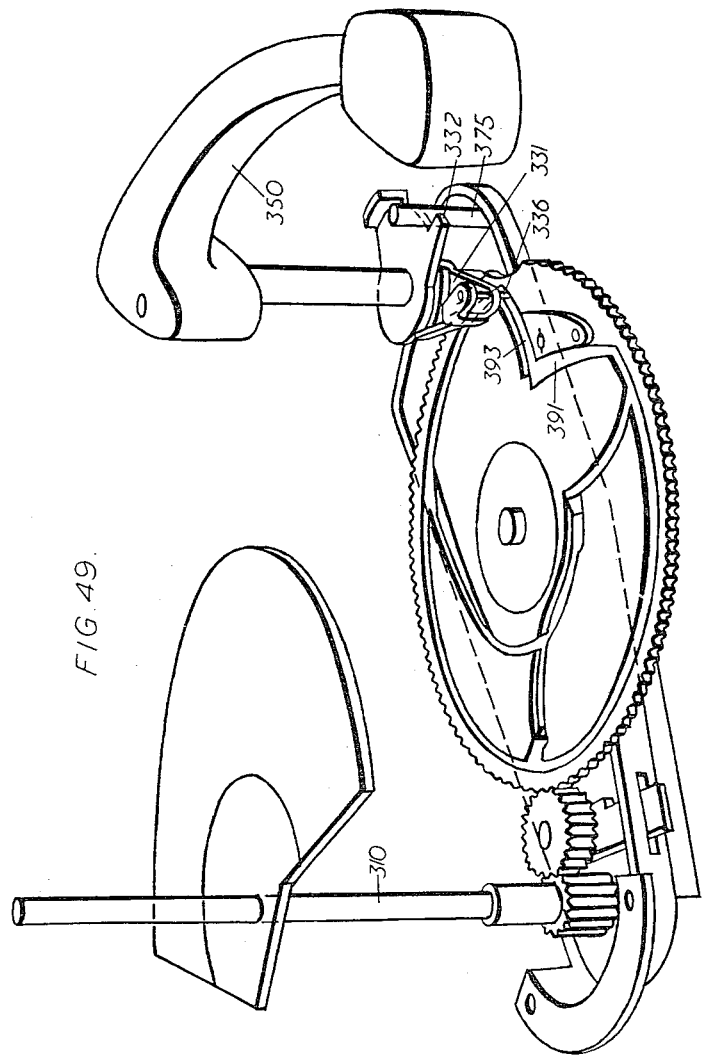
Figure 50:
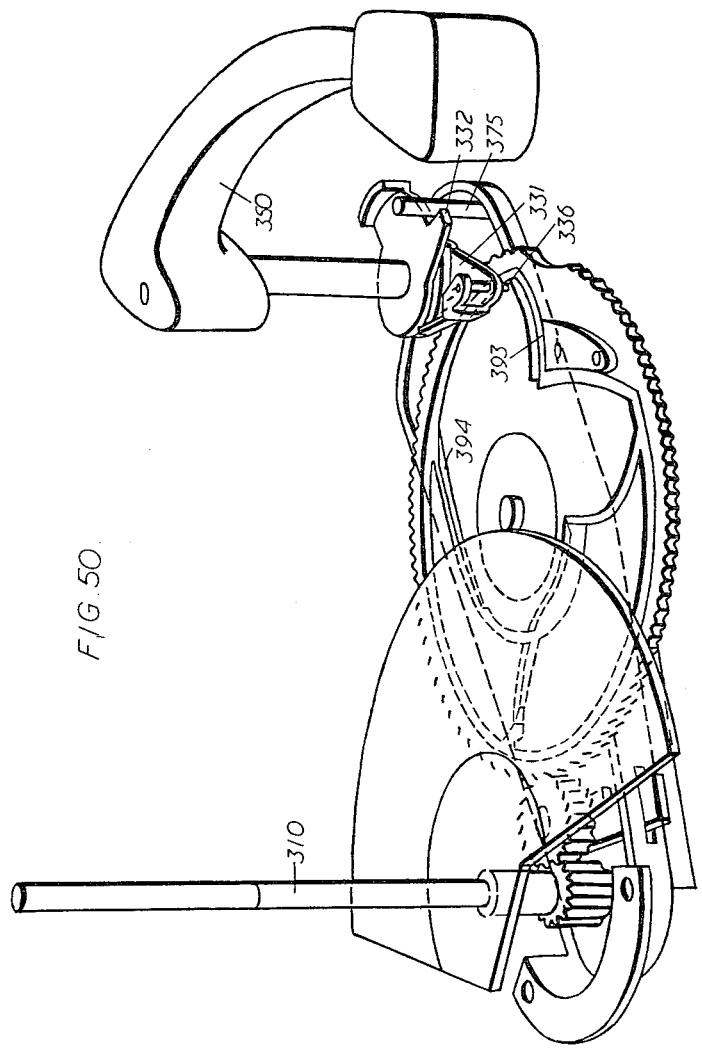
Figure 51:
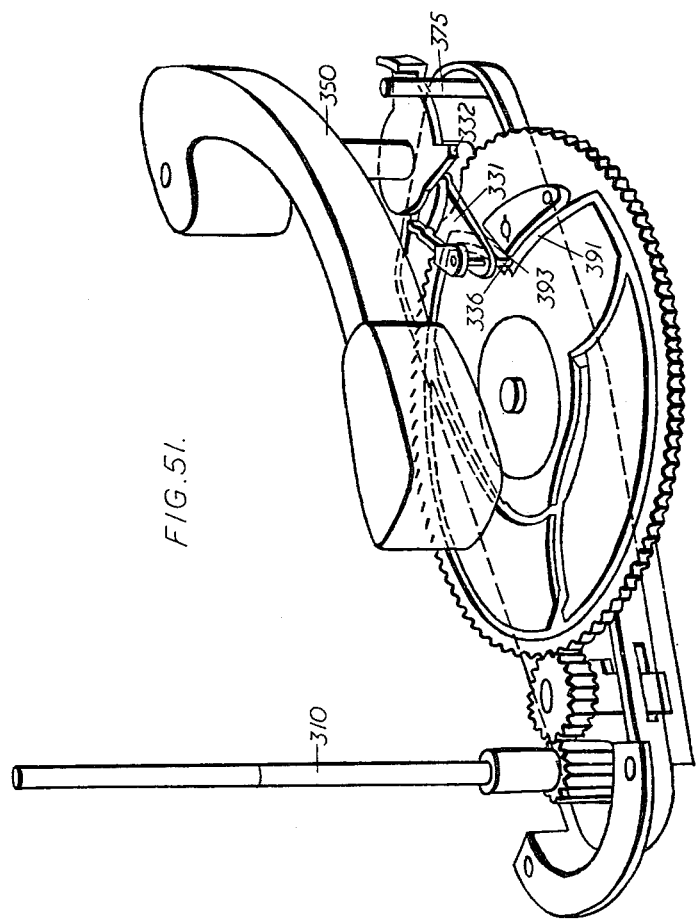

In FIGURE 49 the tone arm 350 is swung outwardly until the flap 322 abuts against the stop pin 375. Due to the small displacement of the cam track follower arm 331 the cam track follower pin 336 is located in this position very near the end of the outwardly directed track 393. The cam track follower pin has, however, no possibility of entering into the stop track 395 due to the abutment of the flap 322 and the stop pin 375 and the fact that there is always a displacement between the cam track follower arm 331 and the tone arm when the edge of a record is engaged, so on rotation of the cam disc 380 the cam track follower pin 336 has to pass the sloping side wall of the track 393 as previously described and thereafter pass across the surface of the cam disc 380, as shown in FIGURE 50.

If there are no more records in the magazine of the phonograph when the tone arm moves in an inward direction due to passage of the cam track follower pin 336 in the test track 391, the cam track follower pin will reach the bottom of the track 391 without causing any displacement of the cam track follower arm 331, because the tone arm is able to move freely in an inward direction. The parts are so adapted in the case where the cam track follower arm 331 has not been displaced during the test movement of the tone arm that the cam track follower pin 336 can be guided right through the track 393 and out to the beginning of the concentric track 395 at the moment when the flap 322 engages the stop pin 375. Thereafter the stop movement of the phonograph takes place as previously described with reference to a single record playing phonograph.

*Example II.—FIGS. 54–82*

While in the embodiment described with reference to FIGS. 16–53 testing of the record takes place by means of movement of the tone arm from a most exterior to an interior position whereby the tone arm is brought to abut against the edge of the lowest record in the stack of records, the embodiment to be described involves an outward movement of the tone arm in engagement with the underside of the stack of records with a rough setting of the tone arm abutment in a position slightly outside the edge of the lowest record in the stack and a subsequently inwardly directed movement in which the final test of the record is completed during the revolution of the cam disc.

The general external appearance of this embodiment may be as shown in FIGURE 54, i.e., similar in appearance to the previous embodiment. The phonograph has a chassis 500 with a start control knob 440 and a post 460 which includes switch actuating means and on which a tone arm 550 rests when the record changer is at a standstill. The tone arm 550 carries a pickup-head 551. The centre spindle is designated by reference numeral 510 and the intermediate support for the stack of records in the magazine is designated by 511, while the turntable is designated by 505.

While in the preceding embodiment the movement of the tone arm in an outward direction is not stopped until in the exterior position and then by a mechanical abutment between the abutment 322 and the pin 375, it is necessary, in the case of a preceding outward movement intended to preset the abutment of the tone arm to a position slightly outside the edge of the lowest record in the stack, to provide extra means to interrupt the outward movement of the tone arm in such desired angular position relatively to the edge of the lowest record.

This can be achieved in various manners of which one is shown in FIGS. 54–82 namely in the form of a brake which is actuated when a feeler abutment on the top of the tone arm snaps over the edge of the lowest record. More specifically this brake is remotely controlled and still more specifically the remote control is an electrical control arrangement.

To ths effect the pick-up head 551 includes a switch arrangement, as is clearly shown in FIGS. 56 and 57. In a slot 651 provided in the top surface of the pickup-head 551 there is inserted a body generally designated by reference numeral 652 having a substantially plane top surface 653 and having a downwardly open cavity. At one end of this body 652 there is a small hole 654 for the reception of a small pin 655, the lower end of which has a collar 656. At the other end of the body 652 there are arranged a pair of brackets 657 and 658 extending above the top surface and between which a small wheel or roller 659 is mounted with its top extending slightly above the brackets 657 and 658. As shown in FIG. 57 the body or housing 652 which fits in the slot 651 has, below the brackets 657 and 658, a portion of increased thickness 660 defining a surface 661 below the top wall. To this surface 661 there are secured a pair of wire springs 662 and 663 of which one has a bent end portion 662a overlying the end of the wire 663 so as to form a switch comprising the two wires that may be of silver or silver-plated. The wires may be fixed at the surface 661 simply by melting the wires in the material of the body 652 which may be polysterole or a similar thermo-plastic material having insulating properties. The spring 662 is tensioned upwardly so that in its position of rest it presses the small pin 665 up to a position in which it projects upwardly through the hole 654 in the top of the body 652. When the pin 665 is depressed it bends the spring 662 down to engage the spring 663 and thereby closes the contact comprising the two springs 662 and 663.

It will be understood that when the tone arm 550 moves outwards in engagement with the underside of the lowest record in the stack supported on the centre spindle the small wheel or roller 659 rolls along the surface of the record until it snaps over the edge thereof whereafter the small pin 655 engages the surface of the record and is depressed to close the switch consisting of the springs 663 and 662.

Thus an electrical relay (more specifically shown in FIGURE 58) will be actuated to stop the outward movement of the tone arm 550 in a manner more fully described hereinafter.

The relay is of very simple design and comprises a spool body 665 having end flanges 666 and 667 of which the top flange 666 has an outwardly extending arm 668 with a slot 669 which communicates with a central bore 670 in the spool in order to receive an armature in the form of a wire or rod 671 of L-shape so that one branch thereof is received in the recess 669 while the other branch passes down through the central bore 670. The lower end of this latter branch is screw-threaded and the entire relay is secured on the bridge 570 by a nut 671 with the rod passing through a hole therein. The relative position of the relay is indicated in FIGURE 55. The coil 674 of the relay is mounted on the spool 674. At one end, one side of the slot 669 is provided with a recess 669a which supports one end 673a of one end of a tiltable plate 673 extending up through the recess 669a of the slot 669 while the other end 673b of the plate 673, which is of reduced width, passes through a rectangular slot 675 in the bridge 570 whereby the plate 673 by a pair of shoulders tiltably rests on the top surface of the bridge 570.

The relay 666 shown in FIG. 58 is secured on the bridge 570 in a position indicated in FIG. 55 and cooperates with a brake member associated with the tone arm spindle in a manner to be described more fully hereinafter. The relay together with the spring switch 662, 663 is included in an auxiliary electric circuit with a voltage source for example an extra low tension winding on the stator of the phonograph motor producing for example 4.5 volts or if desired a small dry cell battery. I have found that without any disadvantage I can use the cable of the pickup cartridge inside the pickup head 551 which passes through the tone arm 550 as part of this wiring insofar as I can use the traditional screen used in the pickup cable as one part of the circuit and one of the pickup wires as the other part of the circuit.

If desired a switch (not shown) may be included in the circuit, for example, mounted on the bridge 570; said switch may then be closed by an extra cam surface on the underside of the cam disc 580 whereby actuation of the circuit only takes place during that part of the movement of the cam disc when record testing takes place.

This embodiment corresponds as far as major features are concerned, substantially to the preceding embodiment and, therefore, only those parts which are different will be described in detail.

The friction link on the tone arm shaft has in this embodiment a slightly different construction insofar as the plate 520 rigidly secured to the tone arm spindle 567 has an outwardly extending arm 521 at the end of which there is rigidly secured a small downwardly extending pin 421.

This pin 421 is equivalent to the flap or abutment 322 in the first embodiment insofar as that part of the operation is concerned which causes the angular position between the cam track follower arm 331 and the tone arm to be preset to a desired initial position, after which the cam track follower pin on the cam track follower arm 331 is capable of sliding in the inwardly leading track and following this to its exterior end, overcoming the friction in the friction link when the abutment or the pickup head thereon abuts against the edge of the lowest record in the stack.

The pin 421 is so short that it will not touch the top surface of the cam disc but is long enough to be engaged by a cam portion 489 (FIGURE 59) which extends above the top of the cam disc 580.

The structure of the tone arm spindle itself is the same as that previously described. Equivalent and identical parts in this embodiment are referred to by reference numerals having the same two end figures but utilizing the five hundred series for this embodiment whereas the three hundred series is used for the preceding embodiment.

In this embodiment, the friction of the friction link is adjustable, more specifically the construction of the friction link is as follows:

To the spindle 567 (FIGURE 55) there is rigidly secured a horizontal plate 520 having an outwardly extending arm 521 to the front end of which there is rigidly secured a small downwardly extending pin 421. The plate 520 is further provided with two diametrically opposed holes 525.

Below the plate 520 there is arranged a cam track follower arm 531 having at one end a hole with a slide fit on the spindle 567 and at the other end a cam track follower pin 536 which is vertically slidably mounted in holes 534 in the arm 531 and in an overbent portion 533 of the arm 531. At both sides of the plate 530 there is arranged a friction ring (not shown) as in the first embodiment. Below this structure there is arranged an oval plate 526 with two holes 528 aligning with the holes 525 in the plate 520. From the plate 526 there extends a trip starter actuating lever 539 of which the outer portion is bent edgewise. A pair of screws 529 extends through each pair of holes 525 and 528 and have at their lower ends springs 629 and washers 630, and nuts 631. The bridge 570 is provided with two holes 637 in such a position that they are in alignment with the nuts 631 so that a tool can be introduced through the holes 637 from below the bridge in order to adjust the tension of the springs 629 and thereby the friction of the friction link.

The friction link here described differs from the friction link previously described by pure structural features only and the operation of the friction link is the same.

Another feature of the structure shown in FIGURE 55 is that a brake member adapted and arranged to cooperate with the relay shown in FIGURE 58 is provided on the underside of the arm 521. This brake member may for instance, consist of a strip of rubber secured to the underside of said arm 521 and adapted to be engaged by the top edge of the relay armature 673a when the latter is attracted upon energizing the relay. In a convenient embodiment I have found it sufficient, however, as shown in FIGURE 55, to secure a small piece of screw-threaded wire 521a to the underside of the arm 521, where indicated by the arrow. A part of a screw which is bent in circular form to be concentric with the tone arm spindle 562 is secured under the arm 521 for example by welding or soldering at its ends, at a radial distance from the tone arm spindle 567 corresponding to the location of the relay armature 673, so that the latter can snap up and engage the screw-threaded portion 521a to stop the outward movement of the arm 521 and thereby the tone arm 550.

In order to provide passage for this screw-threaded portion when the arms 521 and 531 are swung relative with respect to each other the arm 531 is provided with a groove 531a.

The trip starter actuating mechanism and the record drop control mechanism are identical to those hereinbefore described.

The vertical control cam portions 585 on the underside of the cam disc 580 are similar to those previously described and are designated by the same reference numerals.

The top surface of the cam disc 580 (FIGURE 59) has a general recess 586 which is broad and deep enough to allow the cam track follower pin 536 to move freely therein during playing of a record.

As in the first embodiment the end wall 588 of this recess forms an acute angle with the radius of the cam disc 580 in order to guide the cam track follower pin outwards and the outlet from the recess 586 leads through an inclined outlet portion 587 to the entrance of the following tracks through which the cam track follower pin is guided during the various movements.

At the exterior wall of the recess 586 there is arranged a cam portion generally designated by reference numeral 489 which extends above the surface of the cam disc 580 and is adapted to cooperate with the pin 421 to preset the mutual position of the tone arm 550 and the cam track follower arm 531. This action which is described in detail below is equivalent to the abutment of the flap 322 on the pin 375 when the tone arm reaches its most exterior position. In other words the raised cam portion 489 is equivalent to the stop pin 375, and the operation of presetting the parts in the second embodiment is equivalent to the guiding of the cam track follower pin 336 in the exterior end of the first track 391 which takes place after the abutment 322 has been brought into engagement with the pin 375.

The guiding surface of the cam 489 consists of two portions 489a and 489b. The portion 489a extends from adjacent the periphery of the cam disc 580 to a point adjacent the start of the outlet portion 587 and has a curved configuration whereby the pin 421 when engaged by the portion 489a transmits an inward movement to the tone arm 550 to the position in which the tone arm is intended to be raised. The portion 489b is substantially concentric with the cam disc 580, thereby maintaining the obtained position of the tone arm.

Thus it will be understood that irrespectively of the position of the pin 421 and the cam track follower pin 536 in the recess 586 or its extension leading to adjacent the periphery of the cam disc 580, a rotation of the cam disc will initially either cause the pin 421 to be engaged by the cam portion 489b which will swing the tone arm inwardly until the cam track follower pin 536 either hits the end wall 588, or if the two pins 421 and 536 are in their closest position reach the entrance of the track 589a. If the cam track follower pin 536 during testing of the record has been moved away from the pin 421, which position is possible only after a record has been tested and played or is started to be played, the engagement between the cam track follower pin 536 and the end wall 588 would cause the tone arm 550 to swing outwardly, but this is prevented by the engagement between the pin 421 and the cam member 489 in the same manner as by the engagement between the abutment 322 and the pin 375 in the first embodiment but in contrast thereto in a more interior position of the tone arm defined by the radial distance from the centre of the cam disc to the guiding surface 489b of the cam 489. Thus, it will be understood that rotation of the cam disc with the cam track follower pin 536 in engagement with the end wall 588 and the pin 421 in engagement with the cam 489 causes the desired presetting which brings the two pins 421 and 536 to their closest position which is reached when the cam track follower pin 536 has been sliding out along the end wall 588 to the entrance of the track 489a.

The tracks in the top surface of the cam disc 580 adapted to control the horizontal movement of the tone arm 550 are as follows:

From the short substantially concentric initial portion 589a of the track 589 the track extends outwardly in a portion 589b to guide the tone arm in an outward direction and terminates near the edge of the cam disc 580 where it continues in a track 595 following the periphery of the cam disc until it reaches, in the same way as the stop track 395 in the first embodiment, tracks connecting it with the playing recess 586. In this embodiment the track 595 is also the stop track.

The exterior wall of the track portion 589b is steep while the interior edge of the track 589b has an inclined wall allowing the cam track follower pin 536 to pass out of this track in a manner to be described in detail hereinafter.

An inwardly leading track 591 corresponding to the track 391 commences adjacent the exterior end of the track 589 but slightly spaced therefrom in a tangential peripheral direction and slightly inside the stop track 595. The exterior wall of the track 591 is steep while the interior wall is inclined similarly to the interior wall of the track 589.

The remaining tracks of the cam disc 580 are similar to the track of the first embodiment. An outwardly leading track 593 with an inclined inner wall is connected to the interior end of the track 591 by a small track 592 inclined inner wall. Peripherally spaced from the end of the track 593 which if desired may communicate with the stop track 595 there extends an inwardly leading track 594 corresponding to the track 394 in the first embodiment. The track 594 continues into a small concentric track 596 in which the cam track follower pin 536 is guided when the tone arm lands on the record to be played.

MODE OF OPERATION

The operation will now be briefly described with reference to FIGURES 60 to 82 in which in order to facilitate the matter only such reference numerals are inserted which are necessary in order to understand each of the illustrations.

FIGURE 60 shows the position of the parts while playing a record, in the present instance a record of medium size. The cam disc 580 is in its position of rest with the intermediate gear wheel 508 received in the recess 583 in the periphery of the cam disc 580.

As in the preceding embodiment engagement of the edge of a medium size record has caused the cam track follower arm 531 to be swung relatively to the tone arm 550 so that the two arms 531 and 521 form an acute angle with each other.

When the trip starter mechanism is actuated after playing of the record the cam disc 580 is, as previously explained, given an initial push which will start its rotation. This will immediately result in raising of the tone arm 550 by means of the cam portion 585b. The tone arm is raised to the position shown in FIGURE 62 with the small roller 659 slightly below the surface of the next record on the centre spindle 510.

The position shown in FIGURE 61 serves to illustrate another starting position which will take place if a record is rejected immediately after playing has been initiated. Also in this case the tone arm is raised immediately the cam disc 580 starts to rotate. The cam track follower pin 536 has, however, not been moved into the interior end of the playing recess 586 and thus the movement will be as briefly described above i.e. the pin 421 is hit by the cam portion 489a thereby moving the tone arm 550 inwardly.

In the position shown in FIGURE 62 the cam disc 580 has rotated far enough to bring the cam surface 489a to engage the pin 421 which is so much shorter than the cam track follower pin 536 that it does not engage in any of the tracks and is capable of passing freely over the surface of the cam disc except where the cam member 489 is arranged.

Figure 64:
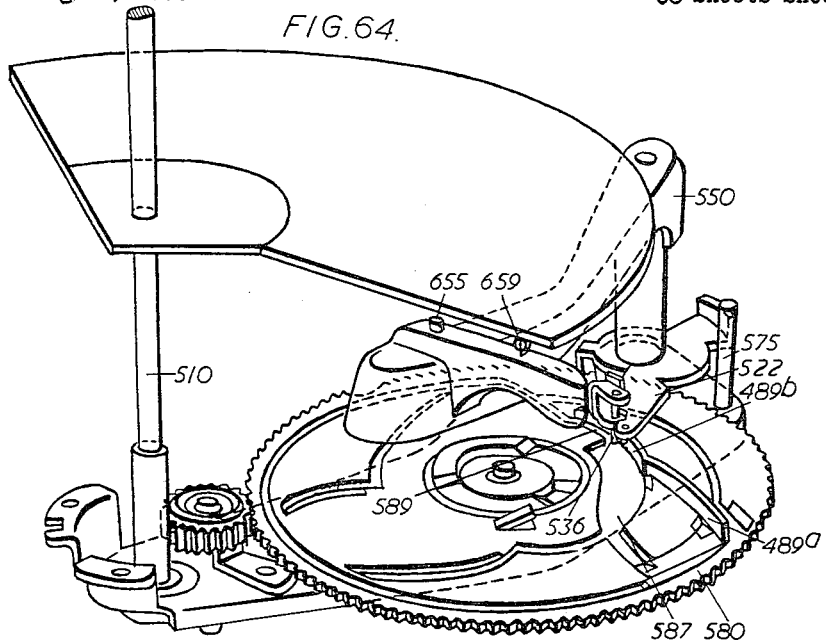

Thus by further rotation of the cam disc 580 the pin 421 is guided along the cam surface 489a whereby the tone arm 550 is swung inwardly. Approximately simultaneously with the cam track follower pin 536 reaching the interior end wall 588, the pin 421 reaches the guiding surface 489b and thereafter, while the position of the tone arm is maintained due to the guiding surface 489b being concentric, the tone arms 531 and 521 are brought together by the end wall 588 and surface 489b respectively, to the closest position as shown in FIGURE 64 in which the cam track follower pin is just in front of the outwardly leading track 589.

Figure 65:
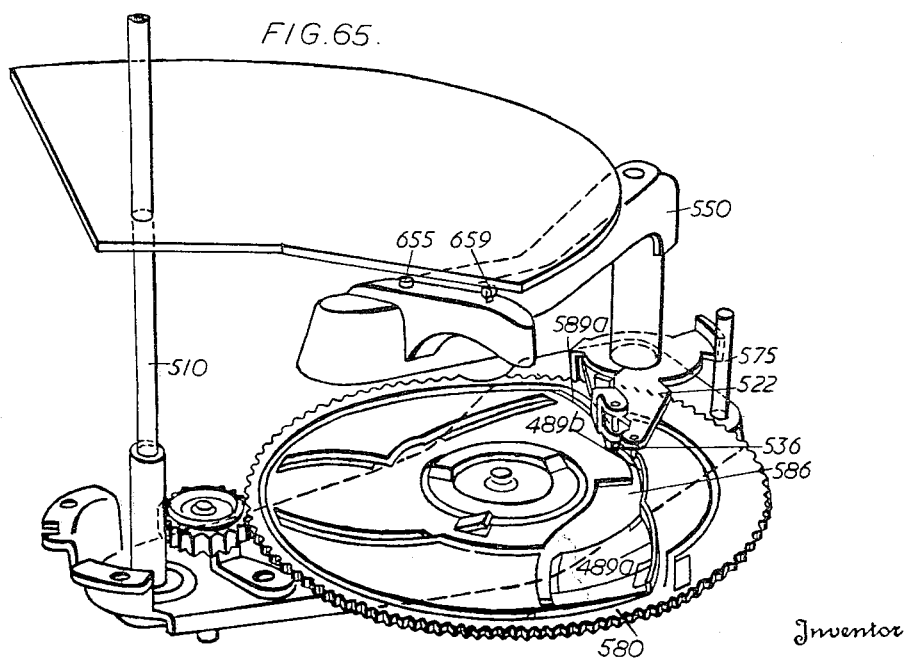
Figure 66:
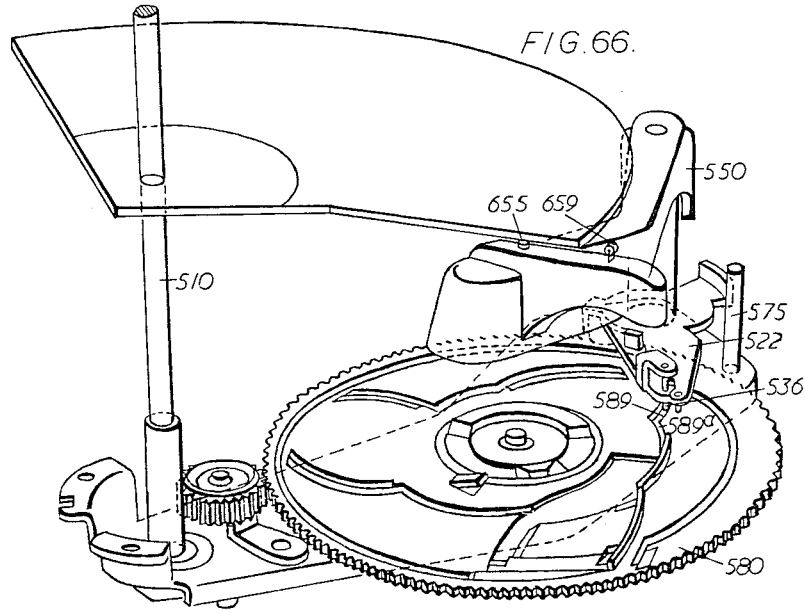
Figure 67:
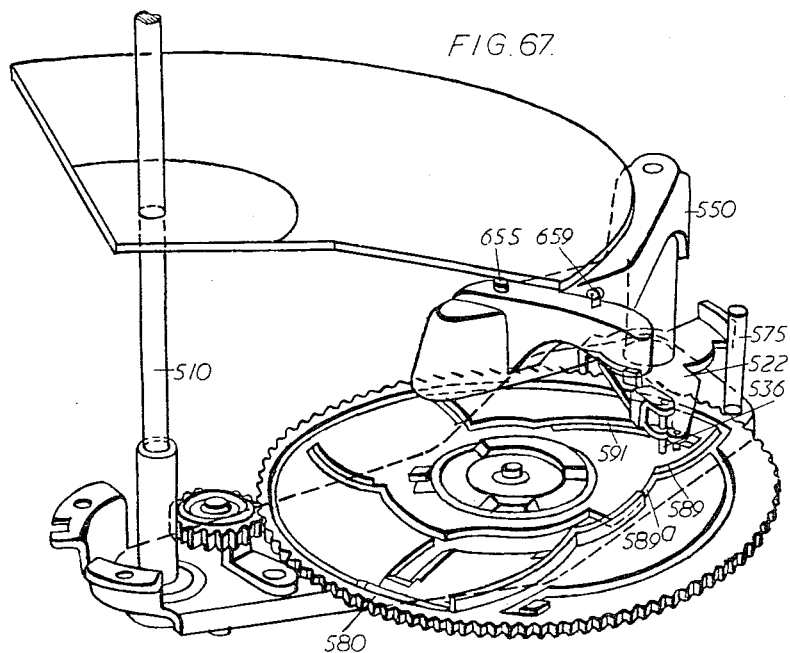

As mentioned this initial portion 589a of the cam track 589 is concentric and during passage of the cam track follower pin 536 through this portion 589a the tone arm 550 is only raised by means of the track portion 585d so that in the position shown in FIGURE 65 the small wheel or roller 659 engages the underside of the record to be tested. The tone arm 550 is pressed against the underside of this record by means of a spring (not shown but corresponding to the spring 348 in FIGURE 22) causing the vertical control lever 545 (corresponding to 345 in FIGURE 22) to engage the vertical control cam 585 (corresponding to 385 in FIGURE 22).

During the outward movement of the tone arm 550 caused by the outwardly leading track portion 589b the roller 659 snaps over the edge of the record resulting in depressing the small pin 655 due to the pressure with which the tone arm is pressed upwards. Thus the switch 662 and 663 is closed and the circuit for the relay shown in FIG. 58 is energized. The relay thereby tilts the armature 673 to a position in which the top edge 673a engages the brake member 521a secured on the underside of the arm 521. Since this arm 521 is rigidly connected to the tone arm the attraction of the relay causes the outward movement to be interrupted. Thus a rough presetting of the position of the tone arm is obtained with the abutment member 659 slightly outside the periphery of the next record. The relay will remain energized as long as the contact is closed with the result that the cam track follower pin 536 against the action of its spring, is forced up over the inclined wall of the track portion 589b to the position shown in FIG. 67.

The cam track follower pin 536 thus passes over the surface of the cam disc 580 between the tracks 589 and 591 and slides down into the track 591, the interior wall of which also slopes to allow silent entry into the track 591. This position is shown in FIG. 68.

During further rotation of the cam disc the tone arm is initially moved inwardly until the roller 659 abuts the edge of the record. This movement is not obstructed by the relay armature 673 due to the direction in which it is inclined.

Hereafter the cam track follower pin 536 is forced to follow the inwardly leading track 591 to the interior end thereof overcoming the friction of the friction link as explained in connection with the previous embodiment. This position is shown in FIGURE 69, and in this position testing of the record is completed with respect to locating of the tone arm 550 in the correct position relatively to the cam track follower arm 531 to obtain correct setting of the stylus on the record after the latter has been dropped.

When the cam track follower pin 536 passes the small track 592, the tone arm 550 is lowered by the vertical control cam portion 585f thereby re-opening the switch 662 and 663 whereby the grip of the relay armature 673 on the brake member 521a is released and the tone arm is free to start the outward movement predetermined by the cam track 593.

As in the embodiment already described the cam track follower pin 536 is moved outwards in the track 593 until the abutment 522 abuts against the stop 575 (corresponding to the stop 375 in the first embodiment) which takes place in the position shown in FIGURE 70 in which the tone arm has reached its most exterior position. As in the previous embodiment the cam track follower pin 536 is in this position, forced out of the track 593 against its spring and then passes across the surface of the cam disc 580, the tone arm being maintained in its most exterior position until the cam track follower pin 536 falls down in the track 594 which is the position shown in FIG. 71.

From this position the tone arm 550 is moved inwardly by the track 594 until the cam track follower pin 536 reaches the small concentric track 596 at which moment the stylus member of the pick up head 551 is situated just above the inlet groove of the record to be played. During passage of the cam track follower pin 536 in the track 596, the vertical control cam 585h (corresponding to 385h in the first embodiment) lowers the tone arm 550 to place the stylus in the inlet groove. This movement takes place between the positions shown in FIGURES 71 and 60 thereby completing the cycle of one revolution of the cam disc while the record drops on the turntable.

Figure 72:
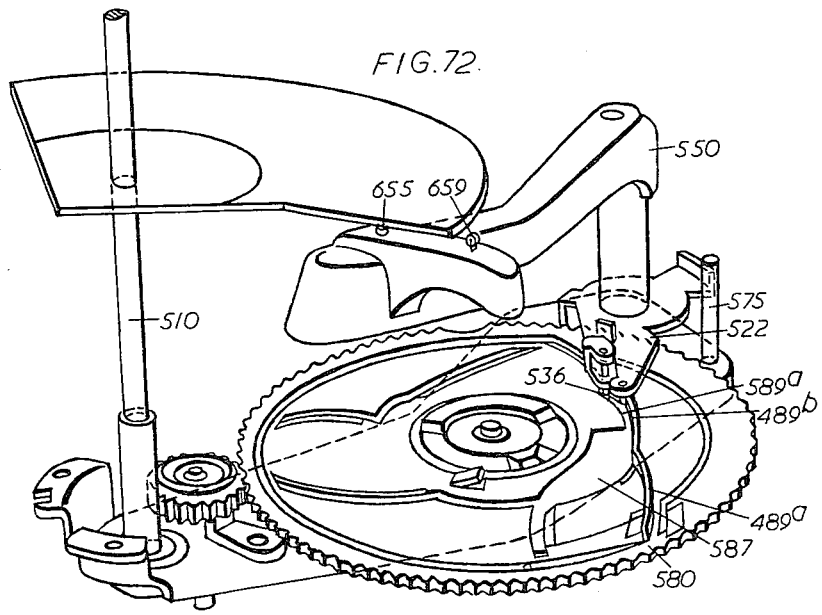
Figure 73:
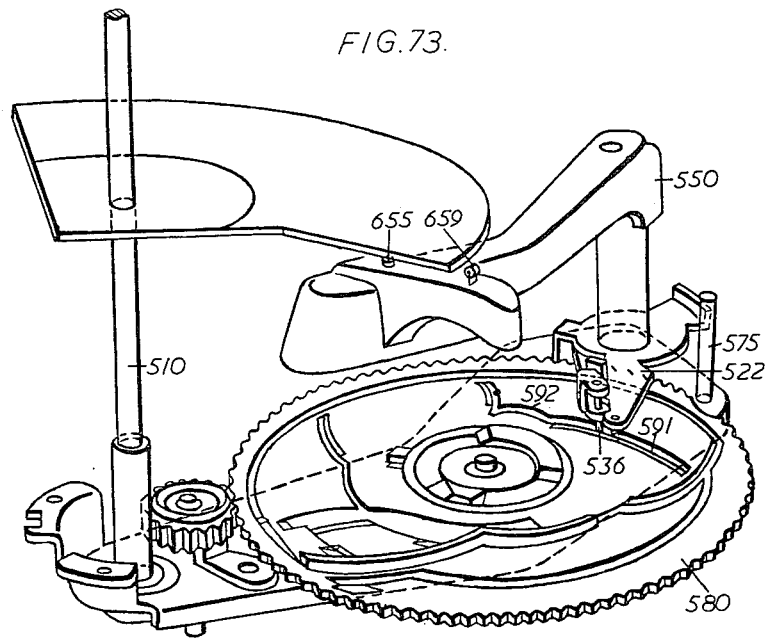
Figure 74:
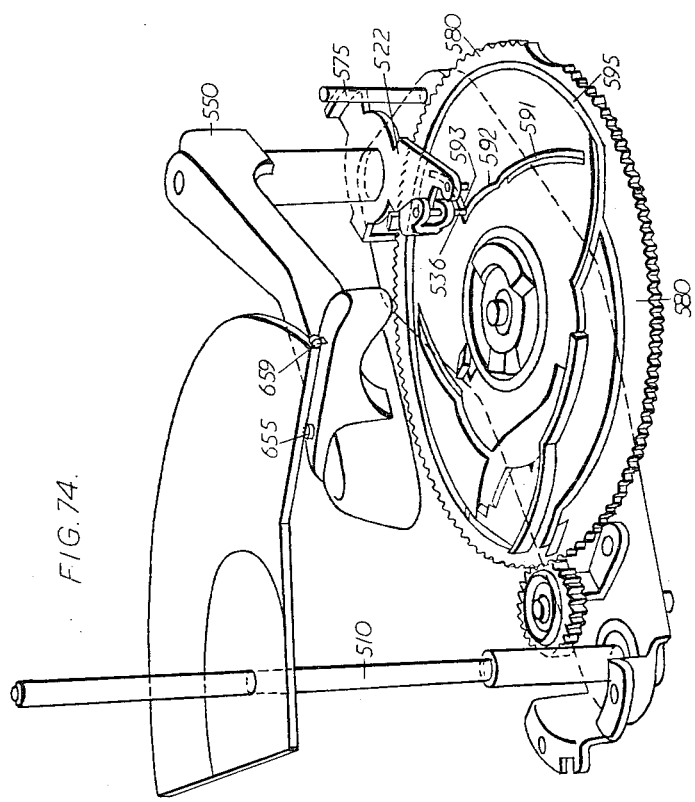
Figure 75:
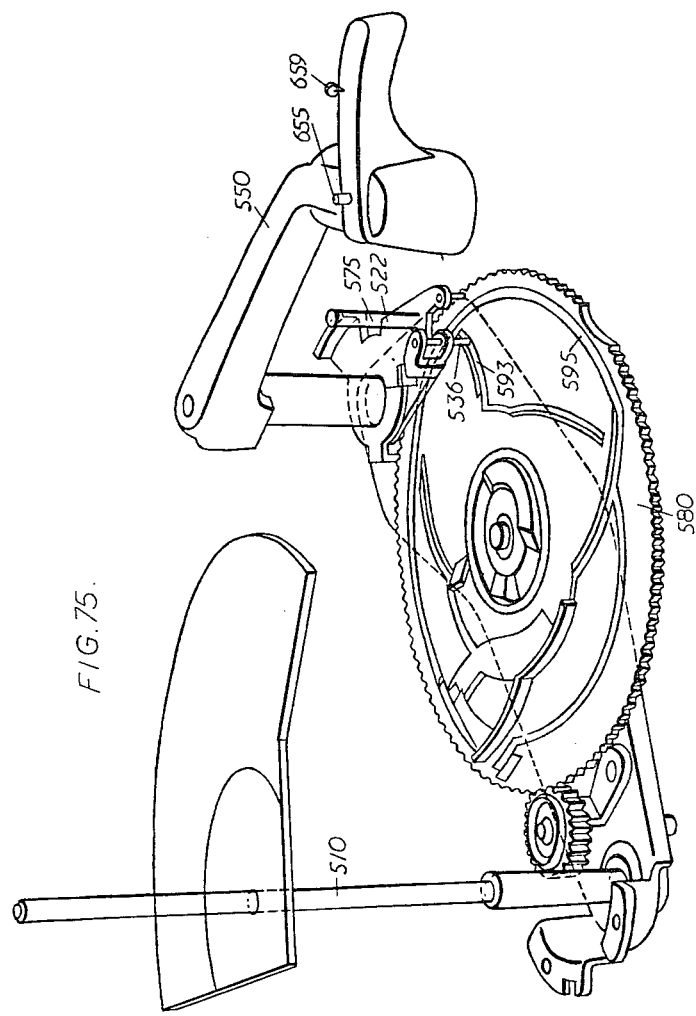

In this embodiment it is not necessary to start the outward test movement of the tone arm 550 across the underside of the lowest record in the stack so near the centre of the records that the feeler abutment 659 also has to snap over the edge of the record of the smallest size to be played. The smallest records known are children's records of a diameter of 6 inches and the next standard size is 7 inch records. It will therefore, be sufficient to allow the tone arm 550 to be raised with the abutment 659 slightly outside the edge of a 6 inch record but inside the edge of a 7 inch record. This possibility is illustrated in FIGURE 72 where the record handled is supposed to be a 6 inch record. The tone arm 550 has just been raised and as will be seen from FIGURE 72 the abutment 659 is thereby slightly outside the edge of the record and the switch actuating pin 655 has been depressed immediately when the tone arm is raised with the result that the relay is immediately energized preventing any outward movement of the tone arm. Therefore, the cam track follower pin will be forced over the inclined wall of the track portion 589b of the outwardly leading cam track 589 right at the entrance thereof so that no angular displacements between the arms 521 and 531 take place as appears from FIGURE 73 where the cam track follower pin has passed across the surface of the cam disc and has arrived at the track 591.

During passage in this track 591, the cam track follower pin 536 first swings the tone arm 550 inwards until the roller 659 abuts the edge of the record whereafter the arm 531 is pre-set relatively to the tone arm 550 as previously described.

The subsequent movement of the cam track follower pin 536 in the track 593 again brings the tone arm to its most exterior position with the abutment 522 engaging the fixed stop 575. As appears from FIGURE 75 this engagement takes place when the cam track follower pin is near the exterior end of the track 593 while in case of playing a record of medium size the cam track follower pin was not guided so far out in the track 593 due to the smaller angular displacement of the arms 521 and 531 relatively to each other.

Figure 76:
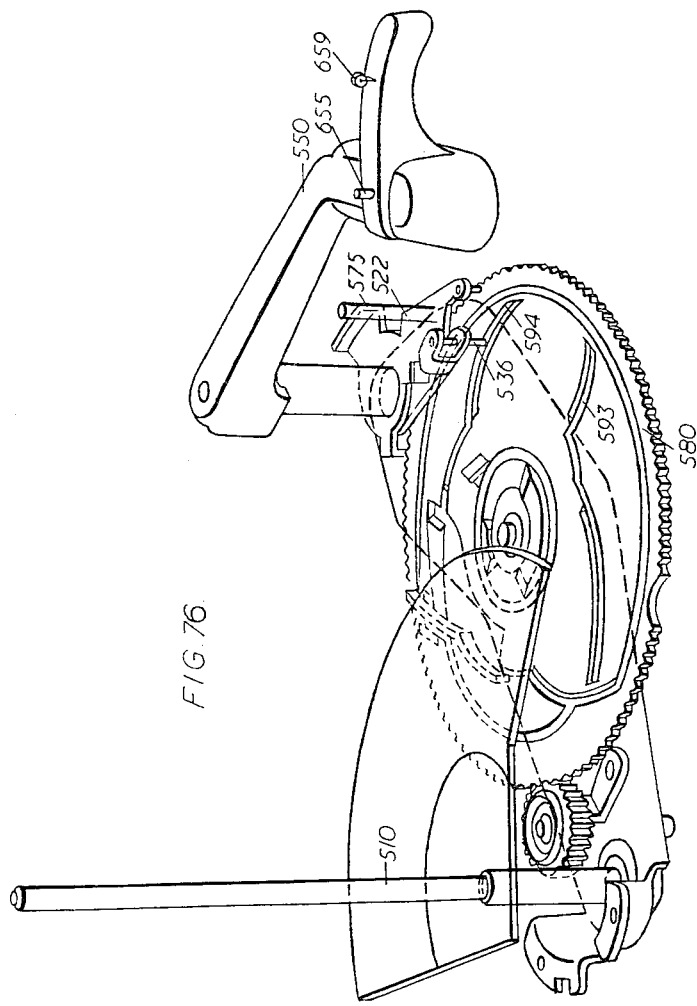

FIGURE 76 shows the next position in which the cam track follower pin has reached the track 594 after the record has been dropped whereafter the tone arm is swung inwards and finally dropped with the stylus correctly engaging the initial groove of the record.

Figure 77:
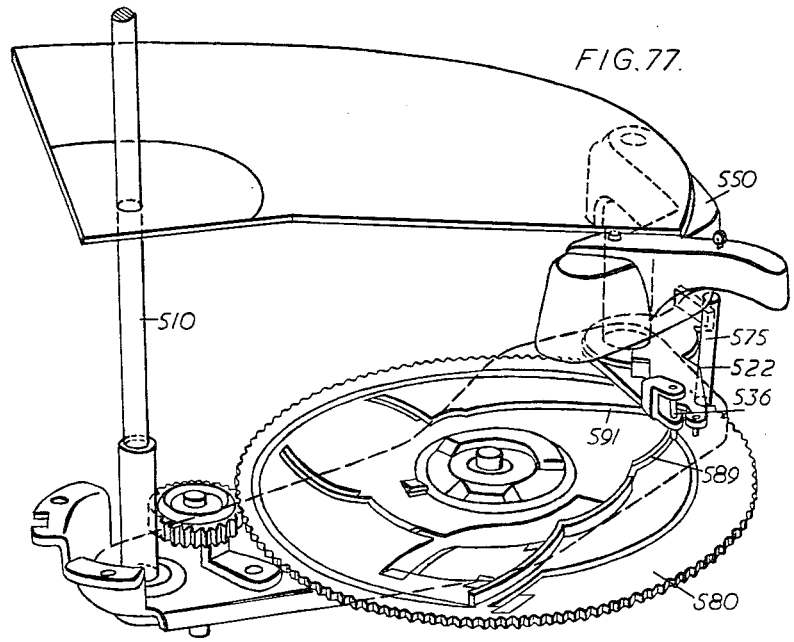
Figure 78:
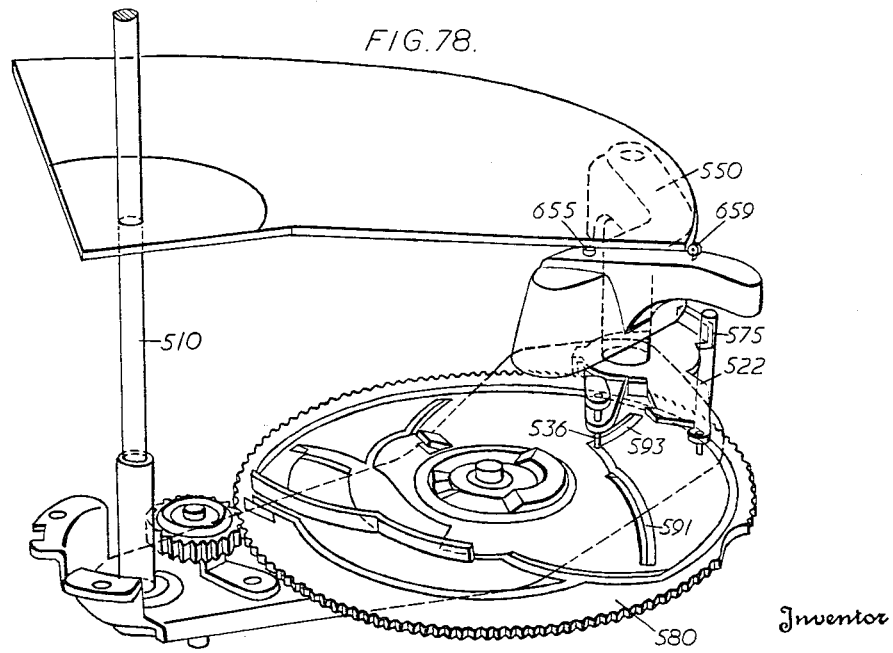
Figure 79:
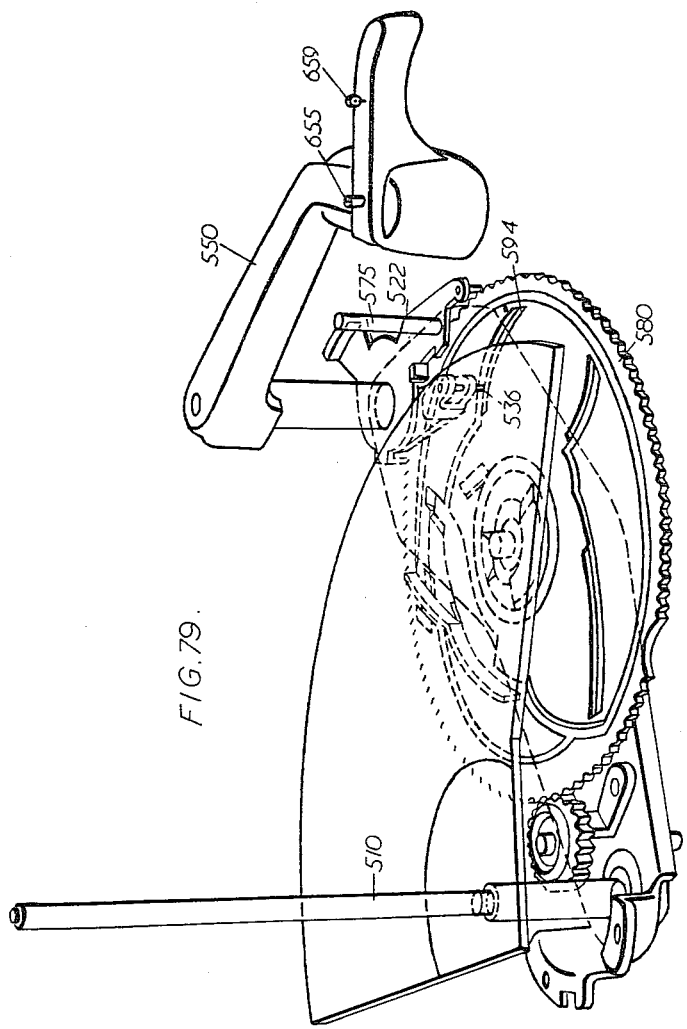

Some of the positions described when testing of a medium size and a small size record are illustrated in FIGS. 77 to 79 in connection with testing a large size record, for example a 12 inch record.

In FIGURE 77 the cam track follower pin has been guided far outwardly in the outwardly leading test track 589 before the abutment roller 659 has snapped over the edge of the record and the switch pin 655 is depressed. From this position the cam track follower pin is guided across the surface of the cam disc from the track 589 to the track 591 and follows this track 591 to the interior end thereof with the result that the cam track follower arm 531 is displaced through a large angle relative to the tone arm and the arm 521 as is shown in FIGURE 78.

Hereafter the tone arm is again moved outwards until the abutment 522 engages the stop 575. This position is reached with the cam track follower pin relatively near the interior end of the track 593, whereafter the cam track follower pin is moved across the surface of the cam disc 580 to the track 594 into the position shown in FIGURE 79 where the record has been dropped during said passage. From this position the tone arm is again guided inwardly and dropped on the record.

As already mentioned the stop track 595 starts, in contrast to the cam disc 380 shown in FIGURE 25, already at the exterior end of the outwardly leading track 589. This is possible because if there is any record at all on the centre spindle 510 to be tested the outward movement of the tone arm 550 will always be interrupted and the cam track follower pin 536 will never reach the exterior end of the track 589.

Figure 80:
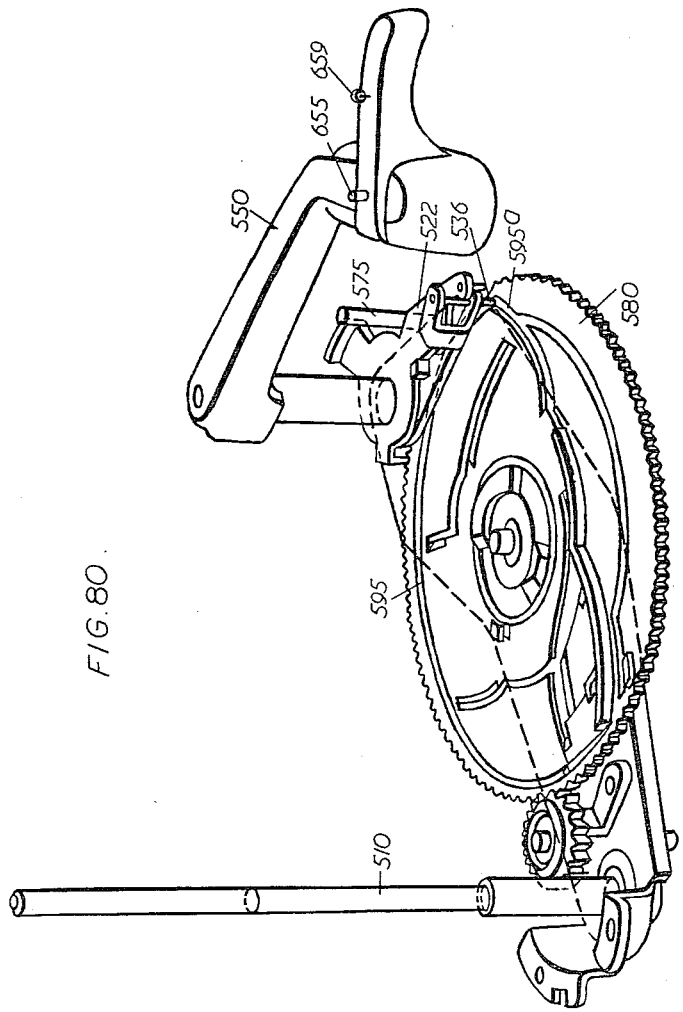

If no record is left in the magazine on the centre spindle 510, however, it is possible to reach this position, such as shown in FIGURE 80. During the initial rotation of the cam disc the angular position of the two arms 521 and 531 is preset as already described before the cam track follower pin 536 enters the track portion 589a. In this position of the two arms 521 and 531 the tone arm 550 is moved freely to its most exterior position when the cam track follower pin, as shown in FIGURE 80, passes to the exterior end of the track 589 at which moment the abutment 522 may abut the stop 575.

Figure 81:
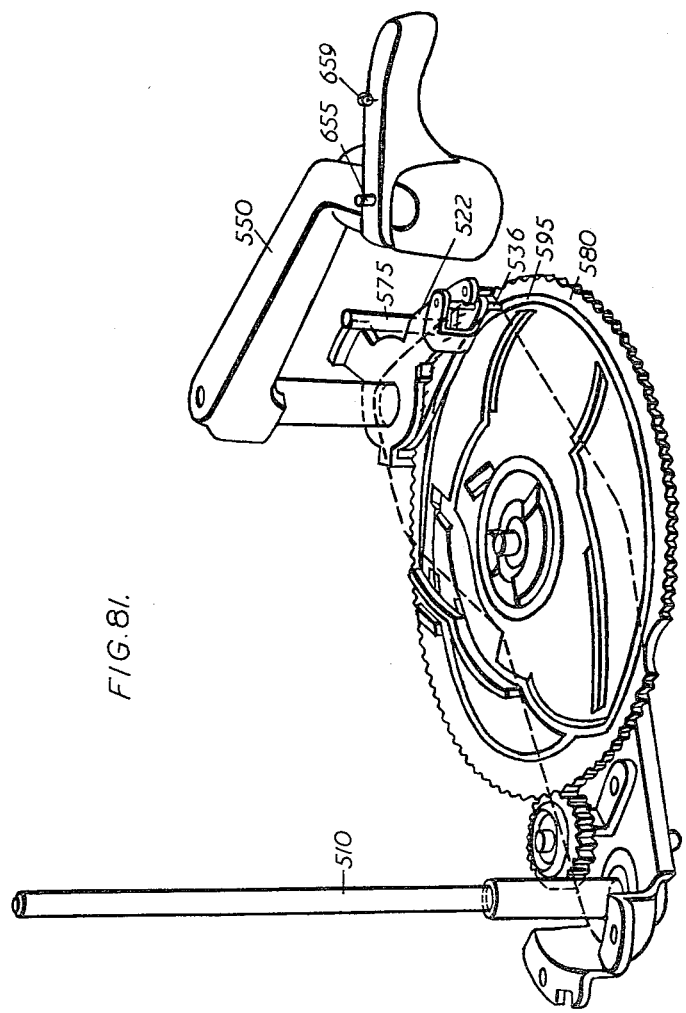
Figure 82:
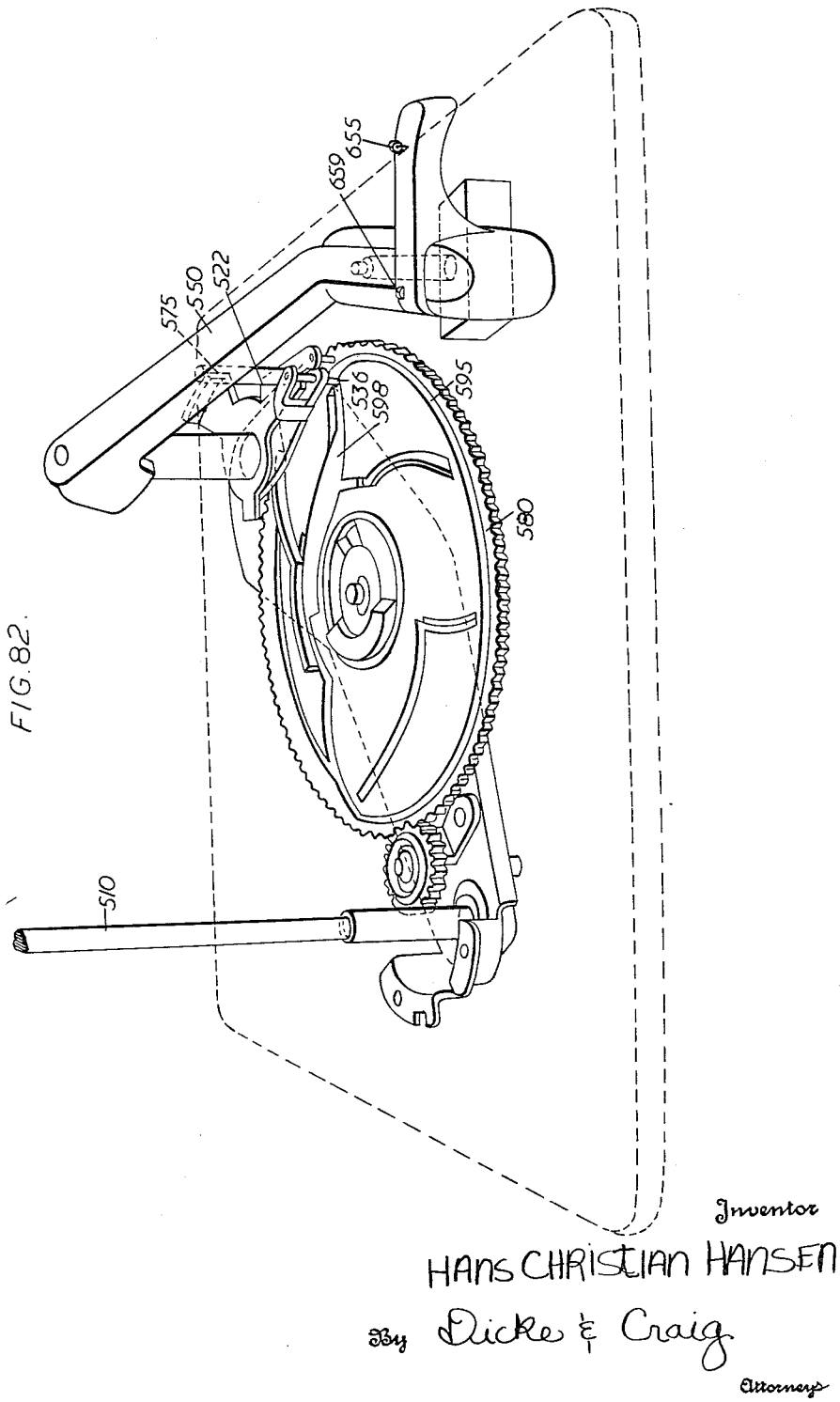

Then the cam track follower pin enters the stop track 595 and is guided through that as shown in FIGURE 81 and finally at the end of the stop track 595 the tone arm is lowered on the post 460 thereby opening the phonograph motor switch. This will, as in the preceding embodiment, take place approximately one revolution before the turntable 505 has brought the cam disc to its position of rest as shown during playing of a record. The inertia of the turntable causes the cam disc to continue rotation until the cam disc reaches its position of rest.

As indicated above the outer wall of the stop track 595 may be substituted by the abutment 522 engaging the stop 575 when the cam track follower pin 536 reaches the end of the track 589.

*Example III.—FIGURES 83 to 106*

A third embodiment of a record changing phonograph according to the invention is shown in FIGURES 83 to 106. The phonograph comprises the same main elements as the previously described embodiments, namely a turntable 705, a centre spindle 710 having a supporting member 711 for supporting a stack of records placed on the centre spindle 710, a tone arm 750 with a pickup head 751, a switch post 660 with a switch actuating knob 665 for the switch of the phonograph motor. The phonograph further has a bridge 770 (FIG. 86) mounted below the base plate 700, a cam disc 780, a trip starter mechanism and a push button 740 for starting the rotation of the cam disc 770 in the manner already set forth. Below the bridge 770 there is mounted a pivotable lever 745 for controlling the vertical movements of the tone arm by cooperation with a vertical control cam 785 in the cam disc. Below the bridge 770 there is further arranged a record drop control mechanism for operating the supporting member 711 on the centre spindle 710 by a special cam portion on the underside of the cam disc.

The friction link of the tone arm shaft, as shown in FIGURE 86, corresponds in this embodiment to that shown in FIGURE 55. The tone arm 750 is, in the manner previously described, secured to a hollow vertical spindle 767. Through the hollow spindle 767 there extends another hollow spindle 760 having an external diameter slightly smaller than the internal diameter of the spindle 767 and at its lower end secured by means of a nut 762 to a bushing 763, which is rigidly secured to the bridge 770 by welding or the like. At its upper end the spindle 760 is provided with an outwardly extending collar 761 which together with a conical edge at the upper end of the spindle 767 forms a ball race for balls 769.

To the spindle 767 there is rigidly secured a plate 720 having an outwardly extending arm 721 to the front end of which there is rigidly secured a small downwardly extending pin 621. The plate 720 is further provided with two horizontal, outwardly extending flaps 722 and 723, forming between them a recess 620. The plate 720 is further provided with two holes 725 diametrically opposed with respect to the spindle 767.

Below the plate 720 there is arranged a plate 730 having a centre hole fitting as a sliding fit on the spindle 767. The plate 730 is provided with a cam track follower arm 731 having at its outer end a cam track follower pin 736 which is vertically slidable in holes 734 in the arm 731 as well as in a bent over portion 733 of the arm 731. At both sides of the plate 730 there are arranged friction washers 726. Below these is arranged an oval plate 727 with two holes 728 aligning with the holes 725 in the plate 720. The plate 726 has a trip starter actuating lever 739 including a downwardly bent portion 738 and a horizontal portion 739. A pair of screws 729 passes through each pair of holes 725 and 728 and are at their lower ends surrounded by springs 829 tightened against the plate 727 by washers 830 and nuts 831 to provide the desired friction of the link described.

The lower end of the spindle 767 and the upper end of the bushing 763 are provided with conical edge surfaces 766 and 765 respectively forming ball races for balls 764. The bottom of the bridge 770 is provided with two holes 737 which are positioned so that they will align with the nuts 831 so that a tool can be inserted through the holes 737 from the underside of the bridge 770 to adjust the tension of the springs 829 and thereby the friction of the friction link.

The underside of the cam disc used 780 in this embodiment is provided with a control track 785 for the vertical movements, and a cam for operating the record drop control mechanism of the centre spindle 710. The top surface of the cam disc is provided with various tracks for guiding the cam track follower pin 736 in horizontal directions as will be described hereinafter.

As with the cam discs in the embodiments already described, the cam disc 780 has a playing recess 786 (FIGS. 87, 88 and 89) in which the cam track follower pin 736 is able to move freely during the playing of a record. Along the outer side wall of this playing recess the cam disc 780 has an upwardly extending cam 789—as in Example II— the inner edge of which is formed so as to have a first, from the periphery of the cam disc inwardly leading guiding surface 789a, and a second guiding surface 789b which is concentric with the cam disc 780 at a certain distance from the centre of the cam disc. The cam 789 extends so far above the surface of the cam disc that it is able to guide the pin 621 secured to the horizontal arm 721 of the plate 720; the pin 621, however, is so short that it does not engage the tracks of the cam disc 780. The playing recess 786 has a steep end wall 788, leading outwardly to a point near the end of the guiding surface 789b. From this merging point there continues an inwardly leading track 791a. Approximately at the middle of the track 791a, the outer steep side wall of this track 791a has an increased height provided by means of an edge portion 685a of a plate 684 which is rigidly secured to the top surface of the cam disc. The edge portion 685a continues in an edge portion 686a which is concentric with the cam disc 780. Near the inner end of the inwardly leading track 791a its outer side wall has a portion 691a which slopes from the bottom of the track 791a up to the lower edge of the edge portion 686 of the plate 684. The innermost end of the outer side wall of the track 791a is again steep so as to define a small platform 692a on the top of the cam disc 780 in front of the plate 684. Thereafter the outer side wall of the track 791a continues as side wall for an outwardly leading track 693a, which over its whole length has an increased height by means of the edge of the plate 684.

The outlet of the track 791a is normally closed by an edge portion 784a of a plate 784, the area of which is hatched in FIGURE 87, this plate being slidably arranged in a recess 680 in the surface of the cam disc 780. The bottom of this recess is level with the normal bottom of the guiding tracks in the cam disc. The thickness of this plate 784, hereinafter referred to as the track selector plate 784, corresponds to the distance from the track bottom to the top surface of the cover plate 684 so that the upper surfaces of these two plates are at the same level.

The track selector plate 784 is provided with two slots 784b which are concentric with the cam disc 780 and this has two vertical pins 784c, extending through each of the slots 784b and provided with heads above the selector plate 784 so as to secure the selector plate slidably relatively to the cam disc concentrically therewith. Thus, the track selector plate is able to swing between two positions, in one of which the edge portion 784a closes the outlet of the inwardly leading track 791a as mentioned above. A hair-pin-like spring 784d, the ends of which are inserted through holes 784e and 784f in the cam disc 780 and in the selector plate 784, respectively, tends to keep the selector plate in this latter position. This position will be referred to as the front position of the selector plate. In the opposite "rear position" a front edge 784g of the selector plate, arranged as a continuation of the front edge portion 784a forms an inner wall of an outwardly leading track, referred to as 693a having a width slightly larger than the diameter of the cam track follower pin 736.

When the selector plate is in its front position as shown in FIGURE 88 the front wall 784g abuts against the outside wall of the outwardly leading track 693a, and the front edge portion 784a thereby closes the outlet of the inwardly leading track 791a. The selector plate 784 is provided with an inwardly extending flap portion 784h which extends into a horizontal groove 780a in the surface of the cam disc 780; the flap portion 784h has a circular inner wall adapted to slide along a corresponding circular inner wall of the horizontal recess 780a, which is a part of the recess 680. The recess 780a is so much broader than the flap 784h as to allow the selector plate to move between its front and rear positions. Furthermore the flap 784h has a slightly reduced height compared with the main parts of the selector plate so as to bring its upper surface level with or slightly below the surface of the cam disc, i.e. for example level with or preferably slightly below the platform 692a at the end of the track 791a. The wall 784i defining the top surface of the flap 785h of the selector plate 784 is so steep that it can act as a guiding surface for the cam track follower pin 736. Furthermore the wall portion 784i is located so as to define a direct continuation of the concentric edge portion 686a of the plate 684.

The outwardly leading track 693a, which is opened when the selector plate is in its rear position continues in an inwardly leading track 791b; a part of the outer side wall of this track is defined by an edge portion 685b of the plate 684 in vertical alignment with the side wall of the recess 680 in which the selector plate is arranged. The inner wall of this inwardly leading track 791b is constituted by an edge portion 784j of the selector plate 784. In the last part of the inwardly leading track 791b the edge portion 685b of the plate 684 continues in the concentric edge portion 686b. Below this concentric edge portion 686b the outer side wall 691b of the track 751b in the cam disc slopes in the same manner as described in connection with the sloping surface 691a of the inwardly leading track 791a. Correspondingly, a platform 692b is arranged at the inner end of the outer side wall of the track 791b. In the selector plate 784 there is provided a recess defining a track 784k having its bottom level with or preferably slightly below the upper surface of the platform 692b. The outer side wall of this track 784k is arranged in alignment with the edge portion 686b of the plate 684 to continue the guiding surface defined by the edge portion 686b above the platform 692b.

The outer side wall of the recess 784k merges at 784m into the recess limited outwardly by the inner side wall of the selector plate 784 in circular alignment with the wall portion 784i defining the flap 784h.

The interior corner of the platform 692b is located at a distance from the centre of the cam disc 780 which is slightly less than the distance from the centre of the cam disc to the outer side wall of the inlet to the first inwardly directed track 791a. The reason for this arrangement will be understood by the explanation of the mode of operation of this embodiment.

As seen in FIGURE 89, when the selector plate 784 is in its "rear position" the inwardly leading track 791b continues in an outwardly directed track 693b the steep inner side of which is defined by an edge portion 784p of the selector plate 784. The parts are so disposed that the edge portion 784p abuts against the outer side wall of the track 693b and the bottom of the recess 784k is brought into substantial alignment with the platform 692b when the selector plate is in its "front position."

The outwardly leading track 693b continues in an inwardly leading track 791c the outer wall of which is formed by the edge portion 685c of the plate 684 in alignment with the side wall of the depression 680. The inner wall of this track is constituted by an edge portion 784q of the selector plate 784. At the inner end of the outer side wall of this track 791c there is provided a sloping side wall portion 691c, a platform 692c and a concentric edge portion 686c in the same way as already described with reference to the similar arrangement at the inner end of the two inwardly leading tracks 791a and 791b.

The distance from the centre of the cam disc 780 to the inner corner of the platform 692c is slightly shorter than the distance from the centre of the cam disc to the inlet to the inwardly leading track 791b.

The inwardly leading track 791c continues in an outwardly directed track 795a, the outer side wall of which is defined in the first part by an edge portion 685d of the cover plate 684 in alignment with the outer side wall of the recess 680 in the cam disc, whereafter the track 795a is a track in the surface of the cam disc itself.

The first part of the inner side wall of this track 795a is defined by an edge portion 784r of the selector plate 784. This edge portion 784r is so located that it will abut against the edge portion 685d of the cover plate 684 when the selector plate is in its "front position." In alignment with the concentric edge portion 686c of the cover plate 684 the selector plate 784 has a steep wall portion 784s, which defines the outer side wall for a short concentric recess 784t corresponding to the recess 784k. Outside this recess 784t the selector plate has a short arcuate plate portion 785u concentric with the cam disc which is slidably arranged in an arcuate recess between the outer side wall of the recess 680 in the sam disc 780 and an edge 689a of a second cover plate 689 rigidly secured to the cam disc 780 for instance by riveting. The inner edge portion 689b of the cover plate 689 is in alignment with the outer side wall of the recess 680 in the cam disc and forms together therewith a wall in a track 792b the other wall of which is defined by a rear edge portion 784v of the selector plate 784. The track 792b is adapted to guide the cam track follower pin 736 in an inward direction.

The inner wall of the selector plate 784 behind the flap 784h, defines together with a part of the wall of the recess 680 in the cam disc 780 a track 792a in which the track 785k in the selector plate as well as the track defined by the guiding surface 784i merge. The track 792a and the track 792b merge in an inwardly leading track 792c, which is a direct continuation of the track 792b.

The outwardly leading track portion 795a continues into an exterior concentric cam track 795, hereinafter referred to as the stop track 795. This track 795 follows the periphery of the cam disc 780 until it terminates in the playing recess 786 near the outer end of the guiding member 789.

The inwardly leading track portion 792c continues at its inner end in an outwardly directed track 793 which stops at a point near the inner wall of the exterior stop track 795. The track 793 is provided with a sloping inner wall so as to allow the cam track follower pin 736 to pass from the bottom of the track 793 up over the sloping surface to the surface of the cam disc 780 when the necessary conditions obtain.

At some distance from the end of the track 793, but at approximately the same distance from the concentric stop track 795 there starts an inwardly leading track 794 (FIG. 87) having a sloping inner wall which allows the cam track follower pin to slide from the surface of the cam disc 780 down into the bottom of the track 794. This track continues in a concentric track portion 797, which leads directly to the playing recess 786.

Also in this embodiment the record edge engaging member is mounted on the pickup head 751 as shown in FIGURES 84 and 85. In the top of the pickup head 751 there is provided an elongated recess 759, in which an elongated member 754 is fulcrummed on a small pin 760. The member 754 is of U-shaped cross section, for example made by pressing a thin plate of stainless steel. At each end the member 754 has a pair of upwardly extending flaps 755 and 756 which respectively provide bearing brackets for two tiny rollers or the like 757 and 758, rotatably secured in the brackets 755 and 756 by means of tiny centre pins 757a and 758a. The top of the roller 757 located so much lower than the top of the roller 758 that the latter's top is raised approximately the thickness of a medium thick record above the top of the roller 757. The roller 758 only extends slightly above the top of the bracket 756 and the bracket 756 is preferably broader than the roller 758 and has a slightly inclined front surface directed against the centre of the turntable so as to constitute an abutment member for engaging the edge of the lowermost record in the magazine on the centre spindle 510. To insure that the bracket 756 when snapping over the edge of a record will always be pushed into a position for safe engagement, the tilting movement of the member 754 is utilized. If desired a small spring 763 may be provided below that end of the member 754 at which the roller 758 is supported. The horizontal, radial distance between the two rollers 757 and 758 is so adapted to the outward movements of the tone arm caused by the tracks 693a and 693b in the cam disc 780 that the roller 797 does not snap over the edge of the lowest record during such outward movement.

MODE OF OPERATION

In the normal stop position the gear wheel 708 lies in the recess 783 in the edge of the cam disc 780, thereby dis-engaging itself from the driving wheel. In this position the angle between the two arms 721 and 731 of the tone arm shaft 767 is as small as possible, and the two pins 621 and 736 will therefore be positioned close to each other. The cam track follower pin 736 is, in its most exterior position in the recess 786, near the merging point with the stop track 795. The tone arm 750 is in its most exterior position and lowered on the switch post 660, thereby keeping the circuit for the phonograph motor open.

When the phonograph is to be used as a single record player the record to be played is placed on the turntable 705, centred by the turntable bushing 782. In this case the centre spindle 710 is removed from the turntable bushing 782.

To play the record, the operator simply lifts the tone arm by means of the finger grip and places the stylus of the pickup head 751 in the inlet groove of the record. At the moment when the tone arm leaves the switch post 660 the turntable 705 starts to rotate without transferring its rotation to the cam disc 780. When the operator moves the tone arm in an inward direction, the cam track follower pin 736 passes freely in the playing recess 786, and also during the normal playing of the record the cam track follower pin 736 moves further inwardly in this playing recess 786. When the playing of the record is finished and the pickup stylus enters the outlet groove of the record, the trip starter mechanism is actuated by the lever 739 mounted on the tone arm spindle 767. An initial rotation is thereby imparted to the cam disc 780 as previously described so that the gear wheel 708 is pressed out of the recess 783 in the cam disc and engages the periphery of the cam disc and the driving wheel 706, whereafter the driving of the cam disc 780 is taken over by the gear wheel 706.

As soon as the cam disc 780 starts to rotate the tone arm is raised to a certain position due to the sloping portion 785b of the vertical control cam 785. The horizontal position of the tone arm is not altered until the end wall 788 of the playing recess 786 reaches the cam track follower pin 736 and guides the cam track follower pin and thereby the tone arm in an outward direction. This outwardly directed movement continues until the cam track follower pin 736 reaches the inlet to the inwardly leading track 791a. Correspondingly the pin 621 on the arm 721 is swung outwardly and abuts the guiding surface 789b of the cam 789.

The inlet to the track 791a is arranged at a distance from the centre of the cam disc 780 which will be discussed in connection with the description of the phonograph as record changer.

Thereafter the tone arm 750 moves inwardly corresponding to passage of the cam track follower pin in the inwardly leading track 791a. This and the following in- and outwardly directed movements of the tone arm in its elevated position takes place for the purpose of testing the size of the lowermost record in the magazine on the centre spindle, if any, by causing abutment 758 on the pickup head 751 to engage the edge of the record when the phonograph is used as a record changer. This case will be considered hereinbelow.

If there is no record in the magazine the tone arm will, therefore, be swung unobstructedly inwardly during passage of the cam track follower pin in the track 791a without being pressed up along the sloping outer wall portion 691a. The selector plate is in its front position due to the action of the spring 784d, and its front edge portion 784a closes the entrance to track 693a. On further rotation of the cam disc, the cam track follower pin 736 is forced against the wall portion 784a of the selector plate. The selector plate 784 is thereby pushed backwardly to its rear position thereby opening the outwardly leading track 793a, in which the cam track follower pin is thereafter guided, thereby swinging the tone arm in an outward direction. The cam track follower pin 736 keeps the track 793a open during its passage therethrough. At the moment, however, when the cam track follower pin leaves the track 693a and starts an inwardly directed movement in the track 791b the selector plate is swung to its front position due to the action of the spring 784d. Thus, the end of the inwardly leading track 791b is closed by part of the wall portion 794p in the same manner as the inwardly leading track 791a is closed by the wall portion 784a of the selector plate. When the selector plate is thus in its front position, i.e. when the wall portion 784j of the selector plate is situated at the greatest possible distance from the outer wall 685b of the track 791b, this track 791b is open for passage of the cam track follower pin in an inward direction.

The tone arm is able to carry out the various inwardly directed movements with very little friction so that the cam track follower pin remains in the bottom of the track 791b until the end of the track, where it is hit by that part of the selector plate edge portion 784p which closes the outlet of track 791b. Thereafter the selector plate is again pushed backwards by wedging the cam track follower pin in between the edge portion 784p and the steep side wall of the platform 692b. Thereby the outwardly directed track 693b is opened for passage of the cam track follower pin, which thereby swings the tone arm in an outward direction. When the cam track follower pin reaches the point where the outwardly directed track 693b continues in the inwardly directed track 791c the selector plate returns to its front position due to the action of the spring 784d as explained above. The track 791c, between the edge portions 685c and 784q is thereby open for the passage of the cam track follower pin in the inward direction. When the cam track follower pin reaches the end of the track 791c it is hit by the part of the selector plate edge portion 784r which closes the outlet of the track. As in the previous cases the selector plate is thereby pushed to its rear position, opening the outwardly directed track 795a for the passage of the cam track follower pin. When the cam track follower pin has passed the edge portion 784r the selector plate returns to its front position due to the action of the spring 784d. During passage of the track follower in the track 795a the tone arm is swung outwardly to its most exterior position, which is reached when the cam track follower pin enters the concentric stop track 795.

During passage of the cam track follower pin in that part of the stop track 795 which lies between the ends of the two tracks 793 and 794, the tone arm is lowered slightly, as will be further explained in connection with the mode of operation of the phonograph as a record changer. When the cam track follower pin moves in the last part of the stop track 795 the tone arm is lowered to rest on the switch post 660, whereby the switch actuating knob 665 is depressed and the circuit of the phonograph motor opened. Thereafter the parts again assume under the inertia of the turntable the position in which the phonograph was started.

When the phonograph is used as a record changer the centre spindle 710 is placed in the hollow turntable bushing 782, and one or a plurality of records are placed on the centre spindle 710 supported by the supporting member 711. Also with this embodiment, the records can be placed in the magazine in mixed relationship, regardless of their diameters.

The phonograph is started by depressing the knob 740, whereby the cam disc 780 is given an initial movement sufficient to bring the intermediate gear wheel 708 into engagement with the periphery of the driving wheel 706 on the turntable bushing 782 and cause the tone arm to be lifted from the switch post 660, whereby the phonograph motor is energized so as to start the automatic driving of the turntable and of the cam disc. The first cam portion 785b of the vertical control cam 785 causes the tone arm 750 to be raised to a neutral position at a level between the turntable and the lowermost record in the magazine on the centre spindle during the initial movement of the cam disc. As soon as the tone arm reaches this neutral position the outer end of the inwardly leading guiding surface 789a will, as explained in connection with Example II, hit the downwardly extending pin 621 of the arm 721 and thereby start to swing the tone arm inwardly. The cam track follower arm 731 follows this inwardly directed movement which continues until the pin 621 reaches the meeting point of the two guiding surfaces 789a and 789b at which moment the tone arm 750 has reached an interior position which is maintained when the concentric guiding surface 789b passes along the pin 621. During the last part of this passage the tone arm 750 is further raised by the vertical control cam portion thereby bringing the record size testing equipment on the top of the pickup head into engagement with the underside of the lowermost record on the centre spindle 710 so that the parts are ready to start the testing of the record when the cam track follower pin enters the track 791a.

Figure 90:
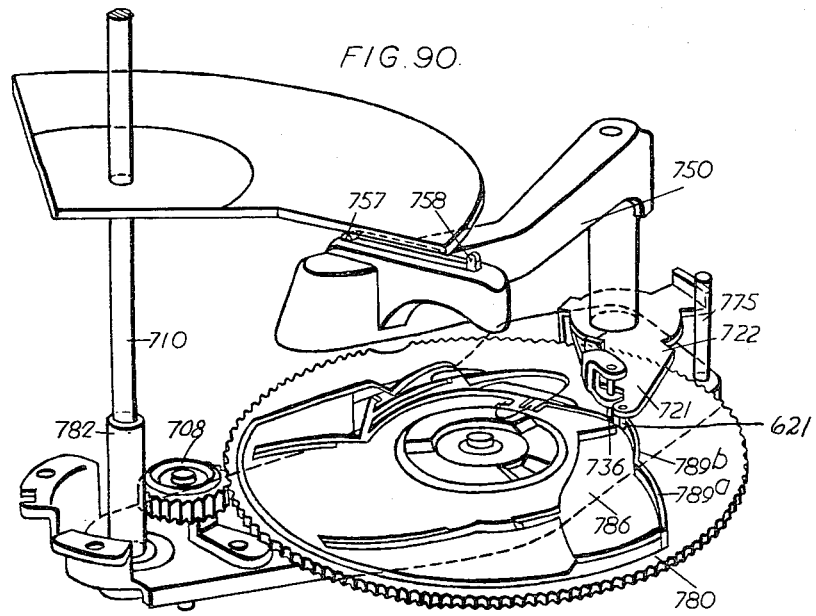

This starting position is shown in FIGURE 90 which together with FIGURES 91 to 94 show the movements during the testing of a small size record, such as a 6 inch record.

In this position of the tone arm the inner and lower roller 757 on the pickup head is situated slightly inside the edge of the smallest record to be played, for example the 6 inch record. The vertical control system for raising the tone arm is so adjusted that it tends to raise the tone arm to a position in which the upper surface of the roller 757 is slightly above the supporting member 711 on the centre spindle, i.e. slightly above the underside of the lowermost record in the magazine. It will be understood, therefore, that the rollers 757 and 758 will be pressed gently against the underside of the record when the tone arm is raised to its most elevated position. This slight pressure with which the rollers 757 and 758 press against the underside of the records is caused by the tension of the spring 748 which interconnects the bridge 770 and the vertical control lever 745, because the engaging roller 747 is just not able to engage the guiding surface of the vertical control cam portion 785c. Further details will be clearer by reference to FIGURE 22 in which corresponding parts are designated by similar numbers in the three hundred series.

Figure 91:
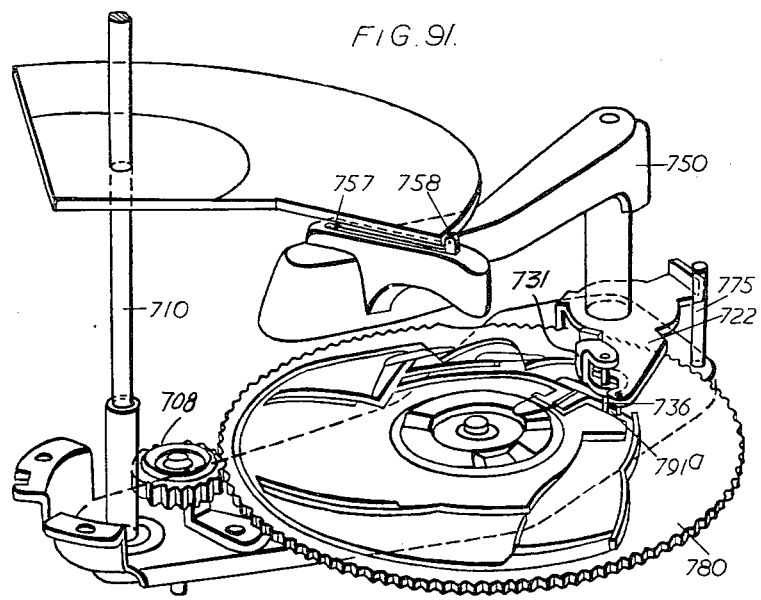

The first case to be considered is, as just mentioned, when a small size record is supported on the centre spindle. The position of the parts in which the tone arm has just been raised to its most elevated position is shown in FIGURE 90. The cam track follower pin 736 has just entered the inwardly leading track 791a and the pin 621 is sliding along the last part of the guiding surface 789b. The tone arm is raised so as to bring the roller 757 into engagement with the underside of the lowermost record while the roller 758 lies outside the edge of the record. On the further rotation of the cam disc 780, the pin 621 leaves the guiding surface 789b and thereafter cannot be influenced by the cam disc 780 before it serves its purpose after the start of the next cycle again, of presetting the position of the cam track follower arm 731 and the tone arm 751. The cam track follower pin 736 starts an inwardly directed movement in the track 791a and the tone arm follows this movement with the roller 757 rolling inwardly on the underside of the lowermost record. In a certain angular position of the tone arm, the abutment 756 carrying the roller 758 abuts against the edge of the record, thereby obstructing any further inwardly directed movement of the tone arm. This position is shown in FIGURE 91. Thereafter the track 791a continues to guide the cam track follower pin further in an inward direction thereby swinging the cam track follower arm 731 by overcoming the friction in the friction link. Thus, an angular displacement between the two arms 731 and 721 is caused.

On further rotation of the cam disc, the cam track follower pin 736 reaches the sloping track bottom portion 691a of the track 791a. This is the position shown in FIGURE 91. On further rotation of the cam disc 780 the sloping portion 691a tends to guide the cam track follower pin further inwardly, but the friction of the friction link, the tension of the cam track follower pin spring 737, and the inclination of the sloping side wall portion 691a are such that the horizontal force on the cam track follower pin from the pressure against the sloping wall portion 691a is insufficient to overcome the friction of the friction link; the corresponding vertical force is, however, sufficient to overcome the tension of the track follower spring 737 so as to thereby cause the cam track follower pin 736 to be lifted and climb the sloping portion 691a. It will be understood that the displacement of the cam track follower arm 731 relatively to the arm 721 and thereby to the tone arm 750 is permanently stopped at the moment when the cam track follower pin reaches the concentric edge portion 686a of the cover plate 684; thereafter the cam track follower pin 736 merely follows the concentric edge portion 686a, and finally lands on the surface of the platform 692a.

The platform 692a is in alignment with the surface of the selector plate flap 784h, or slightly thereabove, and as the selector plate is in its front position, i.e. close to the platform 692a, the cam track follower pin will thereafter pass across to the surface of this flap 784h without being able to open the track 693a which remains closed by the selector plate 784. This position is shown in FIGURE 92.

During the further rotation of the cam disc 780, the cam track follower pin 736 passes over the surface of the flap 784h guided by the steep, concentric wall portion 784i. After having passed the rear edge of this flap the cam track follower pin passes down into the concentric track portion 792a, from where it is guided into the inwardly leading track portion 792c in which the cam track follower arm 731 is swung further inwardly while the tone arm is maintained in that angular position in which the abutment 756 abuts against the edge of the record to be tested.

The final angular displacement between the cam track follower arm and the tone arm is obtained when the cam track follower pin 736 reaches the interior end of the inwardly leading track 792c. This position is shown in FIGURE 93.

Figure 94:
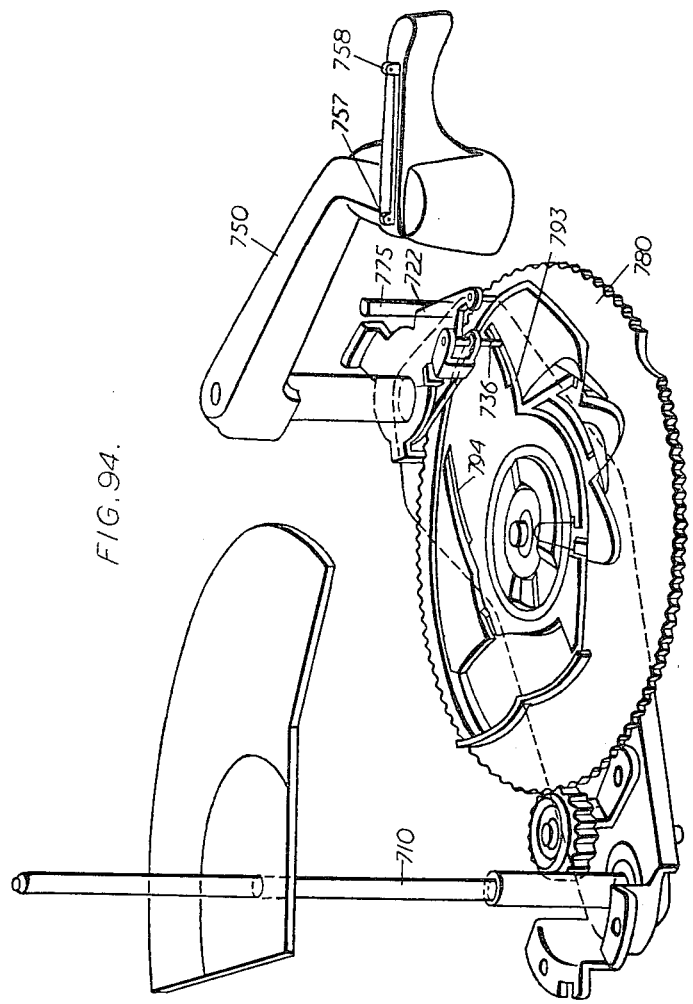
Figure 95:
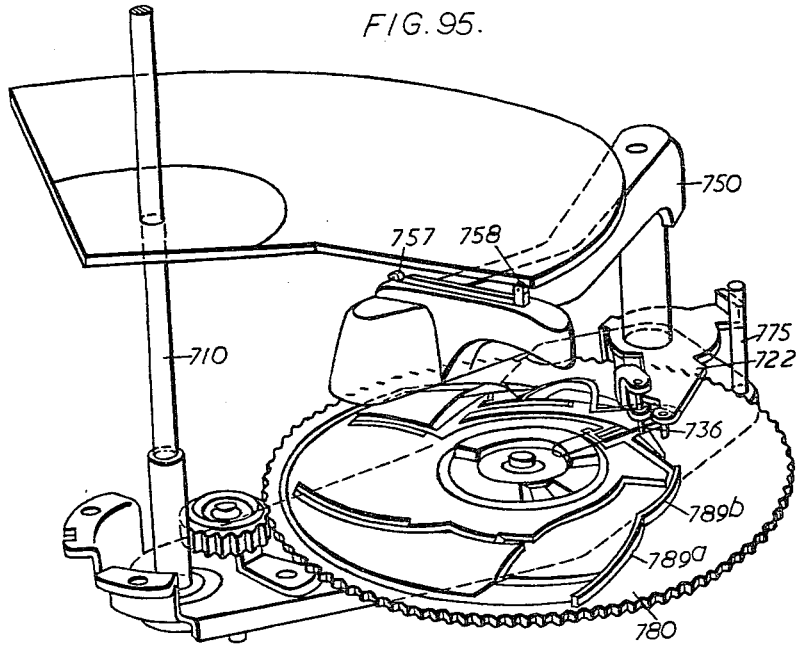
Figure 96:
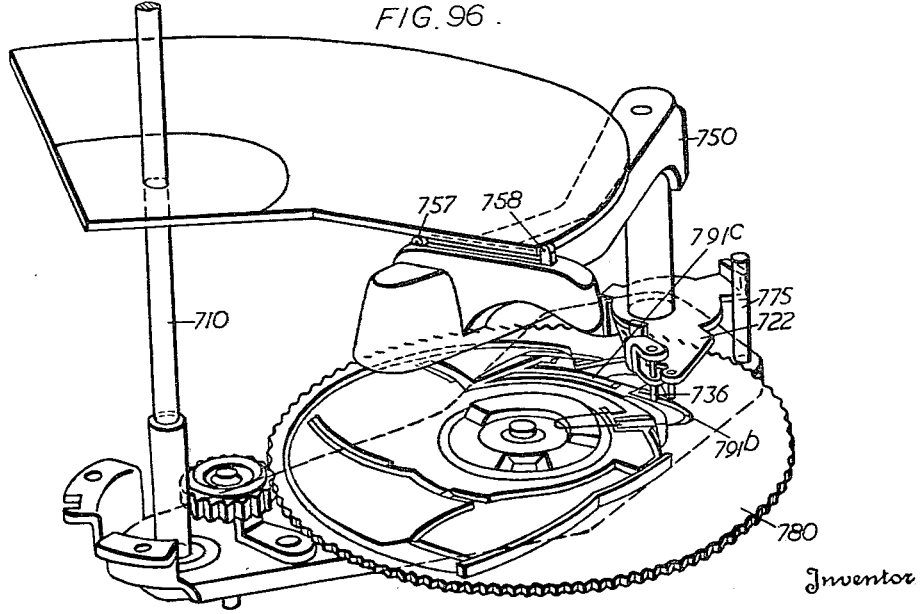
Figure 98:
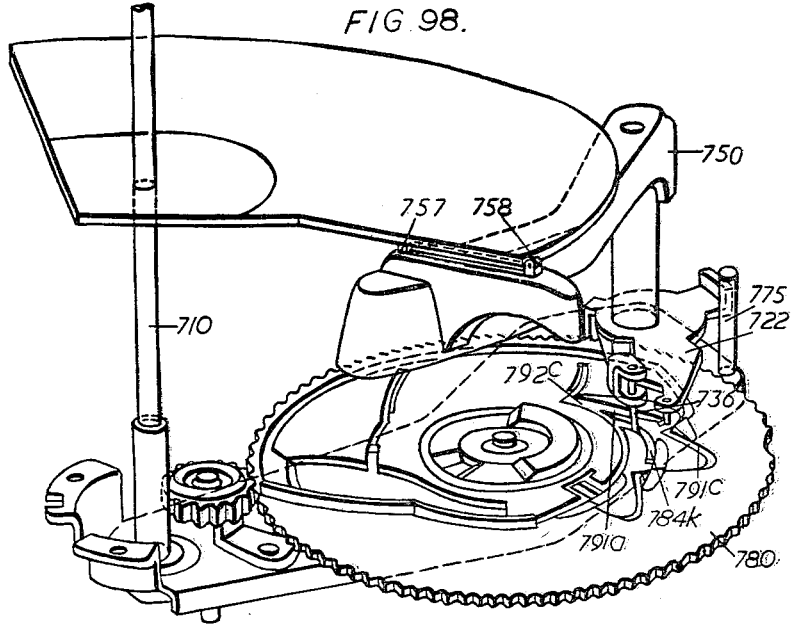
Figure 97:
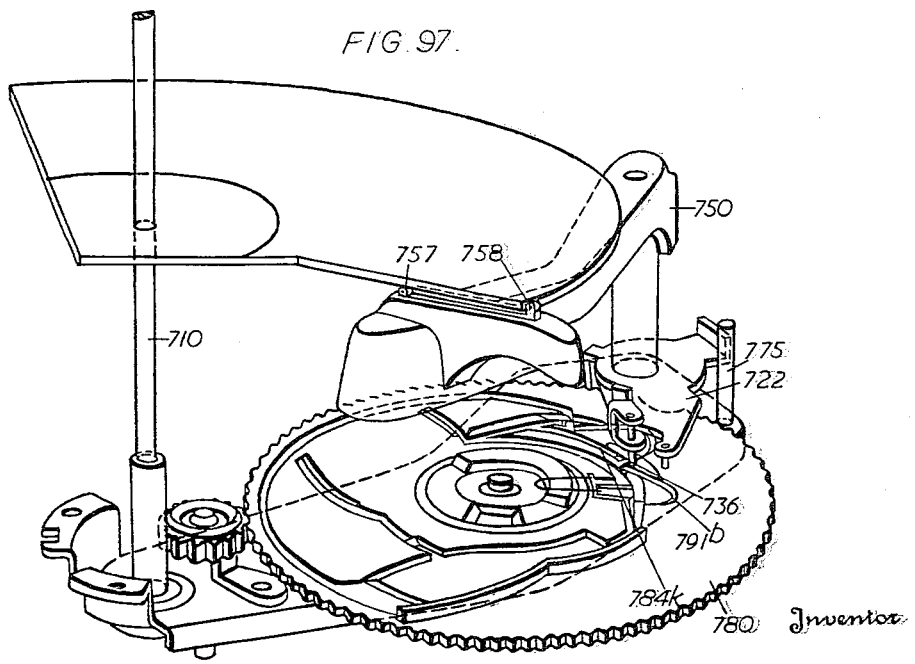

The outwardly directed movement of the cam track follower pin 736 in the track 793 causes the tone arm to swing correspondingly outwardly as such outwardly directed movement of the tone arm can take place without any obstruction. The tone arm thereby reaches its most exterior position, i.e. the position in which the flap 722 of the horizontal tone arm plate 720 abuts against the stop pin 775 as in the previous embodiments. This position is shown in FIGURE 94.

Then the cam track follower pin 736 leaves the track 793 by climbing over the sloping side wall of this track 793 according to the principles already set forth in connection with the previous embodiments. As it is only a small displacement which is obtained between the cam track follower arm 731 and the tone arm, at the end of the inwardly leading track 792c, due to the small diameter of the record tested, the cam track follower pin has, as shown in FIGURE 94, reached a position not far from the outer end of the track 793 at the moment when the tone arm reaches its most exterior position where the flap 722 abuts the stop 775. From this point, the cam track follower pin is forced up onto the surface of the cam disc by the sloping inner side wall of the track.

As soon as the cam track follower pin 736 has left the track 793 and started its passage across the surface of the cam disc the record drop control mechanism is actuated to release the lowermost record in the magazine dropping it to its playing position on the turntable 705. This feeding of the record takes place while the cam track follower pin moves across the surface of the cam disc between the two tracks 793 and 794, and the record reaches its playing position when the cam track follower pin reaches the inwardly directed track 794. The cam track follower pin 736 descends in the inwardly directed track 794 over the sloping inner side wall of the track 794, and thereafter it is guided in an inward direction by the steep outer side wall of the track 794. The tone arm is thereby also swung inwardly until the cam track follower pin 736 reaches the concentric track portion 797, which corresponds to a position of the tone arm in which the stylus member of the pickup head 751 is situated vertically above the inlet groove of the record on the turntable.

During the passage of the cam track follower pin in the concentric track portion 797 the tone arm is lowered to its playing position and when the track follower reaches the playing recess 786 the gear wheel 708 drops into the recess 783 and thereby stops the rotation of the cam disc 780.

Thereafter the record is played with the cam track follower pin 736 moving freely in the playing recess 786. When the playing is finished the trip starter mechanism is actuated by the trip starter actuating level 739 and thereby the cam disc starts to rotate as previously described.

When the cam disc has been restarted the tone arm is raised to engage the underside of the lowermost record in magazine, if any.

If the diameter of the lowermost record in the magazine is so big that its edge lies outside the roller 758, when the tone arm is raised, it will, instead of the roller 757 as shown in FIGURE 90, be the roller 758 which engages the underside of the lowermost record and is pressed against the record with a certain force due to the spring 748. It will be understood that in this case the roller 757 will not be able to engage the surface of the record, until the roller 758 has passed over the edge thereof.

The mode of operation will be considered hereinafter with reference to FIGURES 95 to 100 when the lowermost record in the magazine is a medium size record in which case it is the roller 758 which engages the underside of the record after the raising of the pickup arm.

During the first part of the revolution of the cam disc 780, a presetting of the angle between the cam track follower arm 731 and the tone arm lever 721 takes place in a similar manner as described in connection with the previous embodiment. The end wall 788 of the playing recess 786 is moved against the cam track follower pin 736 and thereby causes the cam track follower arm 731 to be moved outwards. The tone arm and the arm 721 follow this outwardly directed movement until the pin 621 of the arm 721 engages the guiding surface portion 789b, whereby further outward movement of the tone arm is obstructed. The end wall portion 788, however, causes the cam track follower pin to be moved further outwardly until the entrance of the inwardly leading track 791a is reached. The two pins 736 and 721 are thereby brought as close together as possible, and the phonograph is ready for testing the size of the next record to be played.

In the track 791a the cam track follower pin causes the tone arm to be moved inwardly, whereby the roller 758 on the pickup head 751 rolls inwardly along the underside of the record to be played without meeting any resistance to its movement. Thus the cam track follower pin is maintained in the bottom of the track 791a without being able to mount the inclined outer side wall portion 691a. At the end of the track 791a the edge portion 784a of the selector plate 784 will be pressed against the cam track follower pin, whereby the selector plate is pressed back to its rear position against the action of the spring 784d so as to open the entrance to the outwardly directed track 693a, as already described. This is the position shown in FIGURE 95.

During the subsequent outwardly directed movement of the tone arm corresponding to passage of the cam track follower pin in the outwardly leading track 693a, the roller 758 snaps over the edge of the medium size record to be tested. It will be understood that at this moment the tone arm is further raised due to the tension of the spring 748 whereby the roller 757 is brought into engagement with the underside of the record. The tiltable arrangement of the two rollers 757 and 758 insures that the roller 758 is always brought up to such a position that its bracket 756 can safely engage the edge of the record. If there is an overlying record of larger diameter, the roller 758 will engage the surface thereof. Thereafter the roller 757 rolls along the underside of the record during the last part of the outwardly directed movement of the tone arm, when the track follower passes through the last part of the outwardly directed track 693a. When the track follower pin 736 reaches the exterior end of the track 693a the tone arm reaches a corresponding, temporary exterior position, in which the roller 757 is still in engagement with the underside of the record.

The difference between the distances from the centre of the cam disc to the interior end of the track 791a and to the exterior end thereof corresponds to a swinging of the tone arm during which the roller 758 moves through a path which is shorter than the distance between the two rollers 757 and 758. In this way it is insured that an outward movement of the tone arm which covers a range of record sizes can never bring the roller 757 outside the periphery of even the smallest record in this range so that the exterior roller 658 is always brought into engagement with the edge of the record.

When the tone arm is thereafter swung inwardly during passage of the cam track follower pin 736 in the track 791b, the tone arm reaches a position in which the abutment 756 abuts against the edge of the record and prevents further inward movement of the tone arm. This is the position shown in FIGURE 96.

Thereafter the cam track follower pin continues to slide inwardly in the track 791b until it reaches the sloping wall portion 691b. As previously described the cam track follower pin thereby climbs the sloping wall portion 691b and lands on the platform 692b and is then guided by the concentric edge portion 686b of the cover plate 684. This is the position shown in FIGURE 97. As the selector plate 784 is in its "front position" the cam track follower pin thereafter on further rotation of the cam disc enters the track 784k in the selector plate 784. In this track 784k the cam track follower arm 731 is swung further inwardly while the abutment 756 is still in engagement with the edge of the record and prevents a further inward movement of the tone arm 750. At the rear end of the track 784k the cam track follower pin enters the track 792a. This is the position shown in FIGURE 98.

Figure 99:
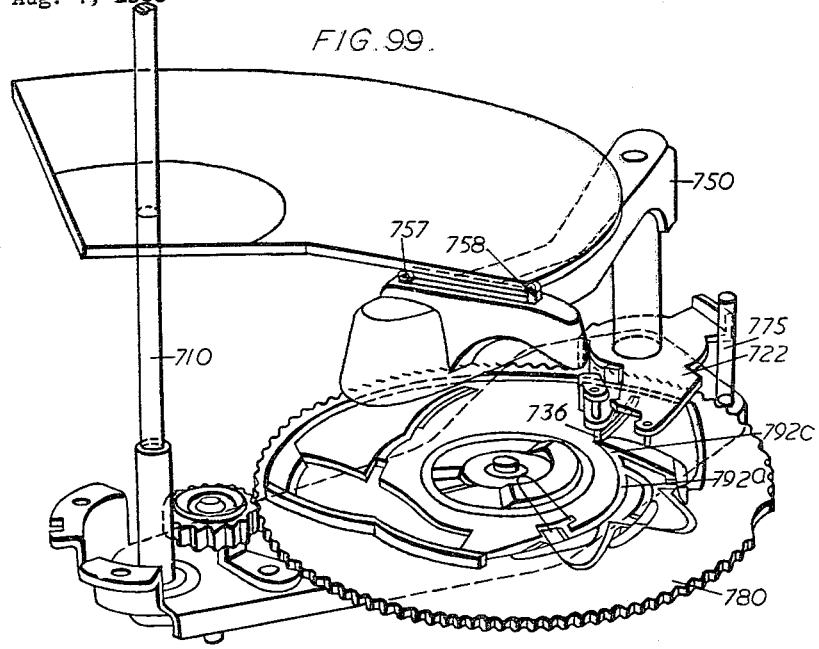
Figure 101:
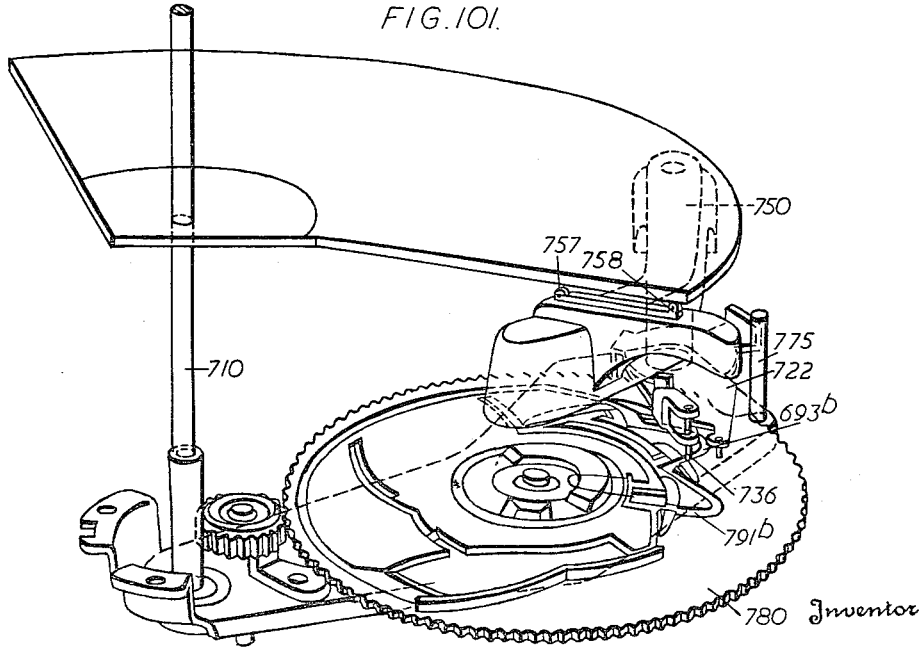
Figure 102:
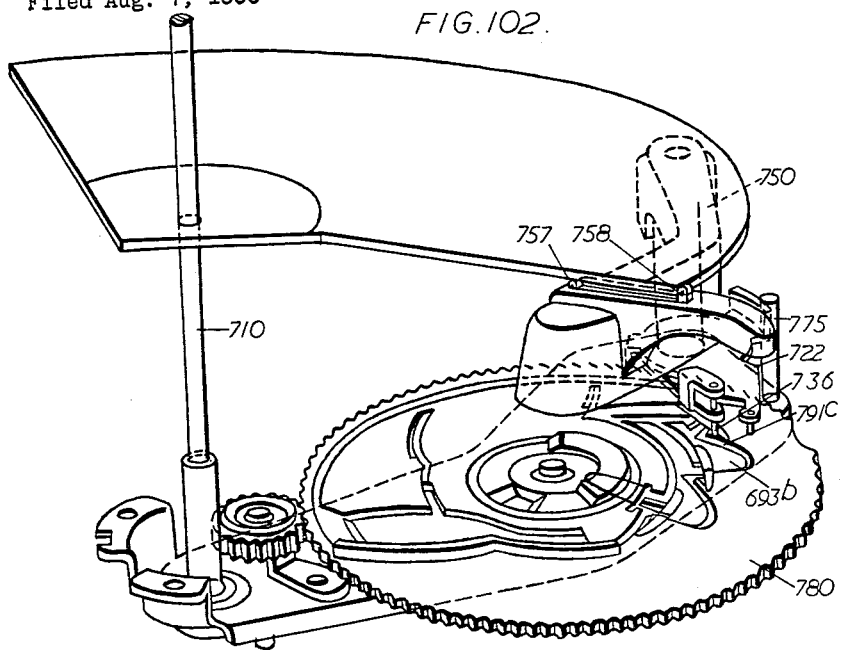

During passage of the cam track follower pin in these tracks and later in the track 792c a further angular displacement between the cam track follower arm 731 and the arm 721 takes place against the friction of the friction link, and the final angular displacement is obtained at the interior end of the inwardly leading track 792c, which is the position shown in FIGURE 99.

It will be understood that this final angular displacement will be the larger the larger the diameter of the record. When, therefore the cam track follower pin reaches the point in the outwardly leading track 793 in which the tone arm has reached its most exterior position with the flap 722 abutting against the stop pin 775, this point is nearer the centre of the cam disc than the corresponding point for a smaller record.

After having reached this point which is shown in FIGURE 100 the further movements to initiate playing of the record take place as already described.

If the lowest record in the magazine has a diameter larger than that covered by the two inwardly directed test tracks 791a and 791b the tone arm 750 follows the movements of the cam track follower pin 736 in the bottom of the following tracks:

First inwards in the track 791a, then outwards in the track 693a and then inwards in the next range through the track 791b. At the end of this track the selector plate 784 is again pushed back against the action of the spring 784d and the outward movement starts in the track 693b which is the position shown in FIGURE 101.

During the next outward movement the roller 758 snaps over the edge of the record and is brought into engagement therewith during the subsequent inward movement in the track 791c, whereafter the cam track follower pin will follow the track 791c by overcoming the friction of the friction link until it reaches the sloping outer side portion 691c, which guides the cam track follower pin up onto the platform 692e. This is the position shown in FIGURE 102.

Figure 103:
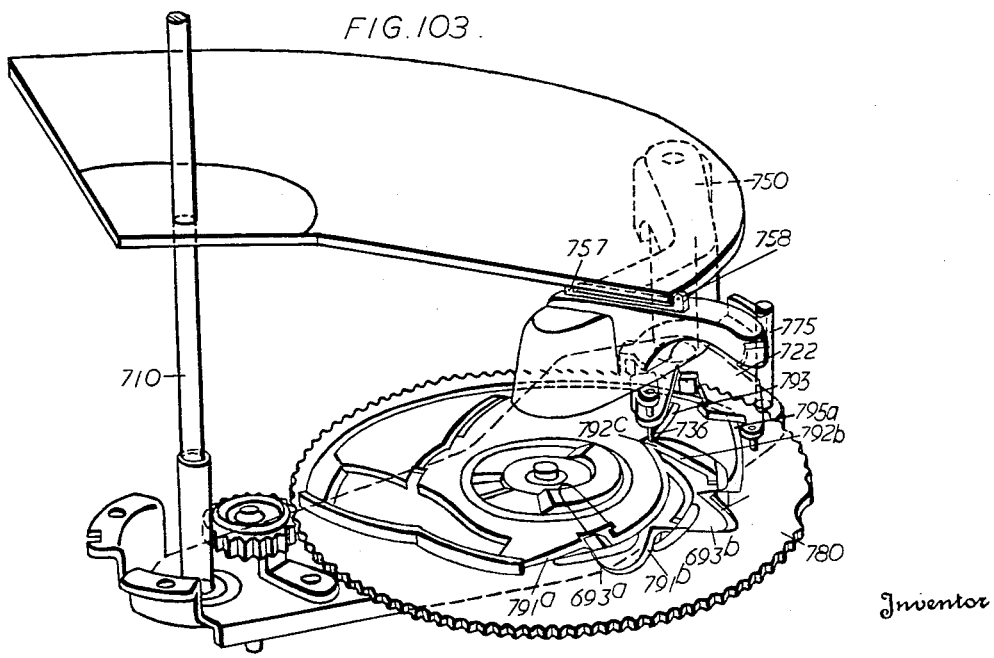

From this position on top of platform 692e the cam track follower pin 736 is guided into the track selector plate 784 which is in its front position. Thereafter the cam track follower pin 736 subsequently enters the track 792b and its extension 792c. The tracks 792b and 792c are both inwardly leading and therefore increase the angular displacement of the cam track follower arm 731 because the abutment 756 is still in engagement with the edge of the record. This angular displacement is stopped when the cam track follower pin 736 reaches the entrance to the track 793 as shown in FIGURE 103.

The angular displacement between the two arms 731 and 721 is increased when testing a large record and the cam track follower pin thereafter leave the outwardly directed track 793 in the first part of this track. Thereafter the movements of the cam track follower pin and the tone arm take place as previously described.

Figure 104:
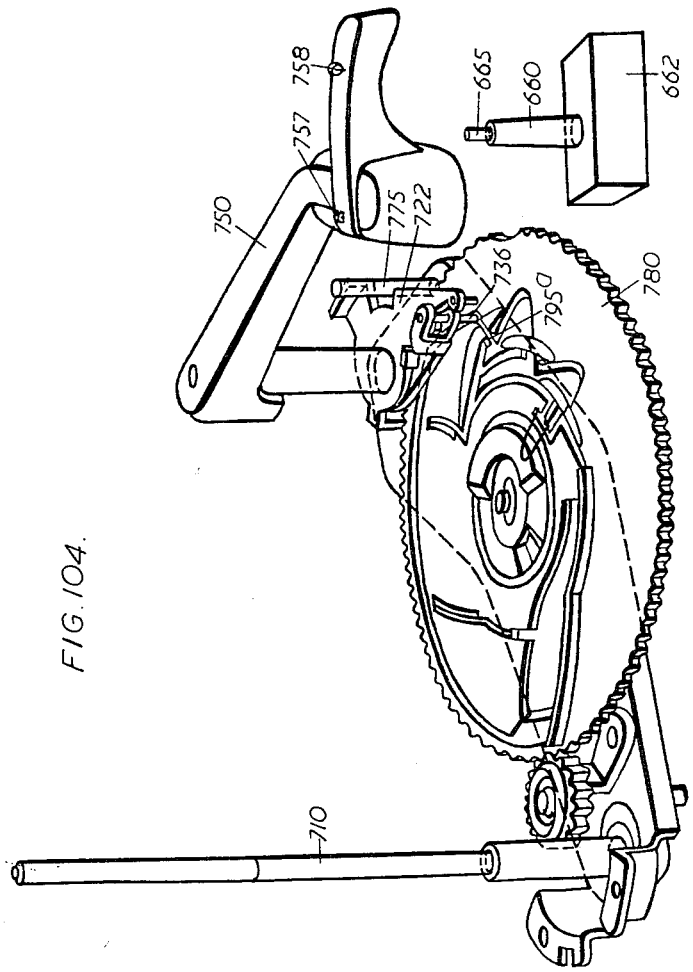
Figure 105:
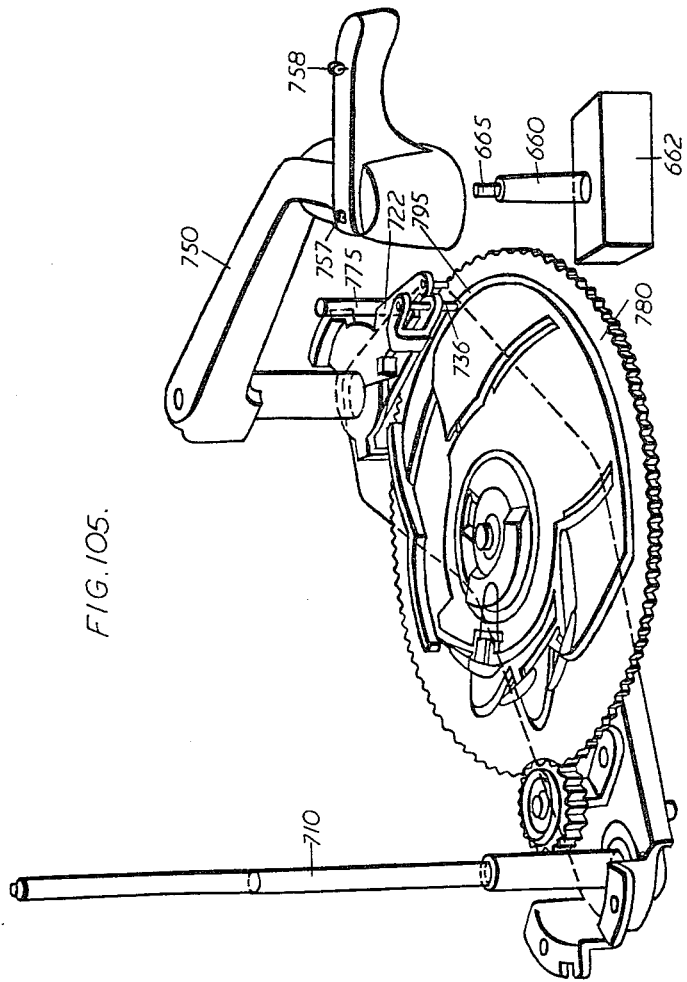
Figure 106:
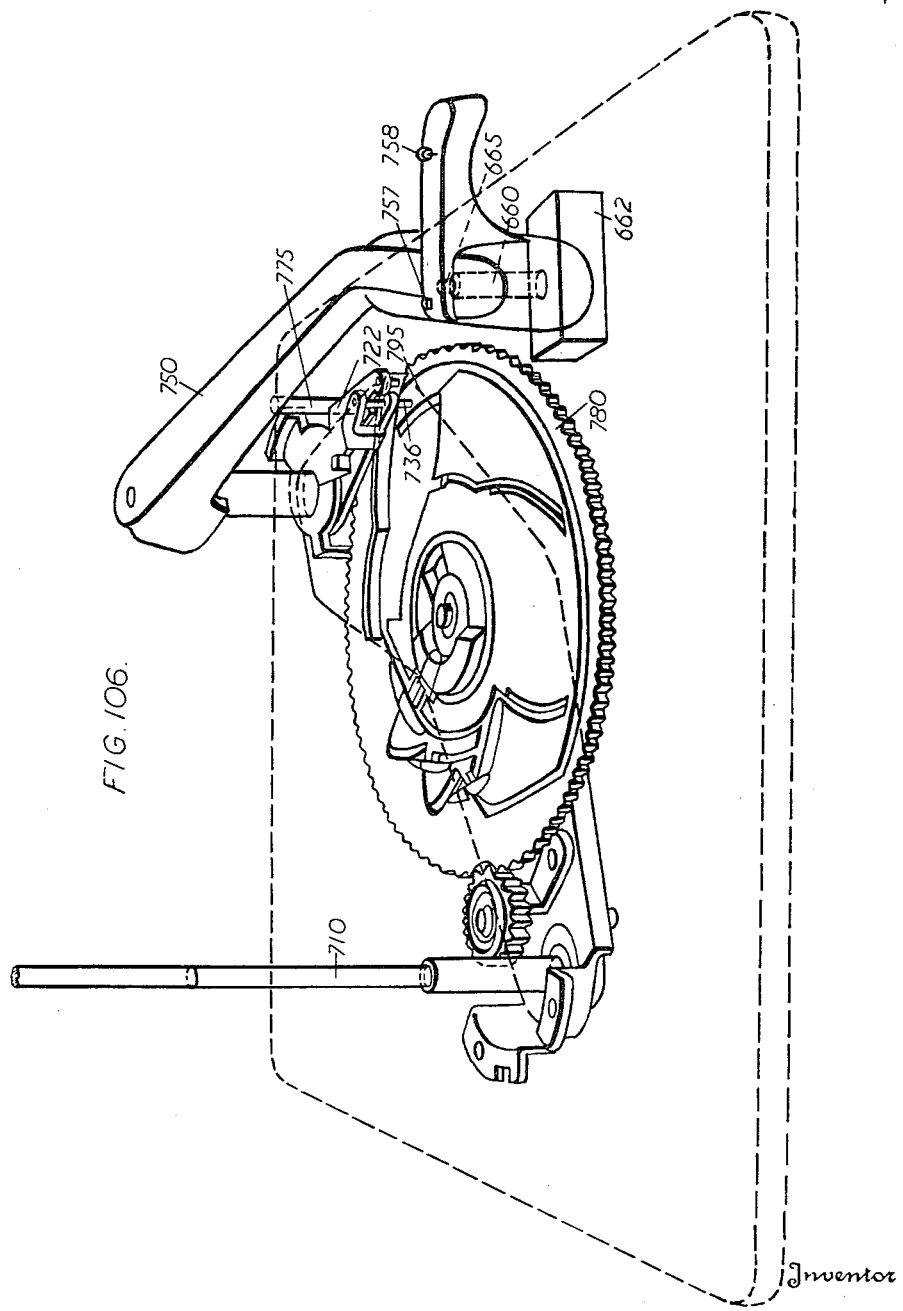

If there is no record in the magazine, i.e. when the last record of the stack of records has been played, the cam track follower pin, as previously described, is guided out into the stop track 795, and thereby causes the phonograph to stop, as illustrated in FIGURES 104 to 106. In FIGURE 104 there is no record supported on the supporting member 711 on the centre spindle 710, and the cam track follower pin 736 has thereby been able to carry out its oscillating movement in the bottom of the test tracks 791 and 693 without any obstruction which would cause it to slide along any of the sloping wall portions 691 at the ends of the inwardly leading test tracks 791 and thereby be guided to the track 792. Thus the cam track follower pin has followed the track 791c to its interior end and thereby again pushed the selector plate 784 back to its "rear position," which opens the entrance 795a to the stop track 795. This is the position shown in FIGURE 104. The cam track follower arm 731 and the arm 721 of the plate 720 are still close together since no displacement between the arms has taken place.

In FIGURE 105 the cam track follower pin has passed out into the concentric stop track 795, and the cam disc has rotated so far that lowering of the tone arm has been started.

In FIGURE 106 the cam disc has reached its stop position and the tone arm has been lowered in its most exterior position so as to rest on the switch post 660 and open the circuit of the phonograph motor. Thus, the phonograph is caused to stop when no record is tested in the magazine, i.e. either when the playing of the last record of a stack has been terminated, the record has been rejected or a single record has been played or rejected.

While in the foregoing embodiments stopping of the phonograph has been caused by lowering the tone arm on a post and thereby actuating switch means under influence of the weight of the tone arm, it will be understood that the movement of the tone arm and thereby the cam track follower to their most exterior positions during passage of the cam track follower pin in the stop track following a part of the periphery of the cam disc can be utilised in another manner to actuate switch means for opening the circuit for the phonograph motor.

Such a possibility, within the scope of the invention, is illustrated in FIGURE 107, which for the sake of simplicity shows an embodiment of the cam disc as used in the first example illustrated and described.

This cam disc 1080 has a playing recess 1086 from which starts an outwardly leading track 1089 which through a track 1090 is connected to an inwardly leading track 1091 from the interior end of which a further outwardly leading track 1093 terminates in a stop track 1095 which terminates again in the playing recess 1086 just as described in connection with the cam disc shown in FIGURE 25.

Instead of using a switch onto which the tone arm is lowered in the exterior position to which it is guided when the cam track follower pin 1036 has been allowed to pass through the tracks described hereinabove without any obstruction due to abutment of the tone arm against the edge of a record, there is, in the embodiment of FIGURE 107, used a switch 1099 having a tiltable control arm 1098 and fastened in a suitable position outside the periphery of the cam disc, for example under the chassis plate of the phonograph or on the bridge supporting the cam disc.

Adjacent the outlet of the stop track 1095 in the recess proved therein, there is arranged on the top side of the cam disc a plate 1101 swingingly about a pin 1100 such as a rivet or the like. This plate is influenced by a spring (not shown) which normally serves to keep it in the position shown in full lines engaging a stop 1102 and in which an edge portion 1103 of the plate extends into the stop track 1095. The exterior edge 1104 of this plate is arcuate and lies slightly inside a toothed portion of the periphery of the cam disc.

On the top of the plate 1101 there is arranged adjacent to the end of the plate an upwardly extending pin 1105.

When the cam track follower pin during its passage in the stop track reaches the edge 1103 of the plate 1101 it will start to swing the plate outwardly against the action of the spring until the plate reaches the position shown in dotted lines in which the pin 1105 has been swung out to such an exterior position outside the periphery of the cam disc that it hits the actuation arm 1098 for the switch 1099 during the further rotation of the cam disc and thereby swings the latter into the position shown in dotted lines in which the switch is opened.

Before the pin 1105 reaches the position of the arm 1098 as shown in dotted lines, the cam track follower pin has passed the resiliently arranged plate or tongue 1101 which by the spring (not shown) has again been swung into the position shown in full lines.

The mechanism herein described is preferably arranged so near the outlet of the stop track 1095 that as in the case where the switch is actuated by the weight of the tone arm the inertia of the turntable is sufficient to rotate the cam disc to its normal position of rest in which the intermediate driving gear wheel falls in the recess in the periphery of the cam disc.

When the phonograph, according to this embodiment, is restarted, the switch lever 1098 is actuated to assume the position shown in full lines, for example by the movement of the lever connected with the starter push button which may form a part of such lever system which also, if desired, gives the cam disc its initial movement to start the cycle of movements.

In the embodiment shown in FIGURE 107 the switch may, if desired, also be operated by an extra starter push button which will not actuate the cam disc. In this event a depression of this push button will only close the switch so as to enable the phonograph to be used as a single player in the same manner as when in the first embodiment described the tone arm is lifted from the post without pressing the starter push button.

In case of the use of such two push buttons as indicated herein, the other push button causing the cam disc to be started may be coupled with the extra push button which operates the closing of the motor switch in such a manner that the latter can be depressed without causing the cam disc starter mechanism to be actuated while depression of the cam disc starter push button always causes the motor switch operating push button to be depressed.

In other words this possibility includes operating the phonograph to be started as a single player by pressing one push button and as a record changing phonograph by pressing the other push button.

It will be understood that the invention is not limited to the embodiments described hereinabove with reference to the drawings and that numerous modifications are possible within the scope of the invention.

Thus for example an obvious modification of the embodiment shown and described with reference to Example II will be to avoid the preset arm 521 and the cam member 489 so as to include the preset scheme according to Example I by having the first outwardly leading track 589 without any sloping wall surface so that the pin 536 is always guided to the exterior end of said track 589. In such case the outward movement of the tone arm 550 during passage of the cam track follower in the track 589 is interrupted when the relay is energized. Hereby the cam track follower pin 536 does not, as in the case of Example II, pass over the surface of the cam disc to the track 591 but continues to move outwards to the end of the track 589.

Such a modification is convenient because it simplifies the cam disc 530 by avoiding the upstanding cam portion 489 and the necessity of having the arm 521. In the case of such modification it may be convenient to have suitable means to insure that the tone arm is always moved to its most exterior position to engage the feeler arrangement against the underside of the lowest record in the stack if any. Such means may be in the form of a spring or the like loosely arranged on the bridge 570 below the cam disc and actuable by an abutment projecting below the cam disc to hit the trip starter lever arm 539 extending from the tone arm spindle 567 immediately when the cam disc has started to rotate so as to swing the tone arm inwards.

It will also be appreciated that any of the modifications first described briefly with reference to FIGURES 1 to 15 can be applied to the various other embodiments described in greater detail.

Thus for example the cam arrangement according to FIGURES 2 to 4 can be applied to the embodiment of Example I. I have found it more convenient, however, to allow the stop track 395 to continue from the exterior end of the track 393 because in such case I avoid any movable parts on the cam disc.

I have also found it convenient to allow the tone arm 350, 550 or 750 to be swung to its most exterior position during its passage outwards after the test of the size of records has been completed and by using the sloping inner or rear wall of the tracks 393, 593 or 793 in combination with the test scheme described which always brings the cam track follower pin 336, 536 or 736 inside its preset position in the case when an edge of a record has been engaged to allow the tone arm to be swung out to engage its abutments 322, 522 or 722 against the fixed stop pin 375, 575 or 775. This will always bring the tone arm into a position entirely outside the edge of even the largest record which avoids the danger of the tone arm being hit by a large record which by mistake is dropped simultaneously with a smaller record which has been tested.

Also, the embodiment of FIGURES 11–13 can, as will be understood, be applied to the embodiment of Example II, if desired, and it will be understood that the number of subsequent inward and outward movements of the tone arm can be varied within the scope of the invention in this embodiment.

I claim:

1. In a control mechanism for a record changing phonograph having a tone arm including stylus means and a feeler abutment, a turntable, an electric motor adapted to drive said turntable and included in a power circuit with switch means, and a center spindle adapted to support a stack of records above said turntable to be relieved sequentially therefrom comprising a rotatably supported cam disc having a first group of cam portions for controlling vertical movements of said tone arm and a second group of cam portions for controlling horizontal movements of said tone arm, first movement transmission means between said first group of cam portions and said tone arm and second movement transmission means between said tone arm and said second group of cam tracks including a cam track follower capable of following tracks of said second group of cam tracks, a track follower arm supporting said cam track follower and operatively connected with said tone arm, a friction link between said cam track follower arm and said tone arm, a stop abutment fast with said tone arm, a fixed stop member adapted to be engaged by said stop abutment to limit outward movement of said tone arm essentially in the horizontal direction, means for retaining said cam disc in a predetermined position during playing of a record, a first cam portion in said second group of cam means of a configuration allowing free movement of said cam track follower during the passage of said stylus means of said tone arm from the exterior to the interior sound groove of a record, at least one second cam track in said second group of cam means operable to guide said cam track follower to an exterior position in which said abutment on said tone arm is in a position outside the edge of the lowest record supported on said center spindle, at least one third cam track in said second group capable of swinging said tone arm inwardly to engage said feeler abutment against the edge of the lowest record supported on said center spindle, a cam portion of said first group being operable to move the tone arm vertically to a level in which said tone arm abutment is in the horizontal level for engagement with said record edge before said inward movement takes place in said third cam track of said second group, means operable to preset said cam track follower arm relatively to said tone arm against the friction of said friction link to assume a most exterior position before said tone arm is moved inwards by said third cam track, said third cam track having a portion operable to guide said cam track follower further inwardly and thereby swing said cam track follower arm inwardly relatively to said tone arm against the action of said friction link after engagement between said feeler abutment and a record edge, a fourth cam track portion of said second group being operative to guide said cam track follower outwardly to swing said tone arm and thereby to disengage said feeler abutment from said record edge, means operable after such disengagement to relieve said record from said center spindle to descend to the turntable, a fifth cam track of said second group being operative to guide thereafter said cam track follower inwardly to a position of the tone arm in which its stylus member is substantially vertically disposed with respect to the initial sound groove of said record a portion of said first group of cam portions thereafter lowering said tone arm to engage said stylus against the record to start playing thereof, and a sixth cam track portion of said second group being operative to guide said cam track follower to a most exterior position provided the passage of said cam track follower in said third cam track portion has been allowed to take place without engagement between said feeler abutment and the edge of a record, and means operable during passage of said cam track follower in said sixth cam track to actuate said switch means to open said motor circuit.

2. A record changing phonograph having a turntable adapted to support the records during playing thereof and an electric motor in a power supply circuit adapted to drive said turntable, a support capable of supporting a stack of records in a position vertically spaced from said turntable, means for supplying the records sequentially from said support to said turntable, a tone arm including stylus means capable of engaging the groove of a record supported on the turntable and an abutment surface adapted to engage the edge of the next record to be played while supported on said support, cam means including a plurality of cam portions capable of moving the tone arm in the vertical as well as in the horizontal direction in a sequence that comprises first raising the tone arm to disengage said stylus means from a record supported on said turntable, then moving the tone arm outwardly in the raised position thereof and thereafter inwardly in such raised position in which said abutment surface is adapted to be brought into engagement with the edge of the next record to be played while supported on said support above said turntable, a frictional connecting means between said tone arm and said means controlling the horizontal movements thereof capable of sliding in response to engagement between said abutment surface and the edge of a record on said support to assume a position in which the further movement of said tone arm follows a cycle that comprises moving the tone arm outwards to a position in which said abutment is disengaged from said record edge while said record is relieved from said support and supplied to the turntable, whereafter the tone arm is moved inwardly and lowered to engage its stylus means in the initial groove of said record, a further cam portion being operative to move the tone arm to an exterior position outside the periphery of said turntable provided no sliding of said frictional connecting means has taken place as result of engagement between said abutment and the edge of a record, and switch means including switch control means in the circuit of said electric motor actuable upon movement of said tone arm under control of said further cam portion.

3. A record changing phonograph having a turntable adapted to support the records during playing thereof and an electric motor connected in a power circuit including switch means and adapted to drive said turntable, a support capable of supporting a stack of records in a position vertically spaced from said turntable, means for supplying the records sequentially from said support to said turntable, a tone arm including stylus means, and a feeler abutment adapted to engage the edge of the next record to be played while supported on said support, a cam disc movable after each playing of a record and selectively operable to move said tone arm in a first cycle in which said feeler abutment engages the edge of the next record, if any, to be supplied from said support and then land the stylus to start playing of said record when it has been supplied to the turntable and to move the tone arm in a second cycle in the absence of engagement between said feeler abutment and a record edge to thereby cause said switch means to be opened and the tone arm moved to a stop position.

4. In a record changing apparatus having a tone arm including stylus means and an abutment operable to engage the edge of the next record to be played, a power driven turntable and supporting means for a record above said turntable including means to relieve said record therefrom to supply it to the turntable, the combination comprising a cam disc rotatable between each playing of a record, and means between said tone arm and said cam disc operable to raise and lower said tone arm as well as to swing said tone arm inwardly and outwardly, said means including cam track follower means capable of being guided through a plurality of cam tracks provided in the surface of said cam disc and a friction link between said cam follower means and said tone arm, said means operable to raise said tone arm being operable to initially raise the tone arm to a position biased against the underside of the lowest record on said supporting means, a first outwardly leading cam track operable to move the tone arm outwardly in said raised position to cause said abutment to pass beyond the edge of said record and snap upwards due to said bias, means operable in response to said further upward movement of said tone arm to temporarily prevent further outward movement thereof with said abutment slightly outside said record edge, said cam track follower means being guided further outwardly to be pre-set in an exterior position thereof relative to said tone arm, a first inwardly leading cam track operable thereafter to move the tone arm inwardly to engage said abutment against said record edge and to guide said track follower means further inwardly against the friction in said friction link to a position inside said position to which said cam follower means was pre-set, a second outwardly leading cam track for subsequently moving the tone arm outwards to disengage said abutment from said record edge, means thereafter operable to relieve said record from said support to supply it to the turntable, and a second inwardly leading cam track thereafter operable to move said cam track follower means inwardly to a predetermined interior position in which said tone arm is swung inwardly to a position in which said stylus member aligns substantially vertically with the initial sound groove of said record and then lands said stylus thereon, and means operable to thereafter stop the rotation of said cam disc.

5. In a record changing phonograph having a turntable, a tone arm structure including a cam track follower and a support for a stack of records above said turntable to be released from said support one by one, the combination comprising, a cam disc having a track arrangement operable to swing said tone arm to move a portion of said tone arm to engage the next record to be released from said support for measuring the size of said record, said track follower being connected with said tone arm structure by means of a friction link, means operable to pre-set the position of said track follower relative to said tone arm structure against the friction of said friction link before the size of the record is measured, said track arrangement being operable to change said pre-set position of said track follower relative to the tone arm during the measuring of the size of said record, said cam disc further including an outwardly leading track operable to swing said tone arm to an exterior position after measuring the size of said record and during the part of the change cycle when said record is released to the turntable and a landing track for thereafter moving the tone arm inwardly to be landed on the record in the correct start-of-play position depending on the size of the record measured, said outwardly leading track having a wall in the form of a ramp and means operable to prevent outward movement of said tone arm in a predetermined most exterior position for causing said track follower to climb said ramp in a position of said outwardly leading track governed by the size of the record and the change of said pre-set position of said track follower relative to the tone arm as caused by the measuring of the size of the record.

6. In a record changing phonograph having a turntable for supporting the records to be played, a support for a stack of records vertically spaced from said turntable, means for supplying the records sequentially from said support to said turntable, a tone arm including an abutment thereon, and control means for moving the tone arm to engage said abutment with the next record to be supplied to the turntable the combination comprising a stop control arrangement for said phonograph including stop control means, and means for rendering said stop control means effective upon unobstructed movement of the tone arm by said control means in the absence of any record on said support.

7. A record changing phonograph having a turntable for supporting records during playing thereof, supporting means for supporting a stack of records vertically spaced from said turntable, means for sequentally supplying said records to the turntable to be played, a tone arm including stylus means for playing the records and an abutment on said tone arm, control means including a cam member having a plurality of cam tracks and rotating during the change cycle and a track follower movable during guidance thereof by said tracks, means operable in response to the movement of said track follower for moving the tone arm through a cycle to bring said abutment on said tone arm into engagement with the next record to be supplied from said support, stop control means for said phonograph, a stop control track in said cam member, means for controlling said track follower to enter said stop track when said tone arm moves unobstructedly in the absence of a record on said support above said turntable, and means for rendering said stop control means effective to stop said phonograph after said track follower has entered said stop track.

8. A record changing phonograph as claimed in claim 7, in which said cam member is in the form of a cam disc having a substantially circular configuration with the stop track thereof leading outwardly to adjacent the periphery of the cam disc and following along a part of the periphery in concentric relationship thereto.

9. A record changing phonograph as claimed in claim 8, to enable the cam disc has a playing recess in which the track follower to move freely therein during playing of a record, and in which said stop track merges into said playing recess.

10. A record changing phonograph as claimed in claim 7, in which said plurality of tracks in said cam member includes at least one track operable to move the tone arm so as to cause engagement of said abutment against the periphery of the next record to be supplied to the turntable, and in which said stop track extends from the end of said last-mentioned track.

11. A record changing phonograph as claimed in claim 7, in which said plurality of tracks includes a series of tracks operable to move the tone arm through an oscillating path with outwardly and inwardly directed movements, and in which said stop track extends from the end of the last track portion of said series of tracks.

12. A record changing phonograph as claimed in claim 7, in which said plurality of tracks of said cam member includes a track operable to move the tone arm outwardly and in which means is provided to obstruct outward movement of said tone arm when the abutment thereof is in the edge orbit of the next record to be supplied to the turntable during such outward movement of the tone arm, and in which said stop track extends from the end of the outwardly leading track.

13. A record changing phonograph as claimed in claim 7, in which said plurality of tracks includes a track operable to move the tone arm to an exterior position outside the periphery of the next record to be played to enable unobstructed drop of said record to the turntable, and in which said outwardly leading track merges into said stop track.

14. A record changing phonograph as claimed in claim 7, further comprising means operative in response to the outwardly leading portion of said stop track to swing the tone arm to a predetermined exterior position, means for lowering the tone arm in said exterior position, actuating means for said stop control means, and means operable by said lowering of said tone arm to render said actuating means effective to stop said phonograph.

15. A record changing phonograph as claimed in claim 7, further comprising a member extending in the orbit of said stop track to be displaced by the passage of said track follower through said stop track, actuating means for said stop control means, and means operable by the displacement of said member to render actuating means effective to stop said phonograph.

16. In a phonograph having a turntable, a support for a stack of records vertically spaced from said turntable, means for sequentially supplying said records from said support to said turntable, and a tone arm including stylus means for playing said records in the position thereof supported on said turntable, comprising a control mechanism including a rotatable cam member having a plurality of tracks and a track follower operatively connected with said tone arm for moving said tone arm during guidance of said track follower in said tracks, means resiliently supporting said track follower to enable yielding thereof essentially perpendicularly to said cam member, said cam member having at least one track for swinging the tone arm outwardly to a position outside the orbit of the next record to be supplied to the turntable from said support so as to enable free drop of said record, stop means for limiting the exterior position of said tone arm, said outwardly leading track having a sloping interior wall defining a ramp to enable said track follower to climb said ramp to leave said outwardly leading track when the outward swinging movement of the tone arm is limited by abutment thereof against said stop means.

17. A record changing phonograph as claimed in claim 16, in which said stop means for limiting the outward movement of the tone arm is effectively constituted by a stationary abutment and an abutment fast with the tone arm.

18. A record changing phonograph as claimed in claim 16, further comprising an inwardly leading track remote from said outwardly leading track and operable to move the tone arm inwardly, and means for landing the tone arm with its stylus in engagement with the surface of a record supported on the turntable when the track follower is guided by said inwardly leading track.

19. A record changing phonograph as claimed in claim 18, in which the interior wall portion of said inwardly leading track opposite the sloping wall portion of said outwardly leading track is a sloping wall portion defining a ramp.

20. A record changing phonograph as claimed in claim 16, further comprising an arm frictionally connected with said tone arm, means supporting the track follower on said arm, means including friction means for enabling said track follower arm to swing relative to the tone arm against the friction of said friction means, an inwardly leading track of said cam member operable to swing the tone arm inwardly to engage the edge of the next record to be supplied to the turntable, said inwardly leading track being provided with an extension to cause said track follower arm to swing relative to the tone arm by overcoming said friction during such engagement, said stop means being operable to limit the tone arm movement to a position in which said track follower is movably guided in said outwardly leading track when said track follower arm has been moved against said friction relative to said tone arm, said cam member further having an exterior track connected with said outwardly leading track, said exterior track being spaced from the center of said cam member such a distance that when said tone arm is in the exterior position thereof as governed by said stop means and said track follower arm has remained in its position relative to the tone arm, said track follower will move through the entire outwardly leading track and enter said most exterior track, and means for causing the phonograph to be stopped after said track follower has entered said most exterior track.

21. A record changing phonograph having a turntable, a support for a stack of records vertically spaced from said turntable, means for sequentially supplying said records from said support to said turntable, and a tone arm including stylus means for playing said records when supported on said turntable comprising in combination: a feeler abutment on the top of said tone arm including a light friction member operable to move along the surface of the next record to be supplied to the turntable, an abutment in trailing disposition relative to said light friction member and operable to engage the edge of said record when said abutment has passed beyond the edge of said record during outward travel, control means for controlling said tone arm including means for raising the tone arm to engage said light friction member with a bias against the underside of the lowest record on said support, means for moving the tone arm through an oscillating path with said light friction member in engagement with said record surface, said oscillating path being composed of a plurality of outwardly directed movements and subsequent inwardly directed movements, said control means further including a member, means including a friction link operatively connecting said last-mentioned member with the tone arm, means for enabling swinging movement of said member relative to the tone arm upon engagement of said abutment on said tone arm, during inward movement of the tone arm through a portion of said oscillating path, with the edge of the lowest record on said support, and means operative in response to the relative movement between said member and said tone arm to cause the tone arm to swing inwardly to a position with its stylus member substantially vertical above the initial sound groove of the record to be engaged after the latter has been supplied to the turntable, and means operatively connected with said means raising the tone arm for lowering the tone arm to the start of play position thereof on the record with the tone arm in said inwardly swung position.

22. A record changing phonograph as claimed in claim 21, further comprising means for presetting said member relative to said tone arm in a predetermined position prior to the movement of the tone arm through said oscillating path.

23. A record changing phonograph as claimed in claim 22, in which said presetting means includes means operable to obstruct outward movement of the tone arm and means operable to simultaneously swing said member connected with said tone arm outwardly to a predetermined exterior position against the action of said friction link.

24. A record changing phonograph as claimed in claim 23, in which said control means is in the form of a rotatable cam member having a first cam surface and a second cam surface, means operative to prevent outward movement of the tone arm and by said first cam surface, means operative by said second cam surface for swinging outwardly said arm connected with the tone arm through said friction link while said first cam surface prevents outward swinging of said tone arm.

25. A record changing phonograph as claimed in claim 21, in which said control means includes a rotatable cam disc having a plurality of tracks and a track follower mounted on said arm connected with the tone arm through said friction link for causing the movement of the tone arm upon passage of said track follower through said tracks, said tracks including a playing recess in which said track follower can move freely during playing of the record and a winding track leading away from said playing recess, said winding track having alternate inwardly and outwardly leading track portions, a continuation track extending from adjacent the interior end of each of said inwardly leading track portions, means operable to cause said track follower to continue from any one of said inwardly leading track portions of said winding track into the respective continuation track in case of interruption of the inwardly directed oscillation of the tone arm by engagement between its feeler abutment and the edge of a record during the passage of the track follower in said inwardly leading track, a single inwardly leading track portion into which merges each of said continuation tracks, and an outwardly leading track extending from the end of said single inwardly leading track portion for swinging the track follower outwardly to bring the tone arm outside the orbit of the record during the drop thereof.

26. A record changing phonograph as claimed in claim 25, in which said track follower is movable against resilient means substantially perpendicular to the surface of said cam disc, and in which the means for causing said track follower to leave any one of said inwardly leading track portions of said winding track and enter into the said respective continuation track portion is in the form of a ramp defined by a sloping wall portion at the exterior wall adjacent the end of each of said inwardly leading track portions, said resilient means being operable to enable said track follower to climb said ramp without changing the relative angular position between said track follower arm and said tone arm against the action of said friction link.

27. A record changing phonograph having a tone arm including stylus means, a turntable for supporting a record to be played and means for supporting a stack of records vertically spaced from said turntable to be supplied in sequence from said support to said turntable, in combination with control means for moving the tone arm including means operable to raise the tone arm after playing of the record, means on said tone arm for engaging the underside of the next record to be supplied to the turntable in the raised position of said tone arm, means moving the tone arm outwardly, second means on said tone arm for engaging said record surface when said first means passes the edge thereof, remote control means, brake means operable by said remote control means for interrupting further outward movement of said tone arm in response to engagement between said second means on said tone arm and said record surface, and means operable in response to said interruption of said tone arm to influence said control means to cause the tone arm to be landed in the correct start of play position thereof on said record after the latter has been supplied to said turntable.

28. A record changing phonograph as claimed in claim 27, in which said remote control means and said stop means include an electrical circuit having in series an electrical switch supported on said tone arm and an energizable coil in series with a voltage source to energize said coil when said switch is closed, a movable armature, means moving said armature in response to energization of said coil, a member fast with said tone arm and mounted to be engaged by said armature when moved in response to energization of said coil to prevent further outward swinging of said tone arm, said second means on said tone arm including a movable member, and means operable in response to movement of said movable member on said tone arm to actuate said switch to be closed in response to engagement between said movable member and the underside of said record.

29. A record changing phonograph as claimed in claim 27, in which said control means include a pin movable against resilient action and a cam member movable substantially perpendicular to the direction of movement of said pin, said cam member having an outwardly leading cam portion sloping in the direction toward said pin and defining a ramp to be climbed by said pin when the outward movement of said tone arm is interrupted by the operation of said remote control means and said brake means.

30. A record changing phonograph as claimed in claim 29, in which said cam member is in the form of a cam disc having a playing recess in which said pin can move freely during the playing of the record and on which said ramp is defined by an interior wall of an outwardly leading track, the cam disc having an inwardly leading track spaced from said outwardly leading track in which said pin is deposited when it has climbed said ramp and passed over an exposed surface portion of said cam disc, said first means on said tone arm including an abutment operable to engage the edge of said record when the tone arm is swung inwardly with said track follower guided in said inwardly leading track, said track follower being mounted on an arm connected with the tone arm through a friction link, and means operable to preset said track follower arm relative to the tone arm against the action of said friction link prior to the entrance of the track follower in said outwardly leading track.

31. A record changing phonograph as claimed in claim 29 in which said outwardly leading track extends to adjacent the periphery of the cam disc and continues in an outermost track following the periphery of the cam disc, and means operable to stop the phonograph after the track follower has entered said exterior track.

32. A record changing phonograph as claimed in claim 30, in which said means for presetting said track follower arm relative to said tone arm is in the form of a cam member on said cam disc and a member fast with the tone arm arranged to engage said cam member to prevent outward swinging of the tone arm, and a cam surface operable to swing said track follower arm outwardly while said cam member prevents outward swinging of said tone arm.

33. A record changing phonograph in which the size of the next record to be played is gauged by means of an abutment on the tone arm comprising in combination: a turntable for supporting the records to be played, a support for a stack of records vertically spaced from said turntable, means for supplying the records sequentially from said support to said turntable, a tone arm including abutment means, and control means including means for raising and lowering the tone arm between a raised position with said abutment means in a plane operable to engage the edge of the next record to be supplied to said turntable and a lowered position in which said tone arm stylus is able to engage the record supported on said turntable for playing said record, said control means further including an arm extending in a plane substantially parallel with said tone arm, friction means operatively connecting said arm with said tone arm to enable said arm to swing relatively to said tone arm against friction, a pin mounted on said arm, a cam member having an outwardly leading cam cooperating with said pin to swing the tone arm outwardly and an inwardly leading cam for subsequently swinging the tone arm inwardly, said inwardly leading cam having an extension to cause said pin to be guided inwardly to a position corresponding to a position of said tone arm abutment inside the periphery of a record of the smallest size to be played.

34. A record changing phonograph as claimed in claim 33, in which said cam member is in the form of a substantially plane cam disc having a plurality of tracks in its surface including, in combination with said outwardly and said inwardly leading track, a playing recess in which said pin can move freely during the playing of a record, said outwardly leading track leading away from one end of said playing recess.

35. A record changing phonograph as claimed in claim 34, further comprising a stationary stop and an abutment fast with said tone arm for engaging said stationary stop to limit outward movement of the tone arm when said track follower is moved outwards through said outwardly leading track to cause said track follower arm to thereby swing relatively to said tone arm against the friction of said friction link to preset the track follower arm relative to said tone arm in a predetermined position prior to inward guidance of said track follower through said inwardly leading track.

36. A record changing phonograph as claimed in claim 35, in which an outwardly leading track extends at the end of the inwardly leading track having its interior wall in the form of a ramp in spaced relationship to which an inwardly leading track is arranged, means to enable the track follower to be moved against resilient action essentially perpendicularly to the plane of said cam disc, and means for supplying the records from said support to said turntable during such part of the movement of said cam disc when the tone arm is in its exterior position as limited by the engagement of said abutment fast with said tone arm and said stationary stop.

37. A phonograph having a turntable and a pick-up including stylus means, comprising a record-size feeler arrangement on the tone arm having a first member adapted to drop over the edge of a record and a second member which engages the surface of the record when said first member drops over the edge thereof, means operatively connected with said tone arm for swinging the same into engagement with the surface of the next record to be played in the direction toward the edge thereof for feeling the size of the record, remote control means in said phonograph operable by engagement between said second member and the record surface for interrupting further outward movement of the tone arm, and means operative in response to operation of said remote control means for depositing the stylus in the start-of-play position on said record.

38. In a record changing phonograph having a turntable, a support for a stack of records spaced from said turntable, release means operable to release said records in sequence from said support to said turntable, a tone arm and a control mechanism operable to swing said tone arm through a cycle comprising a rotatable cam disc having a plurality of track portions and a track follower structure including track follower means and connecting means operatively connecting said track follower means with said tone arm to control the swinging movement of said tone arm during said cycle by guidance of said track follower means in the track portions of said cam disc, said cam disc including a first track portion operable to swing said tone arm outwards to thereby enable unobstructed passage of a record from said support to said turntable, said first track portion having the interior wall thereof in the form of a ramp, and a second track portion operable to swing the tone arm inwards, said second track portion being spaced from said first track portion by an exposed surface portion of said cam disc, means in said record changing phonograph operable to interrupt the outward movement of said tone arm in a predetermined exterior position thereof during the passage of said track follower means through said first track portion, means operatively associated with said track follower structure to enable said track follower means to yield and thereby to leave said first track portion upon obstruction to said outward movement by climbing said ramp and thereafter to pass said exposed cam surface portion and enter said second track portion, and means operatively connected with said record release means to actuate the same during the passage of said track follower means across said exposed cam disc surface portion.

39. In a record changing phonograph having a turntable, support means for supporting a stack of records in spaced relationship from said turntable, release means operable to release said record in sequence from said support means to said turntable, a tone arm, and a control mechanism operable to swing said tone arm through a cycle, comprising rotatable cam disk means having a plurality of track means, track follower means adapted to engage said track means and connecting means operatively connecting said track follower means with said tone arm to thereby control the swinging movement of said tone arm by the engagement of said track follower means in said track means, said plurality of track means including first track means operative during engagement with said track follower means to test for the presence of a record to be released from said support means to said turntable and to pre-select, in the presence of such record, the start-of-play position of said tone arm, second track means consisting of a single outwardly leading track portion, third track means consisting of a single inwardly leading track portion leading to the start-of-play position of said track follower means, said second and third track means being spaced from each other and effectively interconnected with each other by an exposed surface portion of said cam means provided with a ramp leading from said second track means to said surface portion, and means in said phonograph opposing the continued outward movement of said track follower means at a point during passage thereof in said second track means determined by the pre-selection of the start-of-play position in said first track means to thereby constrain said track follower means to climb said ramp and cross the exposed surface portion into said third track means.

40. In a record changing phonograph having a turntable, support means for supporting a stack of records in spaced relationship from said turntable, release means operable to release said records in sequence from said support to said turntable, a tone arm, and a control mechanism operative to swing said tone arm through a control cycle comprising cam disk means, track follower means, and connecting means operatively connecting said track follower means with said tone arm to enable relative movement therebetween, said cam means including first means for pre-setting the relative position between said tone arm and said track follower means by engagement with said track follower means, second means operative by engagement with said track follower means to test for the presence of another record to be released from said support means to said turntable and to pre-select, in the presence of such record, the start-of-play position of said tone arm including means to establish a fixed relationship for said track follower means with respect to the center of said cam means in the start-of-play position of said tone arm, third means effectively constituting a stop track, fourth means effectively constituting a landing track and providing a predetermined position of said track follower means and therewith of said tone arm in the start-of-play position of the latter, fifth means establishing a direct communication between said second means and said third means, and sixth means providing an interconnection between said fourth means and said second means which is engaged by said track follower means only in the event of an opposing force opposing the unobstructed movement of said track follower means in said fourth means, and means in said phonograph for producing said opposing force.

41. A record changing phonograph for playing a plurality of records of different sizes having a tone arm with abutment means, a turntable for supporting records during the playing thereof, stationary spindle means having supporting means for supporting a stack of records above said turntable, means for releasing said records in sequence from said supporting means to said turntable, comprising a control mechanism operable to move said tone arm through a cycle including cam means and track follower means operatively connected with said tone arm and adapted to engage with said cam means, said cam means having first track means for swinging the tone arm to test for the presence of another record to be released from the support means to the turntable and thereby preselect the start-of-play position, said first track means guiding said track follower means to a radial distance from the center of said cam disc which produces, in the absence of another record on said support means, a position of the tone arm abutment means inside the periphery of the smallest record to be played, second track means constituting a landing track, third track means constituting a stop track, and fourth track means providing a direct communication between said first track means and said third track means, and means for selectively guiding said track follower means from said fourth track means to said second track means in the presence of another record on said support means to be released to said turntable, said fourth track means having an outwardly leading configuration to thereby assure displacement of said tone arm outside the periphery of the largest record to be played.

42. A record changing phonograph according to claim 41, further comprising operatively connecting said track follower means with said tone arm to enable relative swinging movement therebetween.

43. In a phonograph having a turntable, drive means operatively connected with said turntable to drive the same including disabling means to effectively disable said drive means, support means for supporting a stack of records spaced from said turntable, means operable to release said records in sequence from said support to said turntable, a tone arm, and a control mechanism operable to move said tone arm through a cycle including a cam member and a cam follower operatively connected with said tone arm, said cam member having a plurality of cam means including first cam means for preselecting the proper start-of-play position for said tone arm in the presence of another record to be released next from said support means, second cam means providing a predetermined end-of-control-cycle position for said cam follower effectively establishing the preselected start-of-play position of said tone arm, and third cam means effectively providing a stop position for said tone arm, and means selectively guiding said cam follower to cooperate with said second cam means in the presence of such other record and to cooperate with said third cam means exclusively in the absence of such record on said support means.

44. In a phonograph having a turntable, drive means operatively connected with said turntable to drive the same including disabling means to effectively disable said drive means, support means for supporting a stack of records spaced from said turntable, means operable to release said records in sequence from said support to said turntable, a tone arm, stop control means operatively connected with said disabling means to actuate the same, and a control mechanism operable to move said tone arm through a cycle including a cam member and a cam follower operatively connected with said tone arm, said cam member having a plurality of cam means including first cam means effectively determining the presence of another record to be released next from said support means, and second cam means effectively providing a stop position for said tone arm to be engaged by said cam follower exclusively in the absence of a record on said support means, and means operatively connected with said stop control means and effective to disable said drive means by said disabling means upon engagement of said second cam means by said cam follower.

45. In a phonograph having a turntable, drive means operatively connected with said turntable to drive the same including disabling means to effectively disable said drive means, support means for supporting a stack of records spaced from said turntable, means operable to release said records in sequence from said support to said turntable, a tone arm, stop control means operatively connected with said disabling means to actuate the same, and a control mechanism operable to move said tone arm through a cycle including a cam member and a cam follower operatively connected with said tone arm, said cam member having first cam means effectively providing a start-of-play position of said tone arm governed by the size of the next record to be released, if any, from said support means, and second cam means effectively providing a stop position for said tone arm to be engaged by said cam follower exclusively in the absence of a record on said support means, and means operatively connected with said stop control means and effective to disable said drive means by said disabling means upon engagement of said second cam means by said cam follower.

46. In a record changing phonograph having a tone arm movable to engage the edge of the next record to be played, the combination comprising control means including cam disk means provided with track means, track follower means operatively connected with said tone arm and operative to cause swinging movements of said tone arm during guidance of said track follower means within said track means, said cam disk means including an inwardly leading track operative to swing said tone arm inwardly and therewith cause said engagement between said tone arm and the next record to be played, and said inwardly leading track having means for effectively adjusting an exterior wall portion thereof so as to effectively adjust thereby at least one of the configuration and position of said exterior wall portion which controls the inward movement of said tone arm.

47. In a record changing phonograph having a turntable for supporting records during the playing thereof, a support for a stack of records above said turntable, release means for sequentially releasing said records to said turntable, a tone arm and an abutment on said tone arm, comprising in combination: a tone arm structure including said tone arm having an axis of rotation about which said tone arm structure rotates, a track follower and connecting means operatively connecting said track follower with said tone arm to swing together therewith about said axis of rotation, means enabling relative swinging movement between said track follower and said tone arm exclusively about said axis, a rotatable cycle control cam disk having an un-interrupted elongated track including a plurality of track portions operable to guide said track follower to swing said tone arm, one of said track portions being operable to guide said track follower in a direction to effectuate swinging of said tone arm to engage said abutment with the peripheral portion of the next record to be released, if any, during the passage of said track follower through said one track portion to prevent further swinging of the tone arm and to effectively preselect the correct start-of-play position of said tone arm governed by the size of said record in response to the relative swinging of said track follower and said tone arm during the passage of said track follower through the remaining part of said track portion, and a landing track in said cam disk operatively connected with said last-mentioned track portion to effectively guide said track follower to said start-of-play position of said tone arm.

References Cited in the file of this patent

UNITED STATES PATENTS

| | | |
|---|---|---|
| 2,333,414 | De Tar | Nov. 2, 1943 |
| 2,613,081 | Fisher | Oct. 7, 1952 |
| 2,637,558 | Fisher | May 5, 1953 |
| 2,818,263 | Dale | Dec. 31, 1957 |